(12) United States Patent
Ferrante et al.

(10) Patent No.: US 12,471,955 B2
(45) Date of Patent: Nov. 18, 2025

(54) AUTOMATED SPATIAL FRAME AND AUTOMATED STRUTS USED THEREWITH

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Joseph M. Ferrante, Bartlett, TN (US); Daniel Farley, Memphis, TN (US); Darren Wilson, Hull (GB); Sied W. Janna, Memphis, TN (US); Brian Roberts, Germantown, TN (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 271 days.

(21) Appl. No.: 17/763,792

(22) PCT Filed: Sep. 23, 2020

(86) PCT No.: PCT/US2020/052276
§ 371 (c)(1),
(2) Date: Mar. 25, 2022

(87) PCT Pub. No.: WO2021/061816
PCT Pub. Date: Apr. 1, 2021

(65) Prior Publication Data
US 2022/0354539 A1    Nov. 10, 2022

Related U.S. Application Data

(60) Provisional application No. 63/054,427, filed on Jul. 21, 2020, provisional application No. 63/001,805,
(Continued)

(51) Int. Cl.
*A61B 17/62*    (2006.01)
*A61B 17/00*    (2006.01)
(Continued)

(52) U.S. Cl.
CPC .............. *A61B 17/62* (2013.01); *A61B 17/66* (2013.01); *A61B 2017/00017* (2013.01); *A61B 2017/00734* (2013.01); *A61B 2090/061* (2016.02)

(58) Field of Classification Search
CPC ......... A61B 17/62; A61B 17/64; A61B 17/45; A61B 17/66; A61B 2017/00734
See application file for complete search history.

(56) References Cited

U.S. PATENT DOCUMENTS 5,702,389 A    12/1997    Taylor et al.
5,728,095 A    3/1998    Taylor et al.
(Continued)

FOREIGN PATENT DOCUMENTS

GB    2573000 A  * 10/2019   ............. A61B 17/62
WO    2015136544 A1    9/2015
WO    2017221243 A1    12/2017

OTHER PUBLICATIONS

Crenshaw et al., "Automation of the Taylor Spatial Frame for improved deformity correction" RICE—dated Sep. 15, 2008.
(Continued)

Primary Examiner — Jacqueline T Johanas
Assistant Examiner — Holly Joanna Lane
(74) Attorney, Agent, or Firm — KDW Firm PLLC

(57) ABSTRACT

An automated spatial frame is disclosed. The spatial frame may include a master controller unit arranged and configured as a centralized controller for exchanging data with a remote computing system, exchanging data with a plurality of automated struts, and delivering power to the automated
(Continued)

struts. Thus arranged, the master-controller unit may be configured as a fully integrated, rechargeable power supply/controller unit for powering and controlling the automated struts. In one embodiment, the master-controller unit is coupled to an external surface of a platform. The platform acting as a conduit for coupling the master-controller unit to the automated struts. As such, at least one of the platforms provides integrated connectivity to the automated struts. In one embodiment, the struts may be wireless automated strut including a motor, a power source, and a wireless communications module for communicating with an external computing system.

20 Claims, 33 Drawing Sheets

Related U.S. Application Data filed on Mar. 30, 2020, provisional application No. 62/906,298, filed on Sep. 26, 2019.

(51) Int. Cl.
*A61B 17/66* (2006.01)
*A61B 90/00* (2016.01)

(56) References Cited

U.S. PATENT DOCUMENTS

| | | | |
|---|---|---|---|
| 5,891,143 A | 4/1999 | Taylor et al. | |
| 5,971,984 A | 10/1999 | Taylor et al. | |
| 6,030,386 A | 2/2000 | Taylor et al. | |
| 6,129,727 A | 10/2000 | Austin et al. | |
| RE40,914 E | 9/2009 | Taylor et al. | |
| 9,949,758 B2 | 4/2018 | Vikinshy et al. | |
| 10,898,229 B2* | 1/2021 | Park | A61B 17/00 |
| 2002/0010465 A1* | 1/2002 | Koo | A61B 17/62 606/57 |
| 2003/0191466 A1* | 10/2003 | Austin | A61B 17/62 606/54 |
| 2004/0073211 A1 | 4/2004 | Austin et al. | |
| 2005/0215997 A1 | 9/2005 | Austin et al. | |
| 2012/0083717 A1* | 4/2012 | Alleman | A61B 8/546 601/2 |
| 2012/0330312 A1* | 12/2012 | Burgherr | A61B 17/62 606/54 |
| 2015/0238228 A1* | 8/2015 | Langenfeld | A61B 17/66 606/105 |
| 2016/0092651 A1* | 3/2016 | Austin | G16H 40/67 705/2 |
| 2019/0231259 A1* | 8/2019 | Cohen | G16H 40/63 |
| 2019/0247050 A1 | 8/2019 | Goldsmith | |
| 2021/0038147 A1* | 2/2021 | Cohen | A61B 5/1121 |

OTHER PUBLICATIONS

Bright et al., "Preliminary experience with motorized distraction for tibial lengthening" Strat Traum Limb Recon (2014) 9:97-100.
Author Unknown., Tredlines—OrthoSpin URL: https://www.trendlines.com/company/orthospin/.
Author Unknown., "Automating the Taylor Spatial Frame" Bioengineering Design at Rice University.
Sukruth et al., "Design and Development of Motorized Ilizarov Apparatus for Distraction Osteogenesis" 3rd ISSE National Conference on Complex Engineering Systems of National Importance: Current Trends & Future Perspective (INAC-03), Oct. 12-13, 2017.
Wendlandt., "Bone mounted hexapod robot for outpatient distraction osteogenesis" IFMBE Proceedings 22, pp. 1679-1682, 2008.
International Search Report and Written Opinion for the International Patent Application No. PCT/US2020/052276, mailed Dec. 3, 2020, 11 pages.

* cited by examiner

PRESCRIPTION

| DATE | WKDAY | DAY | STRUT 1 | STRUT 2 | STRUT 3 | STRUT 4 | STRUT 5 | STRUT 6 |
|---|---|---|---|---|---|---|---|---|
| 23/05/16 | MON | 0 | 173 | 169 | 160 | 159 | 167 | 164 |
| 24/05/16 | TUES | 1 | 172 | 169 | 160 | 159 | 166 | 163 |
| 25/05/16 | WED | 2 | 171 | 168 | 161 | 159 | 165 | 162 |
| 26/05/16 | THU | 3 | 171 | 168 | 161 | 159 | 163 | 160 |
| 27/05/16 | FRI | 4 | 170 | 167 | 162 | 159 | 162 | 159 |
| 28/05/16 | SAT | 5 | 169 | 167 | 162 | 159 | 161 | 158 |
| 29/05/16 | SUN | 6 | 168 | 166 | 162 | 159 | 160 | 157 |
| 30/05/16 | MON | 7 | 168 | 166 | 163 | 159 | 158 | 155 |
| 31/05/16 | TUE | 8 | 167 | 165 | 163 | 159 | 157 | 154 |
| 01/06/16 | WED | 9 | 166 | 165 | 164 | 159 | 156 | 153 |
| 02/06/16 | THU | 10 | 165 | 164 | 164 | 159 | 155 | 152 |
| 03/06/16 | FRI | 11 | 165 | 164 | 165 | 159 | 153 | 150 |
| 04/06/16 | SAT | 12 | 164 | 163 | 165 | 159 | 152 | 149 |
| 05/06/16 | SUN | 13 | 163 | 163 | 165 | 159 | 151 | 148 |
| 06/06/16 | MON | 14 | 162 | 162 | 166 | 159 | 150 | 147 |
| 07/06/16 | TUE | 15 | 162 | 162 | 166 | 159 | 148 | 145 |
| 08/06/16 | WED | 16 | 161 | 161 | 167 | 159 | 147 | 144 |
| 09/06/16 | THU | 17 | 161 | 161 | 167 | 159 | 146 | 143 |

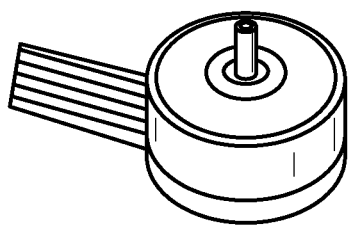
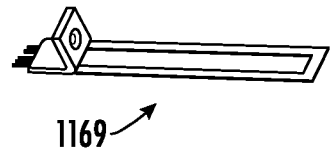
FIG. 25
FIG. 26
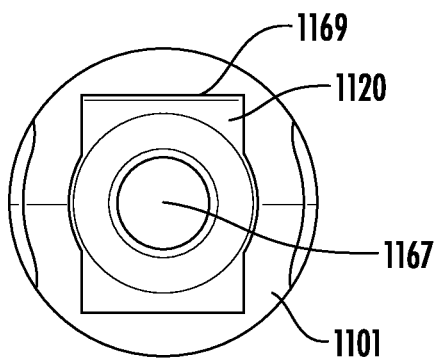
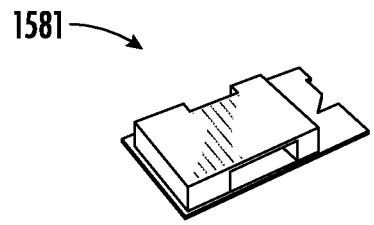
FIG. 27
FIG. 28

AUTOMATED SPATIAL FRAME AND AUTOMATED STRUTS USED THEREWITH

CROSS-REFERENCE TO RELATED APPLICATIONS

This application is a National Phase filing of International Application No. PCT/US2020/052276, filed Sep. 23, 2020, which is a non-provisional of, and claims the benefit of the filing date of, U.S. provisional patent application No. 62/906,298, filed Sep. 26, 2020, entitled "Motorized Auto-Adjusting External Fixation System", and is a non-provisional of, and claims the benefit of the filing date of, U.S. provisional patent application No. 63/001,805, filed Mar. 30, 2020, entitled "Automated Spatial Frame Device", and is a non-provisional of, and claims the benefit of the filing date of, U.S. provisional patent application No. 63/054,427, filed Jul. 21, 2020, entitled "Wireless Automated Strut", the entirety of each application is incorporated by reference herein.

FIELD OF THE DISCLOSURE

The present disclosure relates generally to orthopedic devices, systems, and methods for facilitating fracture alignment such as the treatment of musculoskeletal conditions with a spatial frame, and particularly to a motorized spatial frame including integrated electronic components and/or automated linear actuation devices or struts.

BACKGROUND OF THE DISCLOSURE

People suffer bone fractures each year. In many instances, a person that suffers a bone fracture is required to use a bone alignment device such as, for example, an external fixation system, a spatial frame, a hexapod, etc. (used interchangeably herein without the intent to limit) to align two or more bones, bone fragments, bone pieces, etc. (used interchangeably herein without the intent to limit). Generally speaking, spatial frames allow for polyaxial movement of the coupled bones and are typically used to keep fractured bones stabilized and in alignment during the treatment period.

The spatial frame may include first and second rings, platforms, frames, bases, etc. (used interchangeably herein without the intent to limit) intercoupled by a plurality of struts. In use, the struts have adjustable lengths that may be manually adjusted regularly (e.g., daily) in accordance with a prescription or treatment plan (used interchangeably herein without the intent to limit). As the lengths of the struts are adjusted, the platforms may be brought closer together or moved farther apart. The treatment plan specifies strut length adjustments to be made over time to ensure successful bone alignment. One known example is the TAYLOR SPATIAL FRAME® branded spatial frame manufactured and sold by Smith Nephew, Inc.

The TAYLOR SPATIAL FRAME® branded spatial frame is based on the general concept of a Stewart platform. Smith & Nephew, Inc. is the owner of U.S. Pat. Nos. 5,702,389; 5,728,095; 5,891,143; RE40,914, 5,971,984; 6,030,386; and 6,129,727; and U.S. Published Patent Application Nos. 20030191466; 2004/0073211; 2005/0215997; and 2016/0092651 that disclose many concepts of and improvements to the Stewart platform based spatial frame, including methods of use, systems, and devices that enhance use of the spatial frame. The disclosures of these Smith & Nephew, Inc. patents and applications are hereby incorporated by reference in their entirety herein.

During use, patient's bones are normally adjusted (e.g., lengthened, shortened, etc) manually using, for example, a wrench at a rate of approximately 1 mm/day, which is then proceeded by a consolidation phase before the spatial frame is removed. While it is theoretically known in the prior art to automate adjustment of a spatial frame by motorizing or otherwise automating strut adjustments, currently commercially available spatial frames are dependent on manual adjustment of struts.

As a result of the requirement for manual adjustments, generally speaking, successful treatment requires patient compliance (e.g., daily manual adjustments utilizing a wrench to adjust each of the struts). In routine clinical practice, the treatment plan may require multiple daily adjustments to be made to each of the plurality of struts. For example, a patient manually adjusts one or more of the struts, typically two or more times daily, and often over long periods of time with support from either a family member or a clinician or both. As such, compliance with the treatment plan may be burdensome, painful, etc.

As a result, the number of adjustments dictated by the treatment plan may be limited. For example, generally speaking, treatment plans often limit the required number of daily adjustment to each of the plurality of struts to four. During a normal treatment plan, this may equate to approximately 2,160 adjustments (e.g., turns) over a 3 month treatment span (e.g., 6 struts×4 adjustments per day×90 days).

In addition, during the treatment period, the patient may require numerous clinical visits to confirm proper strut adjustments to ensure compliance and avoid incorrect adjustment, which has historically been the leading cause of treatment failure.

Automated struts could provide numerous advantages over manually adjustable struts. In use, electric motors, motor-drive units, and a control unit (e.g., a central control unit) could function to supersede the manual actuation of the strut adjustments. For example, an automated system could eliminate the need for patient compliance and decrease the frequency of post-operative visits for patient supervision given that the spatial frame only has to be activated at the start of the distraction phase and terminated at the end of the distraction phase without any patient intervention. Additionally, automatic distraction could enable a higher distraction frequency and result in smaller excursions per activation. Smaller distraction steps or adjustments have the potential to result in less damage to the distracted tissues, improving bone regeneration and adaptation of the surrounding soft tissues. That is, spatial frames equipped with automated struts offer the potential to increase the number of daily distraction adjustments by enabling finer (e.g., smaller) adjustments at a controllable rate and frequency of distraction that encourages better quality bone formation. For example, in one embodiment, finer adjustments can increase the number of daily adjustments over a 3 month period from approximately 2,160 daily adjustments to approximately 10,800 daily adjustments (e.g., 6 struts×20 adjustments per day×90 days). In another embodiment, finer adjustments can increase the number of daily adjustments over a 3 month period to approximately 777,600 daily adjustments (e.g., 6 struts×1440 adjustments per day×90 days).

However, automated struts face a number of challenges that need to be overcome. For example, in order for a motorized spatial frame to be practical, the motorized spatial frame needs to provide (a) sufficient power to the individual struts in order for them to carry out the required adjustments on a daily basis over the treatment period and (b) needed data connections to the struts, while reducing the overall bulkiness (e.g., size and weight) of the spatial frame and automated struts so that the spatial frame can be effectively worn by the patient during the treatment period.

As illustrated in one embodiment as provided for in "Bone mounted hexapod robot for outpatient distraction osteogenesis." Robert Wendlandt, F. Wackenhut, K. Seide, J. Muller 4$^{th}$ European Conference of the International Federation for Medical and Biological Engineering 2008, IFMBE Proceedings 22, pp. 1679-1682; and U.S. Pat. No. 9,949,758; automated spatial frame devices in the prior art are fundamentally modified devices that fail to fit within space parameters of typically marketed spatial frames and/or require additional or overly complex mechanisms for implementation.

For example, it would be beneficial if the motorized spatial frame and/or the components thereof are substantially similar in size and configuration to existing spatial frames and/or the components thereof. In addition, a control or master module or unit and battery should be designed to not interfere with spatial frame assembly or operation in order to maintain its prescription freedom. Moreover, it would be beneficial for the automated frame to be provided without any external electronic components such as, for example, batteries, snagging wires/exposed cabling. Otherwise, for example, wires running between the struts and electrical connectors would need to be designed to withstand environmental conditions. In addition, external wiring would need to run within or around the platforms, which could lead to ripping or tearing by the patient during use. It would also be beneficial to automate struts with an adaptor so that struts could be retrofitted to existing strut inventory.

Thus, it would be beneficial to provide a spatial frame that includes automated struts that overcome the challenges of the prior art devices. It is with respect to these and other considerations that the present disclosure may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure illustrates and describes multiple different embodiments of an automated spatial frame. In one embodiment, the automated spatial frame may include a plurality of motorized struts, each motorized strut incorporating a slave micro-controller. In addition, each motorized strut may incorporate sensing capabilities and an electrical connector. In addition, the automated spatial frame utilizes a "Smart Ring" including, for example, a battery and a centrally located master control unit arranged and configured to provide localized intelligence to supply data and/or power to each of the plurality of motorized struts. In addition, the Smart Ring may include integrated wire loom for managing the wires or cables between the Smart Ring and the automated struts.

In an alternate embodiment, the automated spatial frame may include a plurality of wirelessly enabled automated struts, each of the wirelessly enabled automated struts may incorporate an on-board battery/charge pump circuit, sensing capabilities, a master printed circuit board ("PCB"), and a standard connector for coupling to first and second rings or platforms of the spatial frame. Thus configured, the automated spatial frame is arranged and configured with distributed intelligence throughout the device. A standard ring or platform may be used with the automated spatial frame.

In another embodiment, a motorized strut adaptor can be provided. In use, the motorized strut adaptor can be coupled to a standard manual-adjusting strut to automate the current manual-adjusting strut. Thus arranged, the motorized strut adaptor may be referred to as a "retrofit kit."

In one embodiment, the present disclosure provides a spatial frame and associated system architectural for an improved motorized, auto-adjusting system. In one embodiment, the spatial frame includes first and second bases, platforms, rings, frames, etc. (used interchangeably herein without the intent to limit), a plurality of adjustable length, automated struts coupled to the first and second platforms, and a master control unit for controlling the movement of the automated struts.

In one embodiment, the master control unit is arranged and configured to exchange (e.g., transmit and/or receive) data with the plurality of automated struts. For example, in one embodiment, the master control unit is arranged and configured to transmit instructions to the plurality of struts. The instructions including, for example, length adjustment instructions, timing instructions, etc. for each of the plurality of struts.

In one embodiment, additionally and/or alternatively, the master control unit is arranged and configured to provide power to each of the plurality of struts. That is, in one embodiment, the master control unit may include a power supply such as, for example, a rechargeable lithium battery, so that when the master control unit is coupled to the automated struts, the master control unit supplies power to each of the plurality of struts.

In one embodiment, the master control unit is arranged and configured to be mechanically coupled to one of the first and second platforms. For example, in one embodiment, the master control unit is arranged and configured to be mounted, coupled, or clipped onto an external surface of one of the first and second platforms. In one embodiment, the master control unit may be arranged and configured in the shape of a ring, or a partial ring, so that when the master control unit is coupled to one of the platforms (e.g., ring-shaped platform), the master control unit is either co-planar or slightly above the connected platform. In an alternative embodiment, the master control unit and battery(s) are housed in the redundant spaces between the ring tabs. In addition, the wire loom that provides data and power to the struts may be arranged circumferentially in a groove with local terminations at each of the six tabs.

In one embodiment, the master control unit may be coupled to the automated struts to exchange data and deliver power to the automated struts. In one embodiment, the master control unit may be coupled to one or more of the automated struts via a connector such as, for example, a micro-USB type connector, a jack plug style connector, PCB cable connectors, IDC connectors, etc. Alternatively, the platform may be arranged and configured as a conduit for providing connection between the master control unit and the automated struts. For example, in one embodiment, the platform may include embedded wire looms, traces, etc. having end connectors for coupling with corresponding connectors on the master control unit and the automated struts. Thus arranged, the master control unit can be electrically connected to the coupled platform. Similarly, the automated struts can be electrically connected to the coupled platform. Thus arranged, the master control unit may be arranged and configured to be electrically connected to the plurality of struts via the coupled platform. In use, the connectors enable the master control unit and the plurality of automated struts to transfer power and/or receive and transmit data relating to (a) patient compliance, (b) healing status (via, for example, the force exerted by the actuator via motor current), (c) treatment plan (e.g., distraction length, lengthening direction, rate and rhythm of distraction, total amount of distraction, lengthening schedule, number of turns of the motor/gear assembly, date and time) and (d) the health of the strut (e.g., battery life/voltage, and error events relating to the motor (over current, over voltage, temperature).

In one embodiment, the platform may include a plurality of connectors for electrically coupling to each of the plurality of struts. Thus arranged, each of the struts may be mechanically and electrically coupled to the platform, which is mechanical and electrically coupled to the master control unit. Alternatively, the platform may be arranged and configured to electrically connect to a single automated strut, thereafter the remaining struts may be daisy-chained connected to each other (e.g., the master control unit may be coupled to the plurality of automated struts in series, the master control unit may be coupled to a first of the plurality of automated struts, thereafter, each of the remaining automated struts may be coupled to a downstream strut via a daisy-chain or series arrangement).

An automated spatial frame is also disclosed. In one embodiment, the automated spatial frame includes at least a first platform, multiple automated struts coupled to the first platform, the struts configured to extend and retract in response to one or more signals, a control unit electrically connected to one or more of the multiple automated struts, the control unit configured to provide the one or more signals to the multiple automated struts, a power source for energizing the multiple automated struts, and a second platform coupled to the multiple automated struts and including integrated connectivity among two or more of the multiple automated struts, the control unit, and the power source. The automated spatial frame may also include a computing device that executes control instructions to receive a spatial frame treatment plan, and to transmit the treatment plan to the control unit for use in determining changes in the multiple automated strut lengths to carry out the treatment plan.

A platform configured to couple to multiple automated struts of an automated spatial frame and provide integrated connectivity to the multiple automated struts is also disclosed. In one embodiment, the platform includes at least a body with a peripheral profile, a passage formed in the body and within the peripheral profile, sockets from the passage to a boundary of the peripheral profile, wires configured to fit within the passage and extend through the sockets to which electrical connections to the multiple automated struts may be made, and mechanical couplings configured to interface with the multiple automated struts.

An alternate embodiment of an automated spatial frame is also disclosed. The automated spatial frame includes at least a first platform, multiple automated struts coupled to the first platform, the struts configured to extend and retract in response to one or more signals, a second platform coupled to the multiple automated struts, the second platform having a peripheral profile, a control unit electrically connected to one or more of the multiple automated struts, the control unit configured to provide the one or more signals to the multiple automated struts, and a power source for energizing the multiple automated struts. Some embodiments also include means for providing integrated connectivity among the multiple automated struts, the control unit, and the power source, and a computing device that executes control instructions to receive a spatial frame treatment plan, and transmit the treatment plan to the control unit for use in determining changes in the multiple automated strut lengths to carry out the treatment plan.

Embodiments of wireless intelligent automated struts are also disclosed. In use, the wireless intelligent automated struts are arranged and configured to receive and transmit data wirelessly with, for example, an external computing system such as, for example, an APP running on a mobile device. In one embodiment, the wireless automated strut includes a main body, a power source, electronic control circuitry, a motor electrically coupled to the power source, the motor and the power source being housed within the main body, a transmission coupled to an output of the motor and a rod (e.g., a threaded rod, a distraction rod, a lead screw, or the like) coupled to the transmission. The strut may also include a printed circuit board ("PCB") housed within the main body, wherein the PCB is arranged and configured to turn the motor on and off upon the strut rod (e.g., a threaded rod, a distraction rod, a lead screw, or the like) reaching a certain position. In addition, the strut may include a rotational position sensor and a linear position sensor electrically coupled to the PCB. Moreover, the strut may include self-diagnostic/status monitoring capabilities.

In another embodiment, a system is disclosed. In one embodiment, the system includes an external fixator including a plurality of wireless automated struts, a sensor located on the external fixator to provide for strut identification and a controller, the controller including a wireless communication module, memory and a processor to send or receive a treatment plan, wherein the controller communicates with the struts to command the struts to follow the treatment plan.

In another embodiment a wireless automated strut is disclosed. The wireless automated strut includes a main body, a fluid compressor, a fluid cylinder hydraulically coupled to the fluid compressor, a power source electrically coupled to the fluid compressor, a transmission, a rotational position sensor, a linear position sensor, and a PCB. The PCB may further include a voltage regulator, a transformer, an ammeter, a wireless communication module, a microcontroller, and memory, wherein the PCB actuates the fluid cylinder on and off upon the wireless automated strut reaching a certain position. In addition, the rotational position sensor and the linear position sensor may be electrically coupled to the PCB.

In another embodiment an automation kit is disclosed. In one embodiment, the automation kit includes a manual strut, including a housing, a power source, a motor electrically coupled to the power source, a rotary encoder mechanically coupled to the motor, the motor, the rotary encoder, and the power source being located within the housing, a transmission coupled to an output of the motor and a pinion gear coupled to the transmission. The automation kit may also include a PCB housed within the housing, the printed circuit board including a voltage regulator, a transformer, an ammeter, a wireless communication module, a microcontroller, and memory, wherein the PCB turns the motor on and off upon the rotary encoder reaching a certain reading.

In another embodiment a wireless automated strut is disclosed. In one embodiment, the wireless automated strut includes a main body, a power source, a motor electrically coupled to the power source, the motor and the power source being housed within the main body, a transmission coupled to an output of the motor and a distraction rod coupled to the transmission. The strut may also include a PCB housed within the main body, the PCB including a voltage regulator, a transformer, an ammeter, a wireless communications module, a load cell and accelerometer, a microcontroller, and memory, wherein the PCB turns the motor on and off upon the load cell reaching a certain value. In addition, the strut may include a rotational position sensor and a linear position sensor electrically coupled to the PCB.

Thus, as provided herein, various embodiments of an automated spatial frame is disclosed. In use, the automated spatial frame includes components that are preferably arranged and configured substantially similar in size and configuration to existing spatial frames and/or the components thereof. For example, as described herein, in one embodiment, the automated struts are provided in similar sizes to currently available manually-adjusting struts (e.g., available in extra short, short, medium, and long). Rings or other platforms are provided in shapes, sizes, and hole patterns similar to currently available rings and other platforms in order to remain compatible with other components of the external fixator, e.g. rancho cubes, U-joint assembly, shoulder bolts etc. whilst also containing needed connectivity for activation of the automated struts. For example, rings and platforms may be provided to match existing ring sizes (e.g., 80, 105, 130, 155, 180, 205, 230, 300 mm) and configurations (e.g., full ring, ⅔ ring, half ring, foot ring and U-ring). In one embodiment, a control or master module or unit and associated battery are arranged and configured to not interfere with spatial frame assembly or operation in order to maintain prescription freedom. For example, improved devices may include power and circuitry elements integrated into the spatial frame components. In addition, motorized components may be arranged and configured to be backwards compatible with existing spatial frame components.

In addition, the automated spatial frame is arranged and configured so that any external electronic components such as, for example, batteries, snagging wires/exposed cabling are eliminated, or at least greatly reduced. Moreover, as will be described herein, in one embodiment, the automated spatial frame is provided without a localized master controller such as, for example, a master controller located on top of the ring or outside of the strut housing. For example, in one embodiment, each automated strut may include its own micro-controller, thus the automated frame may be provided with distributed intelligence to process data and communicate with an external computing system or base station. Alternatively, as described herein, in another embodiment, the automated frame may include a master controller such as, for example, a Smart Ring, or a master controller integrated within a platform or ring. In either event, the automated frame is preferably provided without any, or at least minimal, external electronic components to prevent, or at least minimize, snagging. Otherwise, for example, wires running between the struts and electrical connectors would need to be designed to withstand environmental conditions. In addition, external wiring would need to run within or around the platforms, which could lead to ripping or tearing by the patient during use. In one embodiment, a retrofit kit (e.g., an adaptor) may be provided so that struts could be retrofitted to existing strut inventory.

Embodiments of the present disclosure provide numerous advantages. For example, by utilizing a motorized spatial frame, reliance on patient compliance is reduced. In addition, motorized spatial frames enable surgeons, doctors, etc. to create treatment plans with increased, smaller adjustments resulting in less painful distraction, improved quality of regenerated tissue, reduced soft tissue damage, and shorter treatment periods (e.g., by increasing the frequency or rhythm of distraction, the tension generated within the distraction gap decreases thereby reducing the consolidation period). In addition, reduced patient anxiety can be expected, and improved accurate strut adjustments can be achieved. Moreover, in accordance with one embodiment disclosed herein, by utilizing the platform as a conduit for electrically connecting a master control unit to the plurality of struts, reduced bulkiness and improved performance and wearability as compared to current systems can be achieved.

Further features and advantages of at least some of the embodiments of the present invention, as well as the structure and operation of various embodiments of the present invention, are described in detail below with reference to the accompanying drawings.

BRIEF DESCRIPTION OF THE DRAWINGS

By way of example, a specific embodiment of the disclosed device will now be described, with reference to the accompanying drawings, in which:

FIG. 4N illustrating the underlying electronics while FIG. 4O omits the underlying electronics for increased clarity;

FIG. 25 illustrates a perspective view of an embodiment of a rotary encoder or rotational position sensor that may be used in the wireless automated strut of FIG. 20 in accordance with one or more features of the present disclosure;

FIG. 26 illustrates a perspective view of an embodiment of a linear positional sensor that may be used in the wireless automated strut of FIG. 20 in accordance with one or more features of the present disclosure;

FIG. 27 is a cross-sectional view of the linear positional sensor shown in FIG. 26 mounted in the wireless automated strut of FIG. 20;

FIG. 28 illustrates a perspective view of an embodiment of a wireless communications module that may be used in the wireless automated strut of FIG. 20 in accordance with one or more features of the present disclosure;

Figure 1:
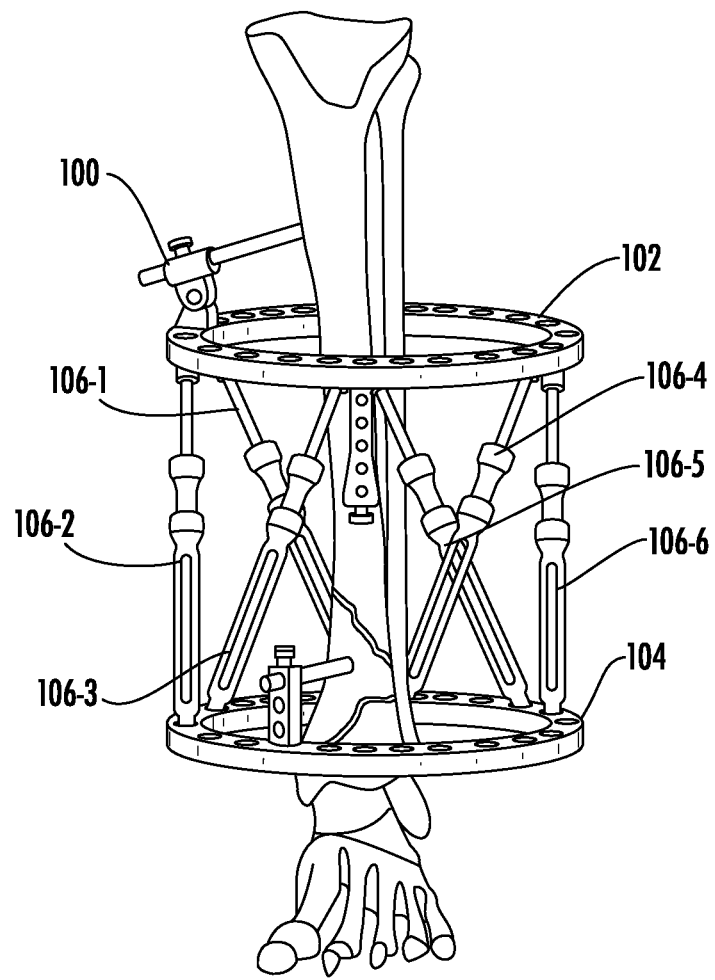
FIG. 1 illustrates an embodiment of a spatial frame.

The drawings are not necessarily to scale. The drawings are merely representations, not intended to portray specific parameters of the disclosure. The drawings are intended to depict various embodiments of the disclosure, and therefore are not be considered as limiting in scope. In the drawings, like numbering represents like elements.

DETAILED DESCRIPTION

Various features or the like of a motorized spatial frame will now be described more fully herein with reference to the accompanying drawings, in which one or more features of the spatial frame will be shown and described. It should be appreciated that the various features may be used independently of, or in combination, with each other. It will be appreciated that a spatial frame as disclosed herein may be embodied in many different forms and may selectively include one or more concepts, features, or functions described herein. As such, the spatial frame should not be construed as being limited to the specific embodiments set forth herein. Rather, these embodiments are provided so that this disclosure will convey certain features of the spatial frame to those skilled in the art. In the drawings, like numbers refer to like elements throughout unless otherwise noted.

As will be described in greater detail, in use, the spatial frame includes a plurality of motorized external fixation struts, automated struts, or the like (used interchangeably herein without the intent to limit) coupled to first and second rings, platforms, frames, bases, etc. (used interchangeably herein without the intent to limit). In use, movement of the automated struts move the first and second platforms, and hence the first and second bones, bone fragments, bone portions, etc. (used interchangeably herein without the intent to limit) coupled thereto. In accordance with one feature of the present disclosure, the automated struts are powered using a centralized, high-capacity lithium battery (e.g., a control unit, a master control unit, etc. (used interchangeably herein without the intent to limit)). The master control unit may be mounted to one of the platforms of the spatial frame. In one embodiment, the master control unit may be in the form of a "Smart Ring" and thus may be mechanically coupled to the platform (e.g., ringed-shaped platform) in a sleek, efficient profile. The centrally located master control unit may be arranged and configured to exchange data such as, for example, a prescription or treatment plan (used interchangeably herein without the intent to limit), with a remote computing system and to exchange data such as, for example, adjustment instructions, with the plurality of automated struts. In addition, the master control unit may be arranged and configured to deliver power to the plurality of automated struts. Thus arranged, the master control unit is arranged and configured to control and/or power the plurality of automated struts.

FIG. 1 illustrates an embodiment of a bone alignment device such as, for example, an external fixation system, a spatial frame, a hexapod, etc. 100 (used interchangeably herein without the intent to limit). As shown in FIG. 1, the spatial frame 100 may form a hexapod having a circular, metal frame with a first platform 102 and a second platform 104 connected by six adjustable length struts 106 (labeled as struts 106-1 through 106-6 in FIG. 1). Each strut 106 may be independently lengthened or shortened relative to the rest of the frame, thereby allowing for six different axes of movement.

In one embodiment, each strut 106 may include an outer body and an inner rod, which may be configured as, or be operatively coupled to, a threaded rod. The outer body may be coupled to one of the platforms, such as, the second platform 104 by way of a joint as shown. The inner rod may be coupled to the other platform, such as, the first platform 102 by way of a joint as shown. To lengthen or shorten one of struts 106, the outer body and the inner rod may be moved or translated relative to one another.

The spatial frame 100 may be used to treat a variety of skeletal fractures of a patient. Typically, the spatial frame 100 is positioned around the patient and is used to align two or more bones. To do so, a length of each strut 106 may be incrementally adjusted (e.g., shortened or lengthened) in accordance with a treatment plan that specifies adjustments to be made to each strut 106 over time to ensure successful bone alignment. In many instances, the length of each strut 106 should be adjusted daily to comply with the provided treatment plan. Adjusting the length of each strut 106 adjusts the distance between the first and second platforms 102 and 104.

In accordance with one of the features of the present disclosure, an improved automated strut will be described and illustrated. In use, the automated struts may include a motor and may be used in a spatial frame to move the first and second platforms, respectively, to align two or more bones. As will be described herein, in one embodiment, the automated struts may also include distributed intelligence and transmit and receive data wirelessly from a mobile app or an external computing system, and thus may be referred to as wireless automated struts. For example, in one embodiment, each automated strut may include a micro-controller arranged and configured to control operation of the strut and a wireless transceiver arranged and configured to receive instructions/data, and to transmit sensed data to, for example, a mobile app or an external computing system.

In accordance with one of the features of the present disclosure, a spatial frame and/or system architectural will be described and illustrated. In use, the spatial frame and/or system architectural is arranged and configured to automatically adjust the automated struts according to the prescribed treatment plan (e.g., automatically adjust the plurality of automated struts without patient intervention—manual adjustments of each of the plurality of struts via a wrench is not required).

In one embodiment, the spatial frame may be arranged to intermittently auto-adjust the automated struts at predetermined times according to the treatment plan. Alternatively, the spatial frame may be arranged to intermittently auto-adjust the automated struts at select times when convenient and/or selected by the patient. Alternatively, the spatial frame may be arranged and configured to continuously auto-adjust the automated struts in small discrete increments. In either event, by providing an automated, auto-adjusting spatial frame (e.g., a motorized, auto-adjusting spatial frame), the automated struts may be adjusted in higher frequency, smaller discrete increments thereby facilitating clinical advantageous as previously discussed.

In one embodiment, the spatial frame in accordance with the present disclosure includes, first and second platforms, a plurality of automated struts coupled to the first and second platforms, and a master control unit arranged and configured to communicate with the automated struts. In one embodiment, the master control unit is arranged and configured to supply power to the automated struts and to exchange (e.g., receive and/or transmit) data with the automated struts.

Figure 2:
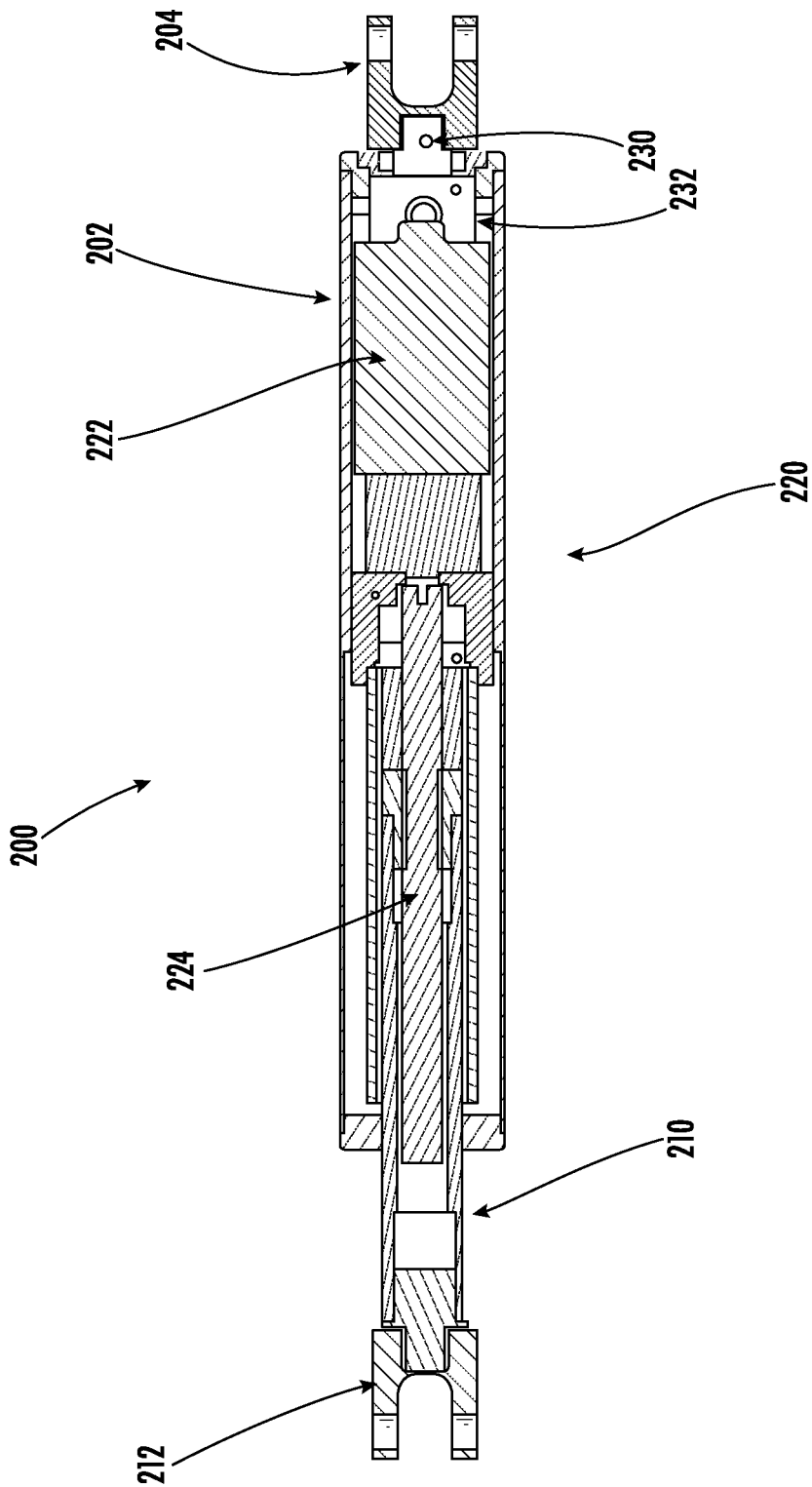
FIG. 2 illustrates a cross-sectional view of an embodiment of an automated strut that may be used in a spatial frame in accordance with one feature of the present disclosure.

Referring to FIG. 2, an embodiment of an automated strut 200 is disclosed. In use, the automated strut 200 may be coupled to first and second platforms in a spatial frame. For example, the automated strut 200 may be used in place of the struts 106 shown in FIG. 1. As shown in FIG. 2, the automated strut 200 may include an outer body 202 operatively coupled with a first joint 204 for coupling to a first platform, an inner body 210 operatively coupled with a second joint 212 for coupling to a second platform, and a drive mechanism, actuator, etc. 220 (used interchangeably herein without the intent to limit). In use, actuation of the drive mechanism 220 moves the inner body 210 relative to the outer body 202 to adjust a length of the automated strut 200.

The first and second joints 204, 212 may have any suitable configuration now known or hereafter developed such as, for example, shoulder bolts, U-joints, etc. In use, the first and second joints 204, 212 are arranged and configured to couple the automated struts to the platforms at predefined locations as will be appreciated by one of ordinary skill in the art.

In one embodiment, the drive mechanism 220 may include a motor 222 and a threaded rod 224 arranged and configured so that, in use, actuation of the motor 222 rotates the threaded rod 224 for moving the inner body 210 relative to the outer body 202. In addition, the drive mechanism 220 may include one or more gears to adjust speed and torque of the motor 222.

In addition, the automated strut 200 may include any required circuitry. For example, the strut 200 may include one or more position sensors to, for example, monitor absolute position or length of the strut 200. In addition, and/or alternatively, the strut 200 may include other sensors for monitoring various biomechanical parameters such as, for example, a force sensor 230 for monitoring stresses and forces, across the bone gap and/or the soft tissues (muscle, apposing cartilage or peripheral sensory nerves), a sensor motor support 232, etc. In addition, and/or alternatively, the strut 200 may include an encoder such as, for example, a rotary encoder for measuring rotation of the motor 222. In one embodiment, a relative encoder can be adapted to become an absolute encoder electronically to control strut movement at any given time assuming there is no slippage in the drive train/gear mechanism. This is achieved by using the master control unit to read the output of the encoder such that it is logging its status directly into non-volatile memory continuously.

In addition, and/or alternatively, the strut 200 may include memory for storing unique identifiers (e.g., addresses) as will be described in greater detail below, for storing current position, etc.

As will be described in greater detail below, in accordance with one features of the present disclosure, the automated struts 200 are arranged and configured to receive power and to exchange data with a master control unit. In one embodiment, the automated struts 200 may be operatively coupled to the master control unit via, for example, a hardwired connection, although it is envisioned that the automated struts may receive power and/or exchange data with the master control unit by any other suitable mechanism now known or hereafter developed including, for example, wireless power and/or data transmission as will be described in greater detail below in connection with alternate embodiments. In any event, as will be described in greater detail, the automated struts 200 may be arranged and configured to be operatively couple to the master control unit for receiving power, exchanging data, or a combination thereof.

By arranging the automated struts 200 so that they receive power from the master control unit, the automated struts 200 need not incorporate individual power supplies (e.g., a battery, etc. as such each automated strut 200 may be battery-less or devoid of any power supply), although it is envisioned that the automated struts may incorporate a power supply unit (e.g., battery) as will be described in greater detail below in connection with alternate embodiments. By providing a battery-less automated strut, design and manufacture of the struts is simplified thereby minimizing, or at least reducing, strut complexity and thus likelihood that individual struts will fail.

Figure 6:
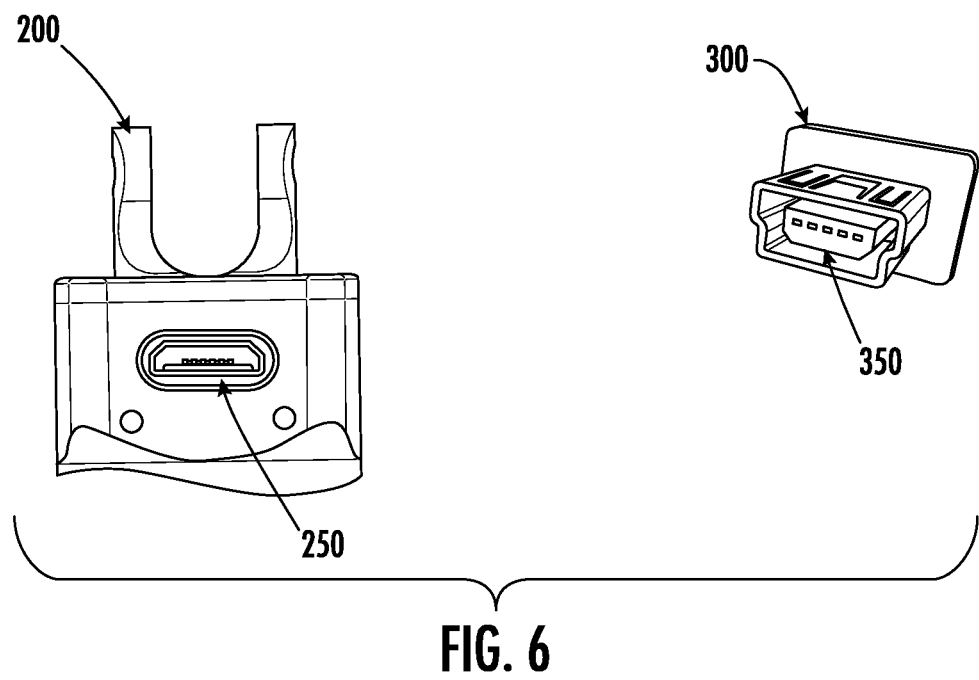
FIG. 6 illustrates various perspective views of embodiments of a micro-USB styled connector for coupling the automated struts with the master control unit in accordance with one feature of the present disclosure.

As will be described in greater detail below, the automated struts 200 may include a communications interface for coupling to the master control unit, either directly or via a platform, or in a daisy-chain manner to other automated struts. In use, in one embodiment, the communication interface may be used to exchange data with the master control unit and/or to receive power from the master control unit. The communication interface may be any suitable interface now known or hereafter developed. For example, as illustrated in FIG. 6, in one embodiment, the communication interface 250 may be in the form of a micro-USB styled connector, or other similarly styled connector, as will be described in greater detail. In one embodiment, as represented in FIG. 6, the communication interface 250 may be positioned in a side surface or wall of the strut 200. In use, as will be described in greater detail, the communication interface 250 may be arranged and configured to receive a wire having a corresponding plug for interfacing with the master control unit. Alternatively, it is envisioned that the communication interface 250 and wire may be arranged and configured to extend through the joint 204. However, it is envisioned that other styled connectors may be used and that the communication interface may be positioned in any suitable position on the strut.

In addition, and/or alternatively, in one embodiment, the automated struts 200 may be water-proofed to facilitate the patient, for example, taking a shower or bath. For example, bellows may be coupled to the ends of the struts or the individual external housing components of the strut may be sealed with O-rings. Alternatively, it is envisioned that the automated struts and/or the spatial frame may be covered by, for example, a bag during a shower thus alleviating the necessity for water-proofing each of the automated struts.

As will be described herein, the spatial frame and corresponding system architectural according to the present disclosure may be used with any suitable automated strut now known or hereafter developed. In this regard, the present disclosure should not be limited to the details of the automated strut disclosed and illustrated herein unless specifically claimed. Rather, it should be understood that any suitable automated strut may be used in connection with the principles of the present disclosure.

As previously mentioned, the spatial frame may also include a master control unit. As will be described in greater detail, in one embodiment, the master control unit is designed to control the movements and manage the power requirements of the automated struts such as, for example, automated struts 200. That is, for example, the master control unit may be arranged and configured as a centralized controller to control each of the plurality of struts.

In use, the master control unit includes any circuitry necessary to control actuation of the automated struts. For example, in one embodiment, the master control unit includes one or more processors, controllers, or the like for implementing the treatment plan (e.g., controlling/providing data such as, for example, adjustment instructions to each of the automated struts). In addition, the master control may include memory for storing information such as, for example, treatment plan information, strut information including unique identifiers or addresses for each of the struts, target strut length for each of the struts, absolute strut length for each of the struts, lengthening direction for each of the struts, rate of distraction for each of the struts, rhythm and/or timing of distraction for each of the struts, total amount of distraction for each of the struts, lengthening schedule, number of motor turns, force exerted, etc. In addition, the master control may include a real-time clock. Additionally, as will be described in greater detail below, the master control may include a communication interface for connecting to at least one of the automated struts. In addition, as will be described in greater detail below, the master control may include a second communication interface for communicating with an external computing system.

In one embodiment, the master control unit may be arranged and configured to synchronize movements of the struts. For example, the master control unit may be arranged and configured to control each strut simultaneously or individually. Alternatively, the master control unit may be arranged and configured to control each strut sequentially (e.g., the master control unit may be arranged and configured to control (adjust) each of the struts sequentially (e.g., one at a time), or in any combination thereof).

In some embodiments, the automated struts may be arranged and configured to transmit data to the master control unit. For example, the struts may include one or more sensors for transmitting data pertaining to strut position, forces acting upon the strut, motor temperature, motor current, etc. to the master control unit.

In addition, in some embodiments, the master control unit may include a power supply unit for supplying power to the internal electronics (e.g., micro-processor, communication transceivers, memory, etc.) and for delivering power to each of the automated struts to power the motors of the automated struts to adjust the length of the struts and to power internal circuitry contained within the struts. In one embodiment, the power supply unit is a lithium battery. In one embodiment, the lithium battery may be removable from the master control unit to facilitate charging of the battery while enabling the master control unit to remain mounted to the platform of the spatial frame.

Figure 3A:
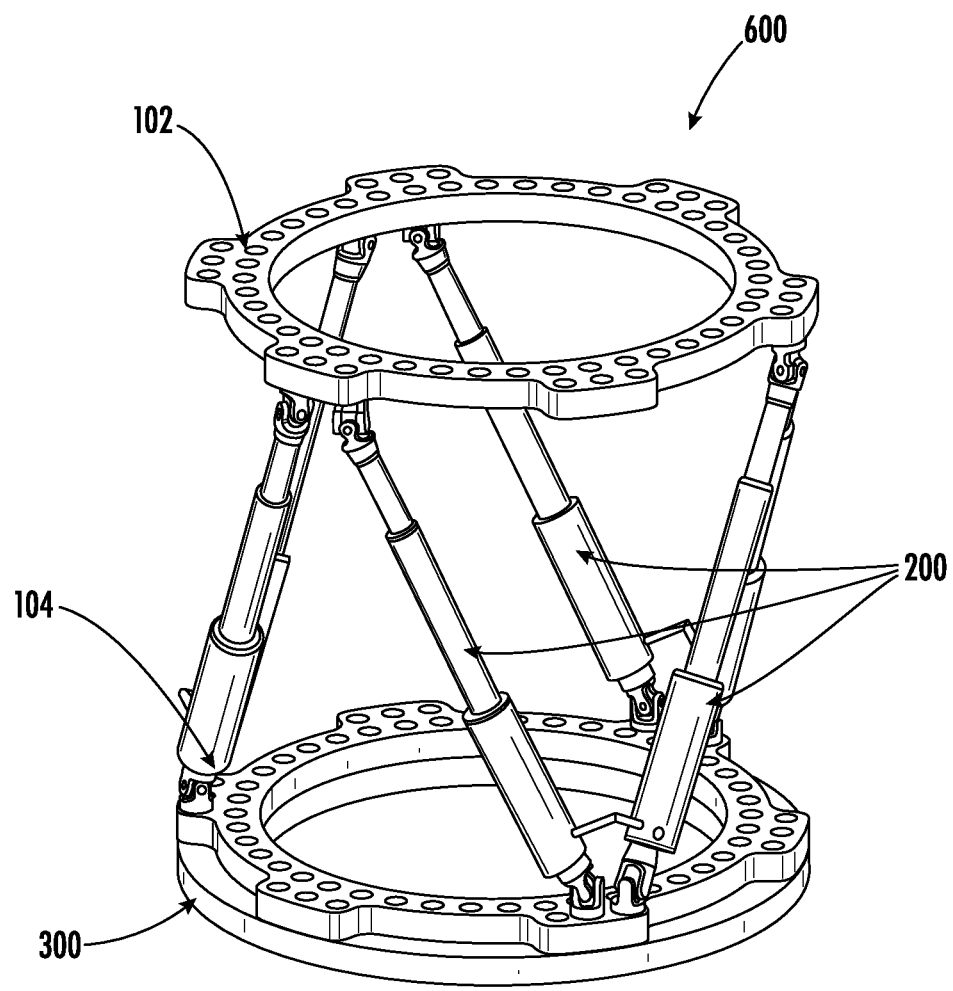
FIG. 3A illustrates a perspective view of an embodiment of an automated spatial frame in accordance with one or more features of the present disclosure, the automated spatial frame including a master control unit coupled to a platform (e.g., a ringed-shaped platform) of the spatial frame.
Figure 3B:
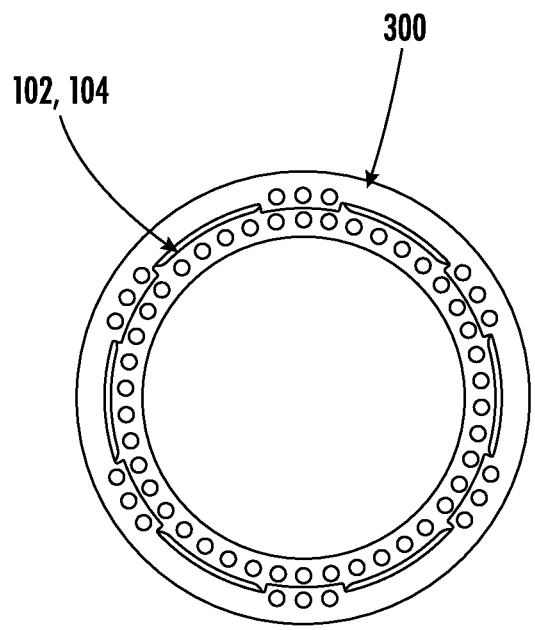
FIG. 3B illustrates a top view an alternate embodiment of a master control unit that may be coupled to a platform (e.g., a ringed shaped platform) of the spatial frame of FIG. 3A.
Figure 3C:
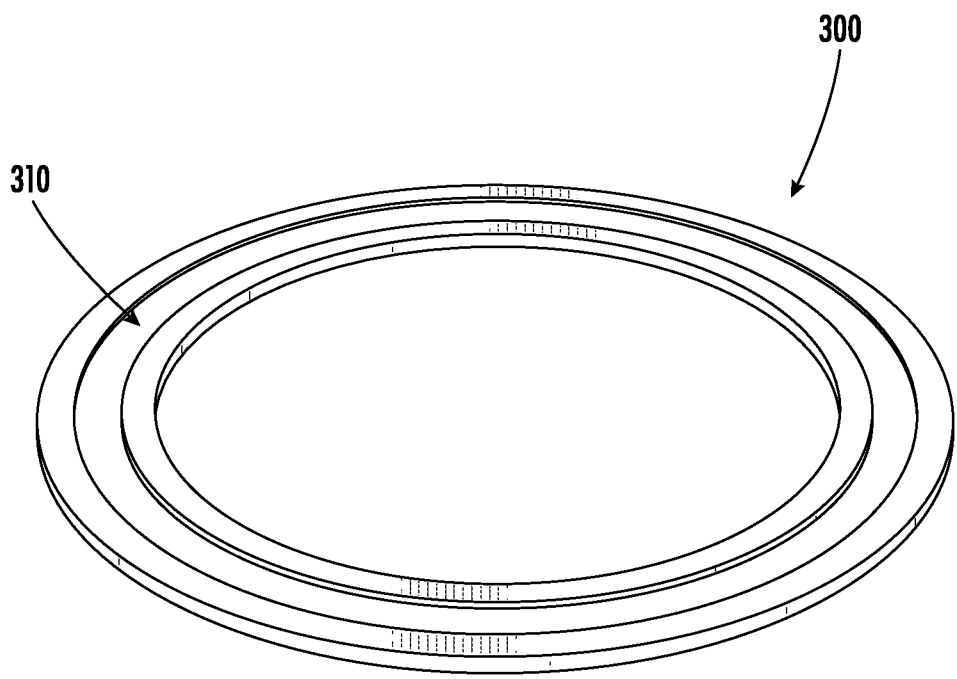
FIG. 3C illustrates an alternate embodiment of a master control unit having a removable power supply unit in accordance with one feature of the present disclosure, the master control unit may be coupled to a platform (e.g., a ringed shaped platform) of the spatial frame of FIG. 3A.

In accordance with one feature of the present disclosure, referring to FIGS. 3A-3C, an embodiment of an automated spatial frame 600 is disclosed. As illustrated, the automated spatial frame 600 may include first and second platforms, such as, for example, platforms 102, 104, a plurality of automated struts 200, and a master control unit 300. As shown, the master control unit 300 is arranged and configured to be coupled to one of the first and second platforms 102, 104, shown as second platform 104, although it will be appreciated that the master control unit 300 could be coupled to the first platform 102. For example, the master control unit 300 may be mechanically coupled to one of the first and second platforms 102, 104 by any suitable mechanism now known or hereafter developed including, for example, via fasteners, clips, etc.

Referring to FIGS. 3A-3C, in one embodiment, the master control unit 300 may be arranged and configured as a ring arranged and configured to be coupled to an external surface of a platform 102, 104 of the automated spatial frame 600. As illustrated, the master control unit 300 may have a size and shape substantially similar to the size and shape of the platforms 102, 104. For example, referring to FIG. 3A, in one embodiment, the master control unit 300 may be arranged and configured to be mounted to one of the platforms such as, for example, one of the first and second platforms 102, 104. As illustrated, the master control unit 300 may be positioned slightly above or below the coupled platform 102, 104 or be arranged and configured to sit on the coupled platform 102, 104. Alternatively, referring to FIG. 3B, in one embodiment, the master control unit 300 may be arranged to encompass, encircle, or the like, the coupled platform 102, 104. As such, when coupled, the master control unit 300 may be substantially coplanar with the coupled platform 102, 104 (e.g., the top and bottom surfaces of the master control unit 300 may be substantially coincident or flush with the top and bottom surface of the coupled platform 102, 104). In either event, the master control unit 300 is arranged and configured to be positioned adjacent to the coupled platform, either flush with or slightly above or below, to avoid, or at least greatly minimize, interference with the construction of the spatial frame 600.

Referring to FIG. 3C, as will be described in greater detail, in one embodiment, the master control unit 300 may be in the form of a ring or other suitable shape for mounting onto the platform (e.g., ring-shaped platform) of the spatial frame 600 such as, for example, one of the first and second platforms 102, 104 of spatial frame 600. In one embodiment, the power supply unit (e.g., battery) 310 may have a similar shape as the master control unit 300. In use, the power supply unit (e.g., battery) 310 may be detachable from the master control unit 300 to facilitate charging, although it should be understood that other shapes and configurations are envisioned and that the power supply unit (e.g., battery) 310 need not have a shape corresponding to that of the master control unit 300. Alternatively, the power supply unit (e.g., lithium battery 310) may be fully integrated within the master control unit 300. However, it is envisioned that alternate power supply units may be utilized including, for example, plug-in power cord, energy harvesting units such as, for example, piezoelectric units, solar, or the like. By providing a single power supply 310 within the master control unit 300, the size and complexity of the automated struts 200 may be reduced, simplified, etc.

Figure 4A:
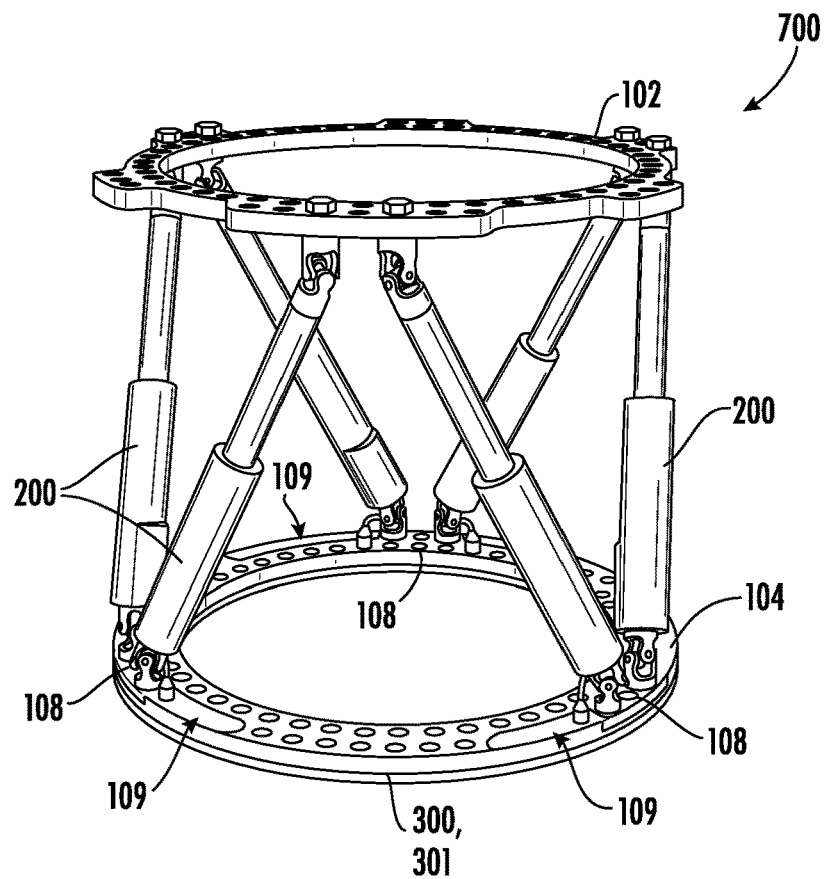
FIG. 4A illustrates a perspective view of an alternate embodiment of an automated spatial frame including a Smart Ring (e.g., an integrated master control unit and power supply) arranged and configured to be positioned within pockets formed in between adjacent tabs on a platform in accordance with one or more features of the present disclosure.
Figure 4B:
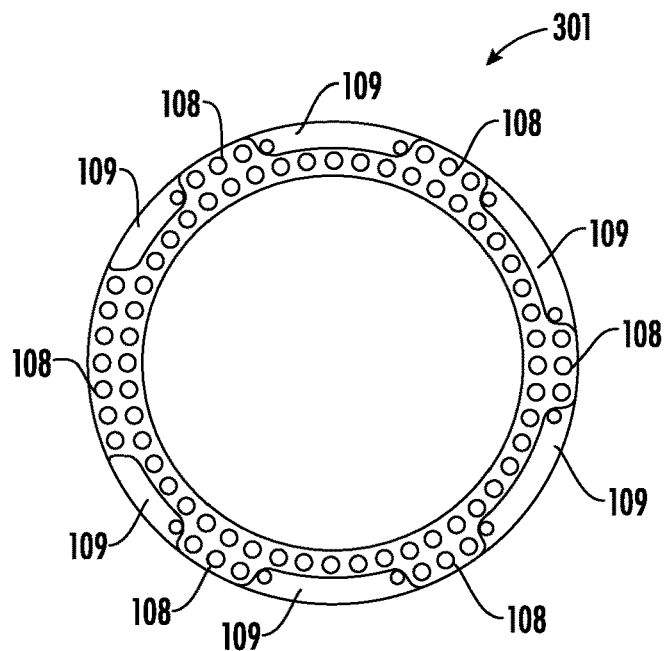
FIG. 4B illustrates a top view of the Smart Ring of FIG. 4A.
Figure 4C:
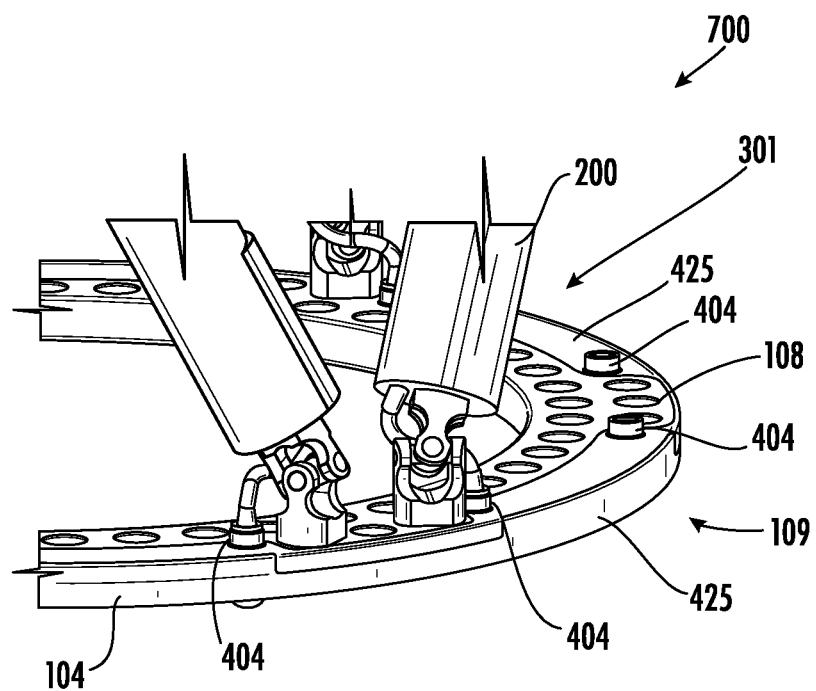
FIG. 4C illustrates a detailed perspective view of the Smart Ring of FIG. 4A.
Figure 4D:
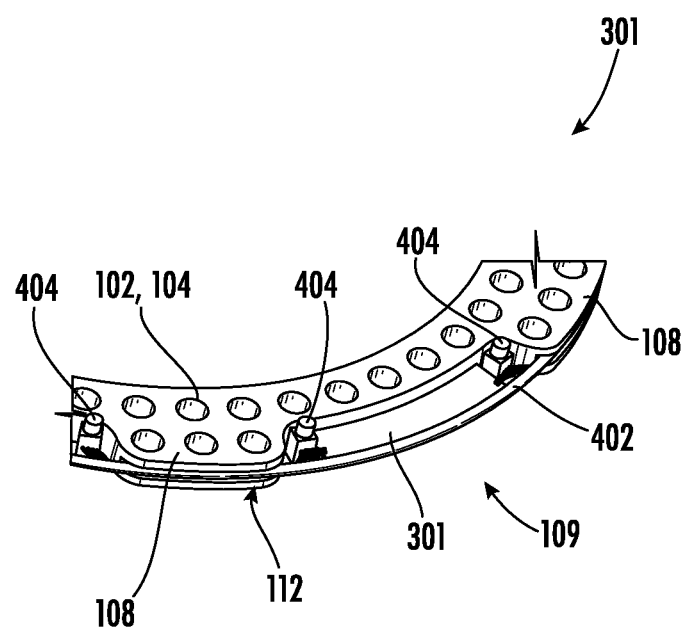
FIG. 4D illustrates a detailed perspective view of the Smart Ring unit of FIG. 4A.

In accordance with one feature of the present disclosure, referring to FIGS. 4A-4D, an alternate embodiment of an automated spatial frame 700 is disclosed. As illustrated, the automated spatial frame 700 may include first and second platforms, such as, for example, platforms 102, 104, a plurality of automated struts 200, and a master control unit 300. As illustrated, the master control unit and the power source (e.g., batteries) may be arranged and configured to be positioned or housed in the redundant pockets or spaces 109 existing between adjacent ring tabs 108 formed in one or both of the platforms (shown as platform 104). Thus arranged, the master control unit 300 may be referred to as a "Smart Ring" 301 (e.g., the Smart Ring 301 encompassing the platform, power supply, and master control unit). In use, the "Smart Ring" 301 may be arranged and configured to substantially match the existing profile of a standard ring or platform while providing or incorporating a centrally located master control unit and an integrated power supply arranged and configured to provide localized intelligence to supply data and/or power to each of the plurality of automated struts 200. In addition, as mentioned herein, the Smart Ring 301 may incorporate integrated connectivity to enable connection between the centrally located master control unit and the automated struts 200. For example, as best illustrated in FIG. 4D, a wire loom or cable 402 arranged and configured to provide data and/or power to the automated struts 200 is arranged and configured to be circumferentially positioned in a groove 112 formed in the outer surface of the platform 102, 104 and/or the Smart Ring 301. In one embodiment, the wire loom or cable 402 may be arranged and configured with local terminations 404 (FIG. 4C) at each of the six tabs 108.

Figure 4E:
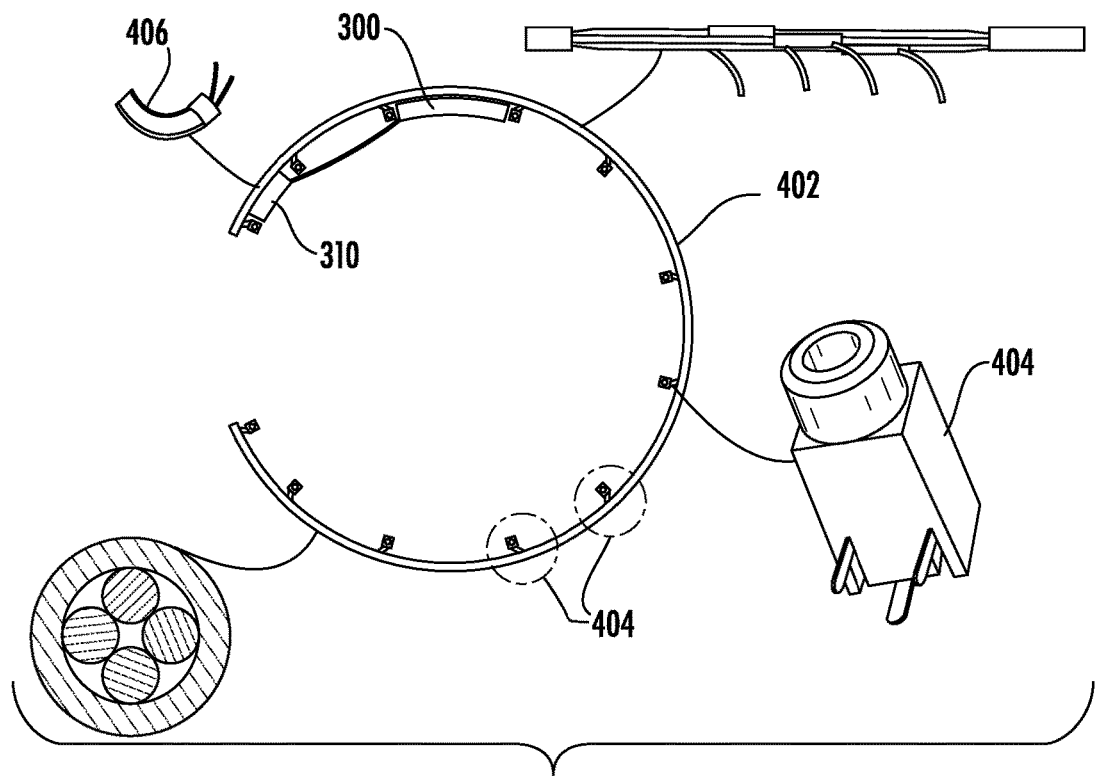
FIG. 4E illustrates an embodiment of a wire loom arranged and configured to provide electrical connectivity within a Smart Ring in accordance with one feature of the present disclosure.

With continued reference to FIGS. 4C and 4D and with additional reference to FIG. 4E, in one embodiment, the wire loom or cable 402 may include four (4) internal wires (e.g., GRND, Vcc, Data+, and Data−) to provide electrical connectivity within the Smart Ring 301 (e.g., master control unit 300 and battery(s) 310) and to the automated struts 200. Thus, in use, the internal wires of the wire loom 402 may be connected to the master control unit 300, battery(s) 310, and automated struts 200 for transferring data and/or power. In use, the internal wires of the wire loom 402 may be connected to the master control unit 300, battery(s) 310, and automated struts 200 by any suitable method now known or hereafter developed. For example, in one embodiment, the wire loom 402 may include a plurality of local terminations or connectors 404 for coupling to the automated struts 200. In addition, the wire loom 402 may include a plurality of battery connectors 406 for coupling to the battery 310 and/or master control unit 300. As illustrated, in one embodiment, the wire loom 402 may include a total of fourteen (14) connectors. In use, as schematically illustrated, the wire loom 402 may be spliced via, for example, mid-wire stripping, to couple each of the internal wires with the connectors 404 to transmit data and/or power with the automated struts 200. In one embodiment, the connectors 404 may be in the form of, for example, jack connectors (as illustrated), surface mount connectors, panel mount connectors, or the like for coupling with the automated struts 200. The remaining two connectors 406 may be arranged and configured to couple with the battery 310 and master control unit 300. In one embodiment, for example, the internal wires (e.g., GRND, Vcc) may be spliced and coupled to the battery.

As illustrated, in one embodiment, the wire loom 402 may be arranged in a semi-circle so that it can be received within the groove 112 of the tab 108 in the platforms 104 (as illustrated in FIG. 4D).

Figure 4F:
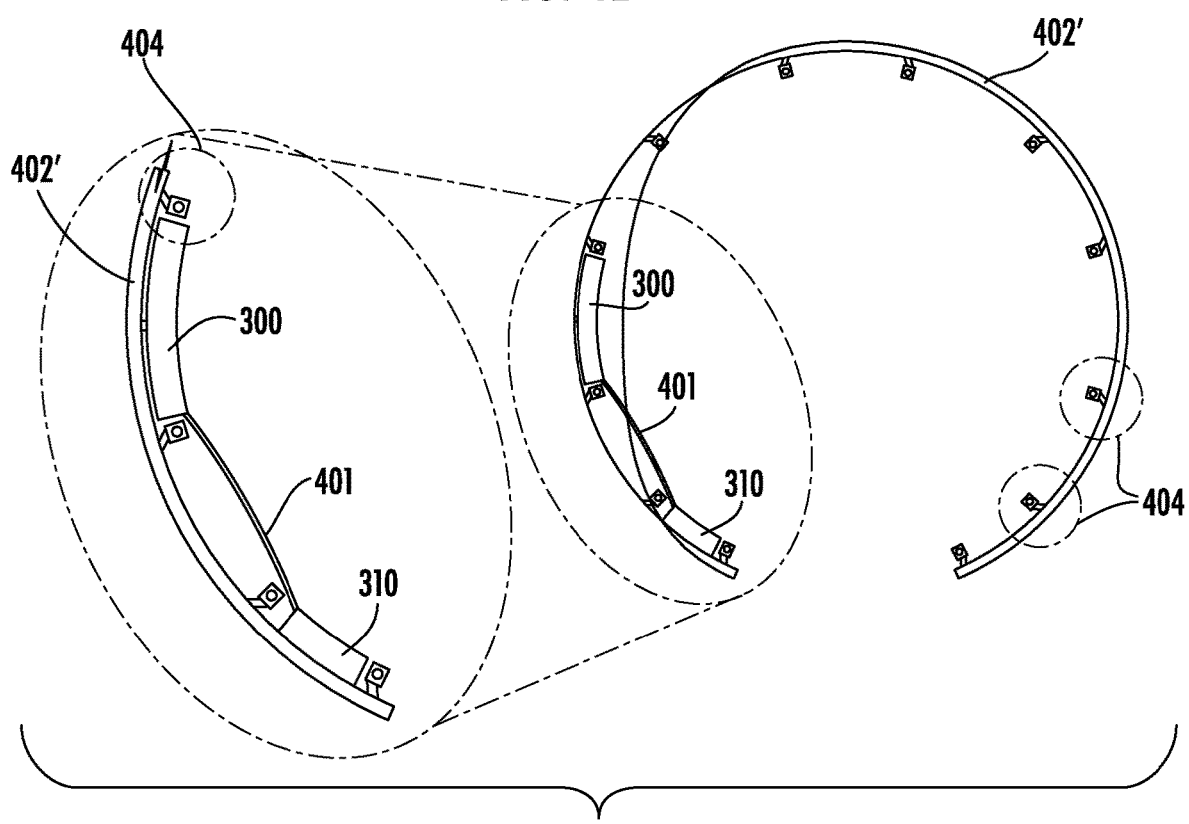
FIG. 4F illustrates an alternate embodiment of a wire loom arranged and configured to provide electrical connectivity within a Smart Ring in accordance with one feature of the present disclosure.

Alternatively, with reference to FIG. 4F, an alternate embodiment of a wire loom 402' is illustrated. In use, the wire loom 402' is substantially similar to the wire loom 402 described above except that the battery 310 may be connected directly to the master control unit 300 instead of via the wire loom 402. For example, as illustrated, the battery 310 may be directly coupled to the master control unit 300 via a cable 401.

Figure 4G:
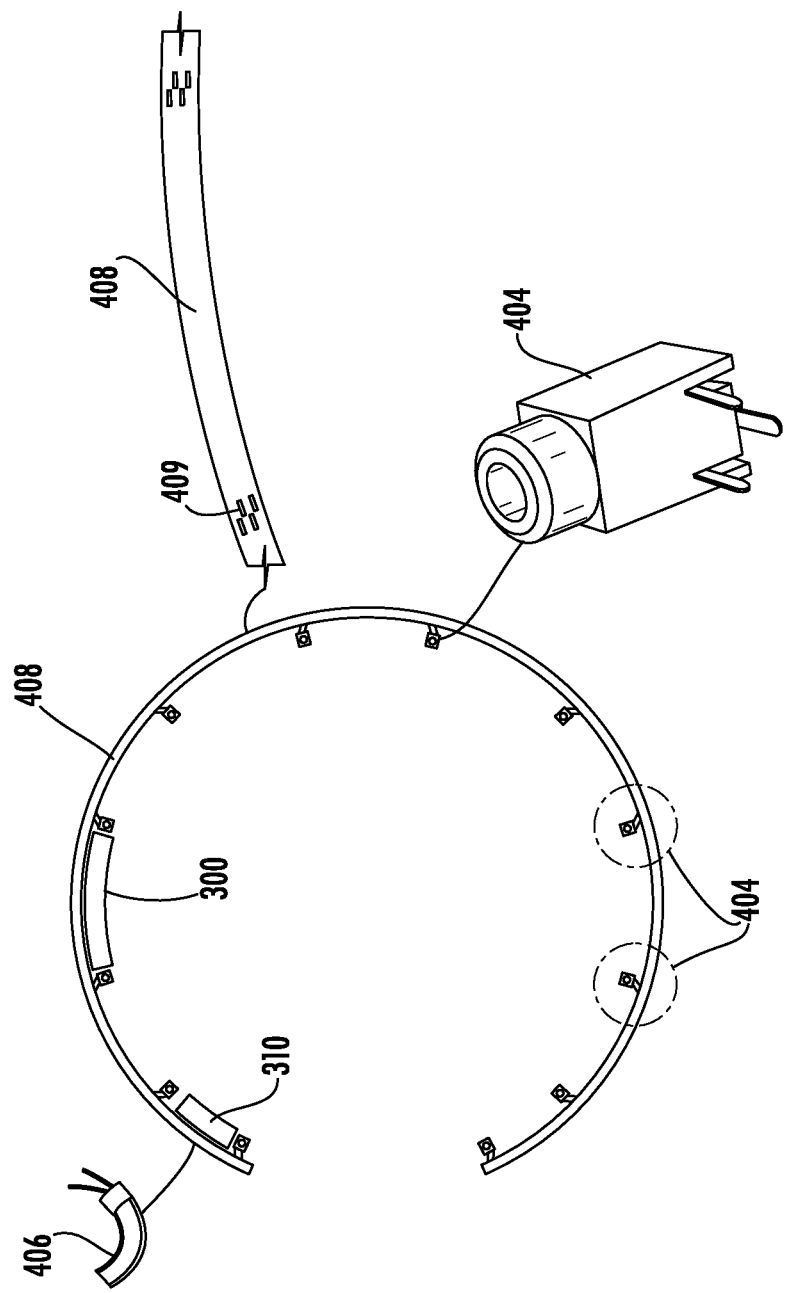
FIG. 4G illustrates an embodiment of a flexi-PCB arranged and configured to provide electrical connectivity within a Smart Ring in accordance with one feature of the present disclosure.

Alternatively, with reference to FIG. 4G, in an alternate embodiment, a single flexi-PCB 408 may be used in place of the wire loom 402 to provide electrical connectivity. In use, the flexi-PCB 408 may be substantially similar to the wire loom 402 described above, except as described herein. In use, a flexible PCB 408 is used in place of the cables of the wire loom 402. In use, the flexi-PCB 408 may be arranged and configured to provide electrical connectivity within the Smart Ring 301 (e.g., master control unit 300 and battery(s) 310) and to the automated struts 200. Thus, in use, the flexi-PCB 408 may be connected to the master control unit 300, battery(s) 310, and automated struts 200 for transferring data and/or power. In use, the flexi-PCB 408 may be connected to the master control unit 300, battery(s) 310, and automated struts 200 by any suitable method now known or hereafter developed. For example, in one embodiment, the flexi-PCB 408 may include a plurality of solder pads 409 (e.g., four (4) solder pads) at each location for coupling with the connectors 404 for coupling to the automated struts 200. In addition, the flexi-PCB 408 may include a plurality of battery connectors 406 for coupling to the battery 310 and/or master control unit 300. As illustrated, in one embodiment, the flexi-PCB 408 may include a total of fourteen (14) connectors. In one embodiment, the flexi-PCB 408 may be provide with a 3.8 mm thickness. In use, the thickness of the flexi-PCB 408 may be narrowed to approximately 1.3 mm so that the flexi-PCB 408 can be made to fit in a groove formed in each of the tabs 108 of the platforms 104. By utilizing the flexi-PCB 408, a smaller sized option can be used as compared to the wire loom 402. In addition, easier assembly is created.

In use, the Smart Ring 301 including the master control unit 300, the power source (e.g., batteries) 310, and the wire loom or cable 402 or flexi-PCB 408 may be hermetically sealed using any suitable method and/or material now known or hereafter developed such as, for example, a press-fit plastic or metal lid or a biocompatible potting compound (e.g., medical grade epoxy, silicone elastomer, polyurethane material, etc.). For example, as illustrated in FIG. 4C, a lid 425 may be utilized to seal the pockets or spaces 109 existing between adjacent ring tabs 108. Thus arranged, the data and power connections, wires, or cables routed or passing through the platform are located substantially within the peripheral profile of the platform.

Figure 4H:
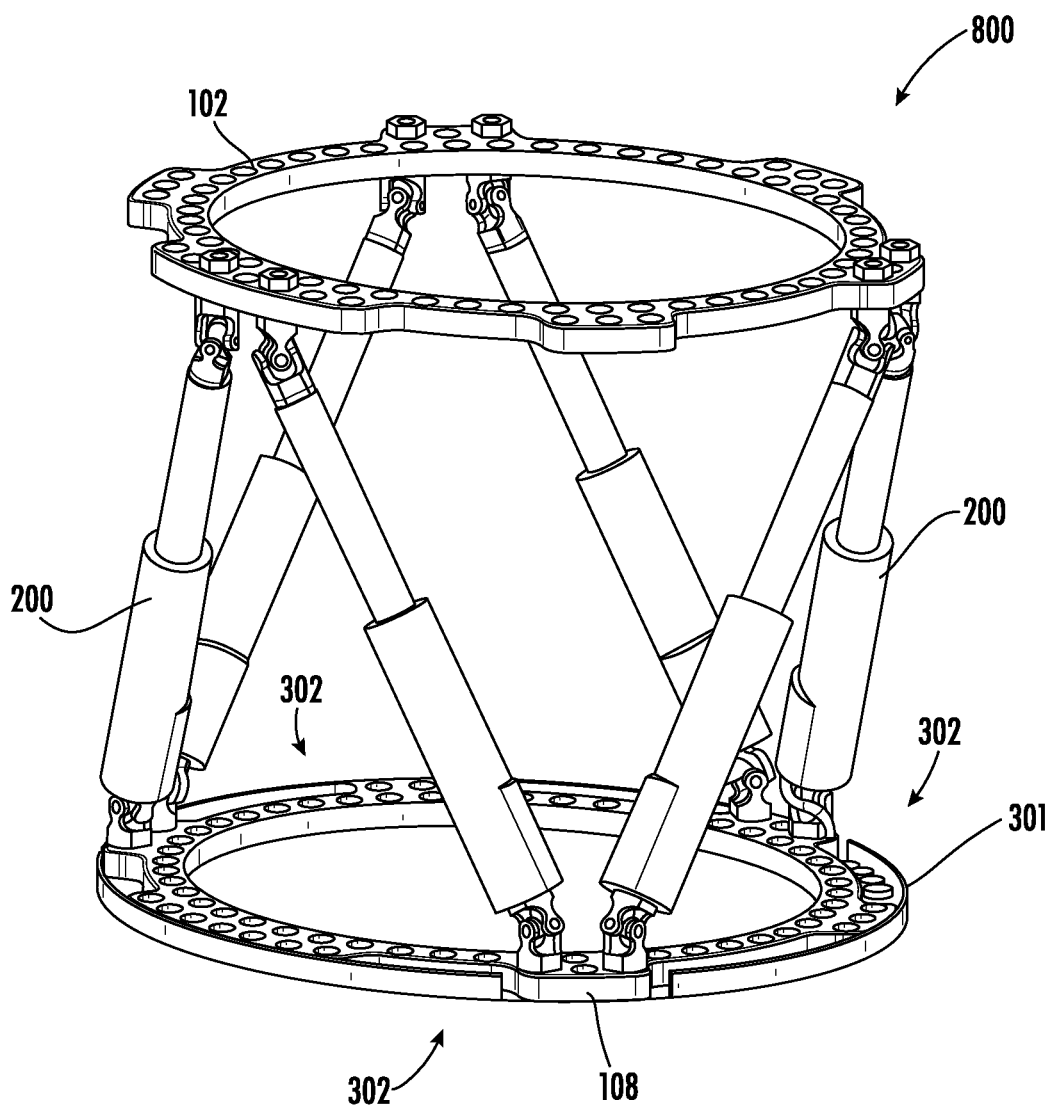
FIG. 4H illustrates a perspective view of an alternate embodiment of an automated spatial frame including a Smart Ring (e.g., an integrated master control unit and power supply) arranged and configured to be positioned within pockets formed in between adjacent tabs on a platform in accordance with one or more features of the present disclosure.
Figure 4I:
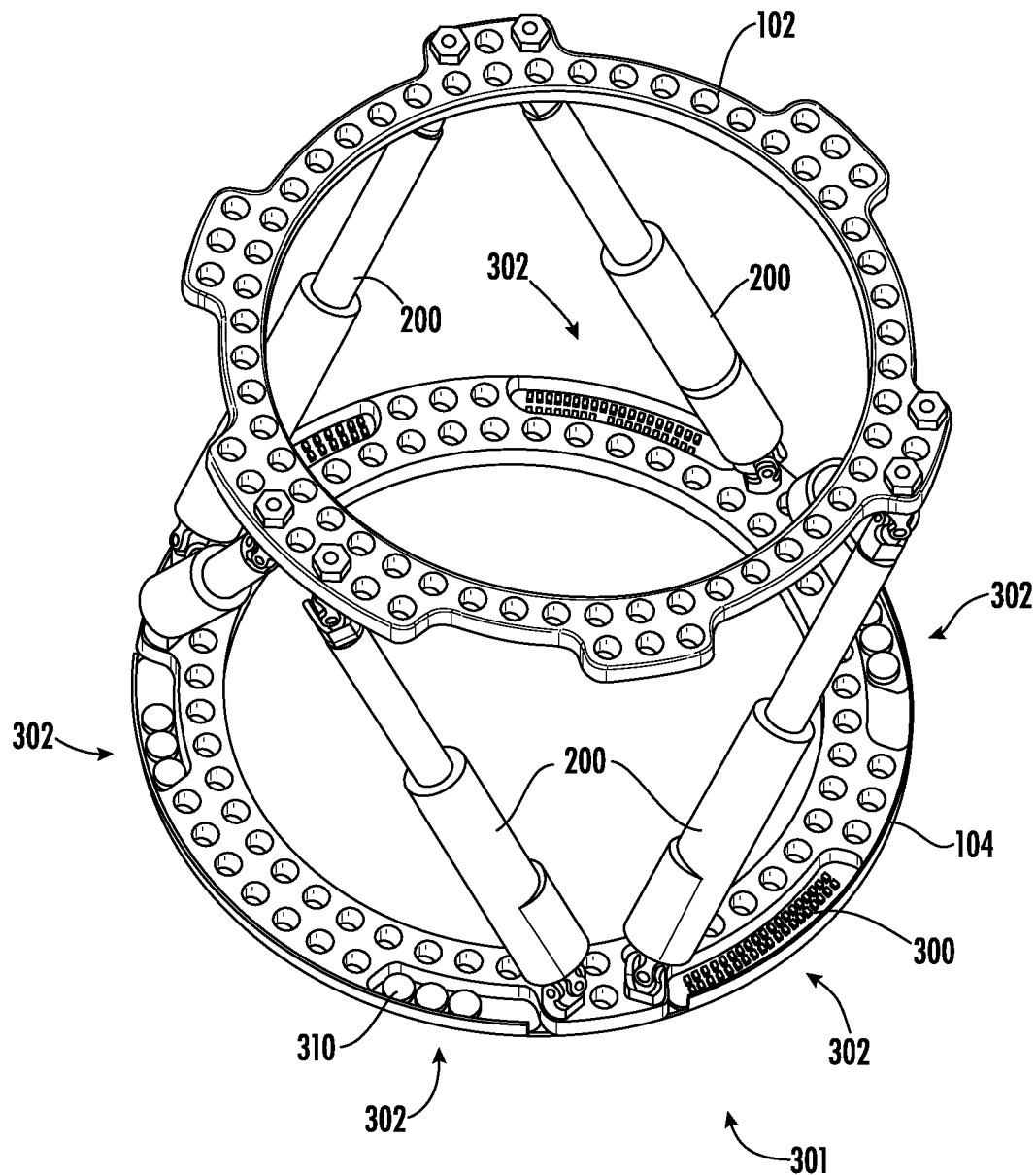
FIG. 4I illustrates a top, perspective view of the automated spatial frame including the Smart Ring shown in FIG. 4H.

Referring to FIGS. 4H and 4I, a perspective view of an embodiment of an automated spatial frame 800 is disclosed. In use, as described in greater detail herein, the automated spatial frame 800 includes a platform such as, for example, platform 102, a plurality of automated struts 200, and a Smart Ring 301 incorporating a master control unit 300, a power supply 310, and integrated connectivity. In one embodiment, as illustrated, the Smart Ring 301 may include a plurality of PCB pockets 302 positioned between the tabs 108 formed in the platform. As illustrated, in one embodiment, the master control unit 300 and power supply (e.g., batteries) 310 may be housed in PCB pockets 302 positioned between the ring tabs 108. For example, in one embodiment, the Smart Ring 301 may include three (3) PCB pockets 302 with each PCB pocket 302 including the needed circuity, power, and connectivity to control two (2) automated struts 200. In one embodiment, as illustrated, each of the PCB Pocket 302 may be positioned on either side of one of the tabs 108. As such, the plurality (e.g., three) of independent PCBs may be independently powered by a plurality of power supplies such as, for example, three-coin cells. In use, the power supplies may be arranged and configured to provide 90 mAh capacity. In one embodiment, the encoder may run on a different power supply than the motor.

In connection with the Smart Ring 301 of the automated spatial frame 800, the connectors for supplying power and/or data to the automated struts 200 may be in the form of pogo pin connector and socket assemblies, as will be described in greater detail herein. Thus arranged, in contrast to the jack plug connectors previously described, pogo pin connector and socket assemblies are arranged and configured to provide six wire connections to the automated struts 200. In addition, pogo pin connector and socket assemblies are designed and configured to eliminate, or at least greatly minimize, any bulges that may cause interference with other components of the automated spatial frame 800. In addition, incorporation of pogo pin connector and socket assemblies are arranged and configured to provide a more forgiving connector in terms of location or positioning. That is, in use, pogo pin connector and socket assemblies minimize the need for the socket component from the strut 200 to precisely line up with the connector component or contacts on the ring PCB. In use, it is enough that the pads contact the pins/contacts and the spring contact from the pins ensure good electrical connection.

Figure 4J:
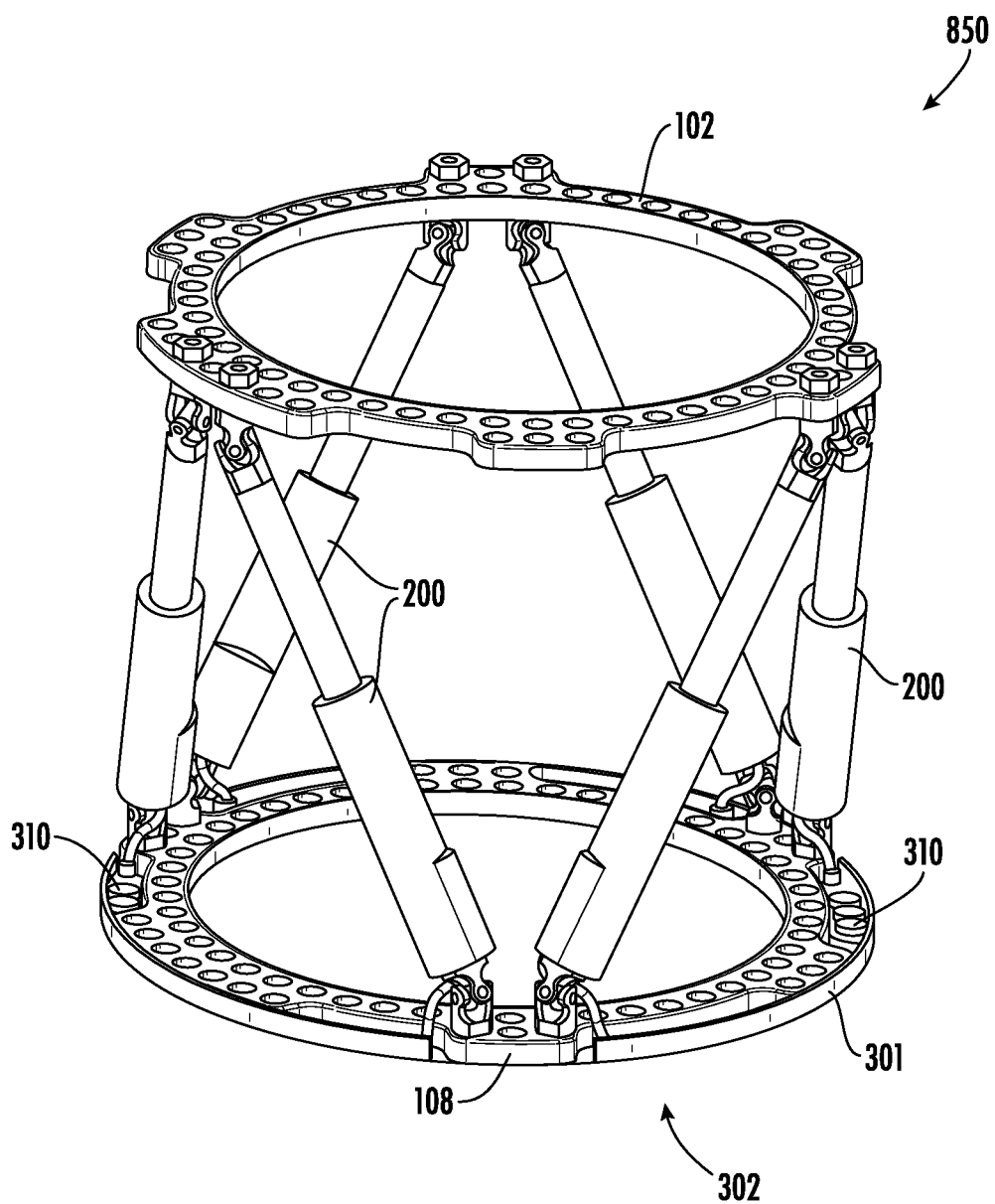
FIG. 4J illustrates a perspective view of an alternate embodiment of an automated spatial frame including a Smart Ring (e.g., an integrated master control unit and power supply) arranged and configured to be positioned within pockets formed in between adjacent tabs on a platform in accordance with one or more features of the present disclosure.
Figure 4K:
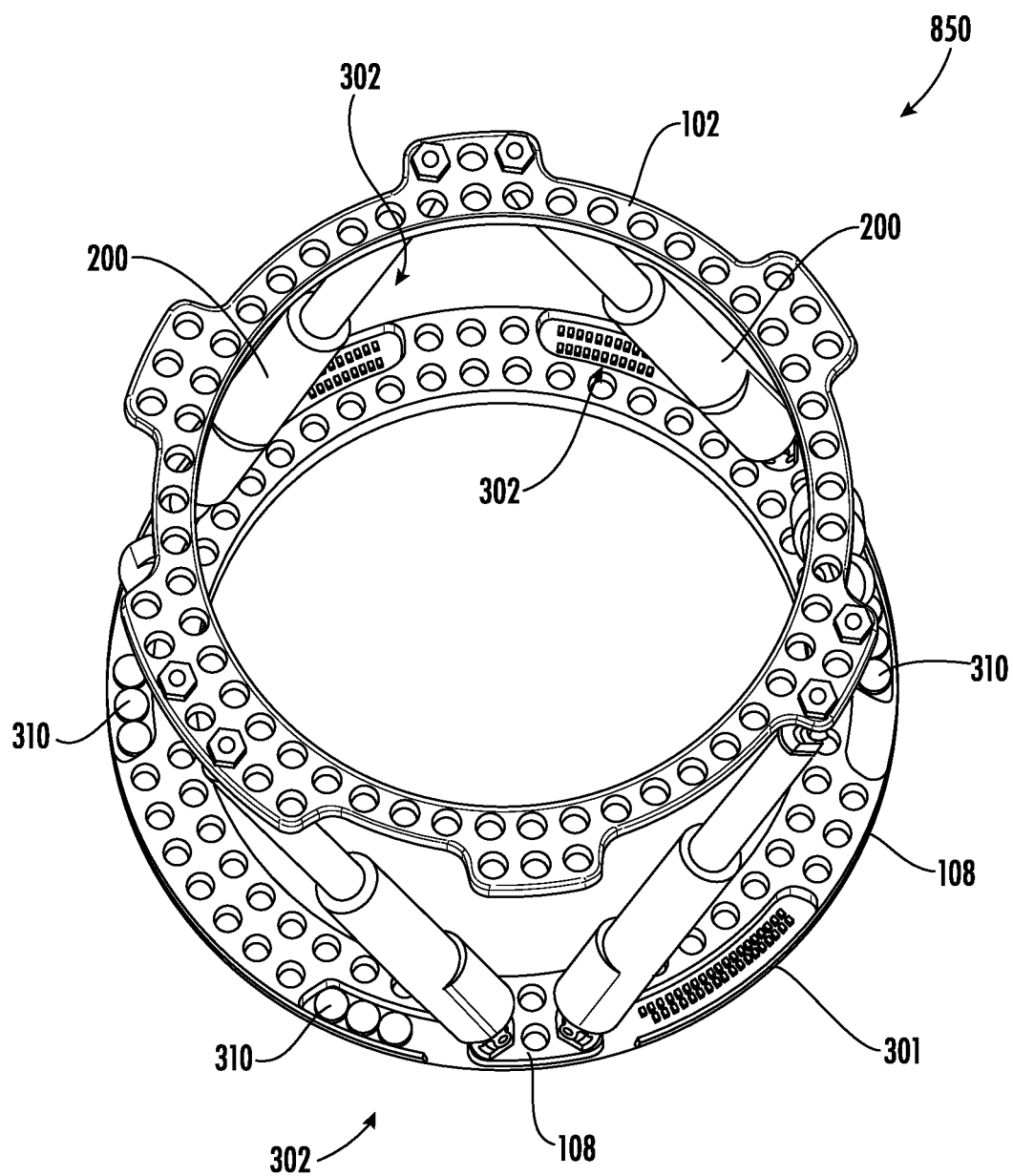
FIG. 4K illustrates a top, perspective view of the automated spatial frame including the Smart Ring shown in FIG. 4J.

Referring to FIGS. 4J and 4K, a perspective view of an alternate embodiment of an automated spatial frame 850 is disclosed. In use, the automated spatial frame 850 is substantially similar to the automated spatial frame 800 previously described except as described herein. As previously described, the Smart Ring 301 may include a plurality of PCB pockets 302 positioned between the tabs 108 formed in the platform. As illustrated, in one embodiment, the master control unit 300 and power supply (e.g., batteries) 310 may be housed in the PCB pockets 302 positioned between the ring tabs 108. For example, in one embodiment, the Smart Ring 301 may include three (3) PCB pockets 302 with each PCB pocket 302 including the needed circuity, power, and connectivity to control two (2) automated struts 200. In one embodiment, as illustrated, each of the PCB Pocket 302 may be positioned on either side of one of the tabs 108. As such, the plurality (e.g., three) independent PCBs may be independently powered by a plurality of power supplies such as, for example, three-coin cells. In use, the power supplies may be arranged and configured to provide 90 mAh capacity. In one embodiment, the encoder may run on a different power supply than the motor.

In connection with the Smart Ring 301 of the automated spatial frame 850, the connectors for supplying power and/or data to the automated struts 200 may be arranged and configured to accept/provide six (6) wires (as will be described in greater detail) to each automated strut 200 in contrast to the four (4) wires provided by the jack connectors as previously described.

In either configuration, connection of an automated strut 200 (e.g., a dumb strut without an integrated controller) to the Smart Ring 301, which is arranged and configured to provide power and data transfer to the struts 200 preferably utilizes a six (6) pin connector assembly that may not be available with standard jack connectors previously described. Thus, in either configuration, the pogo pin connector and socket assemblies are arranged and configured to provide six-wire connectors to provide power to the encoder and the motor separately, as will be described in greater detail herein. That is, separate power supply may be provided to the encoder and motor, which requires six (6) wires. Thus arranged, the optical encoder used to track strut position can be powered before (e.g., first) and remain on after the motor stops so that no encoder lines are lost.

Figure 4L:
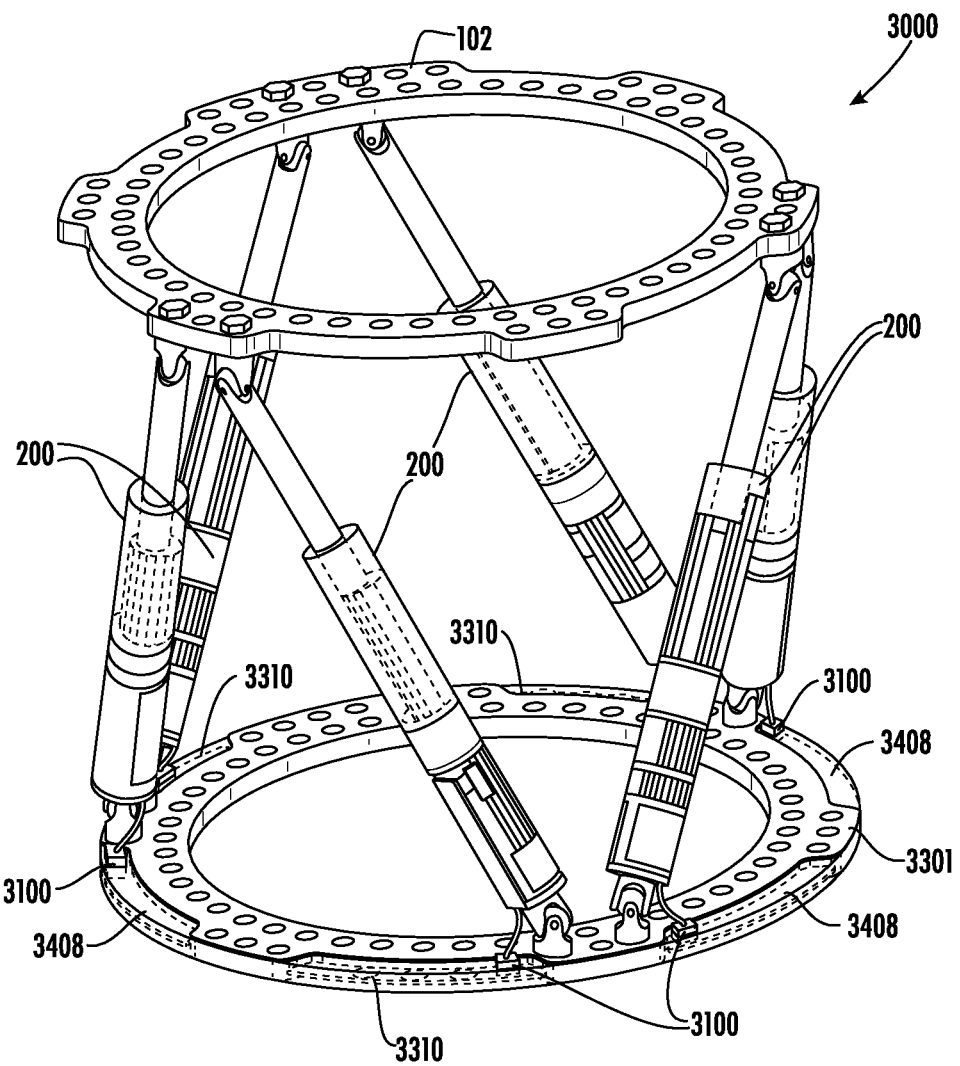
FIG. 4L illustrates a perspective view of an alternate embodiment of an automated spatial frame including a Smart Ring (e.g., an integrated master control unit and power supply) arranged and configured to be positioned within pockets formed in between adjacent tabs on a platform in accordance with one or more features of the present disclosure.

With reference to FIGS. 4K-4Q, in one embodiment, an automated spatial frame 3000 is disclosed. Referring to FIG. 4L, a perspective view of an alternate embodiment of an automated spatial frame 3000 is disclosed. In use, the automated spatial frame 3000 is substantially similar to the automated spatial frames 800, 850 previously described. As illustrated in FIG. 4L, the automated spatial frame 3000 includes a first platform 102, a Smart Ring 3301, and six interconnecting automated struts 200.

Figure 4M:
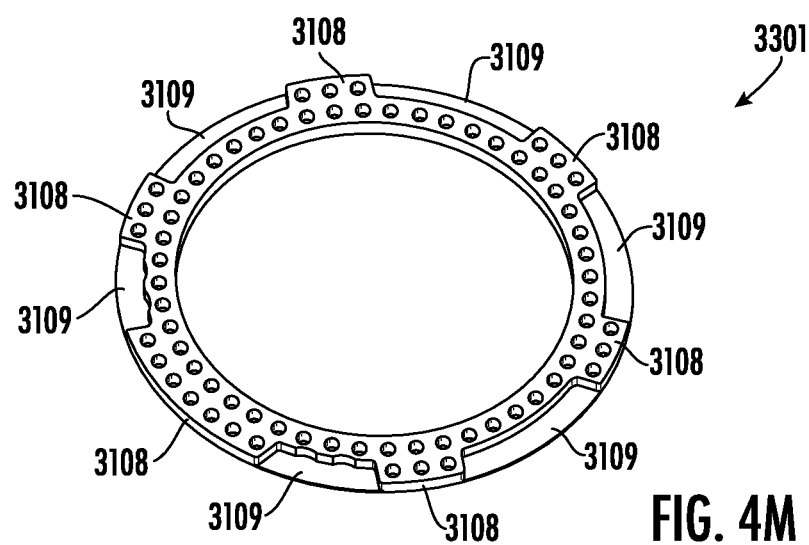
FIG. 4M illustrates a top, perspective view of an embodiment of the Smart Ring shown in FIG. 4L.

As illustrated, and as previously mentioned, the Smart Ring 3301 is arranged and configured to accommodate the necessary electronics (e.g., PCB boards 3408, batteries 3310, and connectors 3100). As illustrated in FIG. 4M, the Smart Ring 3301 is arranged and configured to provide six redundant pockets or spaces 3109 positioned or located between adjacent ring tabs 3108 to house the necessary electronics (e.g., PCB boards 33408, batteries 3310, and connectors, or portions thereof, 3100).

Figure 4N:
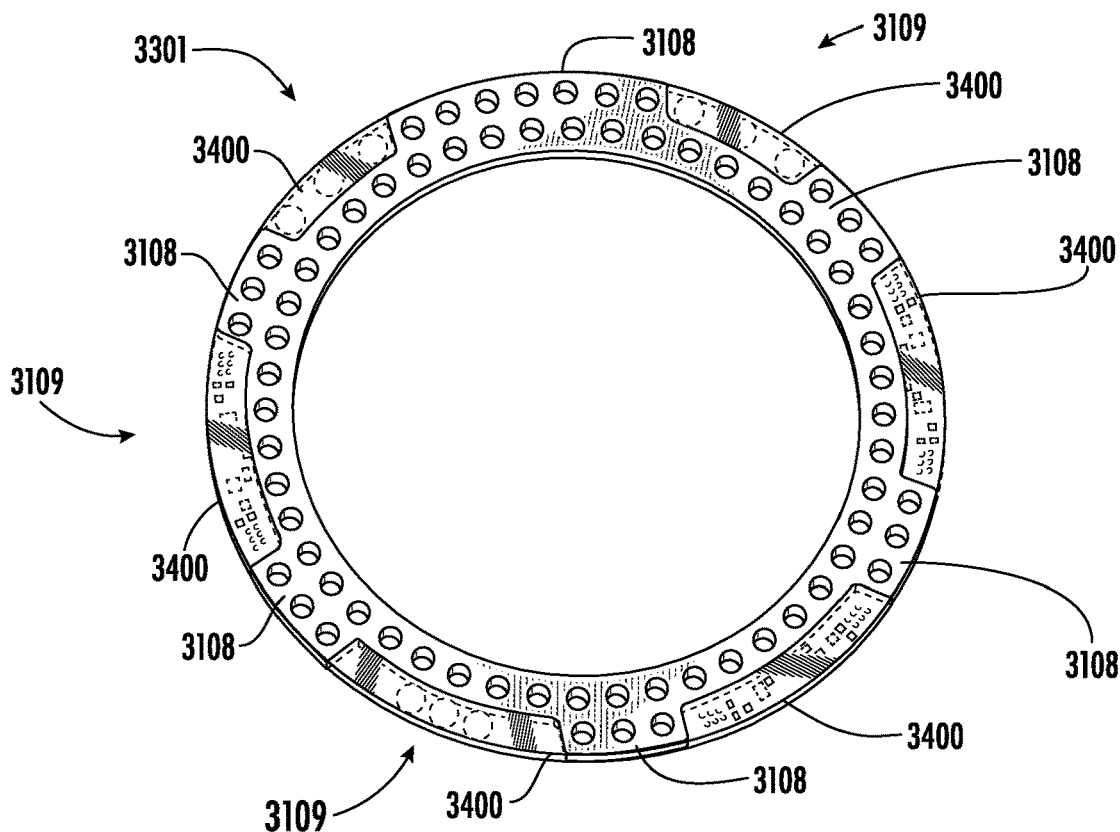
FIGS. 4N and 4O illustrate top, perspective views of the Smart Ring shown in FIG. 4M, the Smart Ring including overmoulding to protect the electronics positioned in the pockets of the Smart Ring.
Figure 4O:
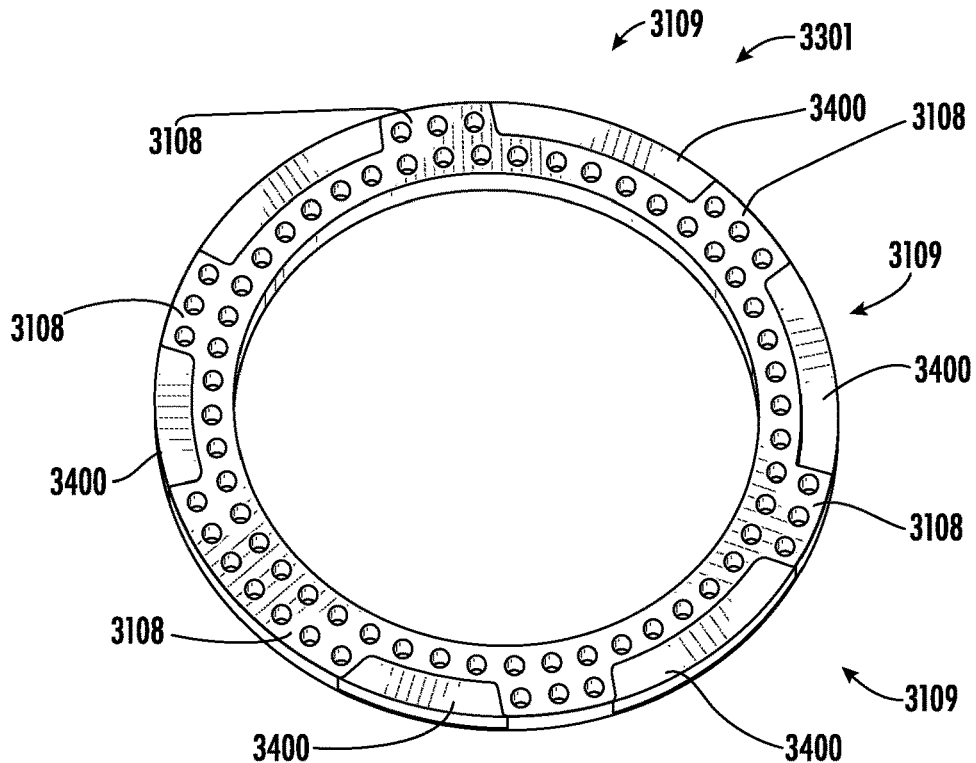

Referring to FIGS. 4N and 4O, in one embodiment, after assembly of the Smart Ring 3301 (e.g., after assembly of the electronics (e.g., PCB boards 3408, batteries 3310, and connectors 3100) in the pockets or spaces 3109, the pockets or spaces 3109 may be overmoulded 3400 to encapsulate the electronics (e.g., PCB boards 3408, batteries 3310, and/or connectors, or portions thereof, 3100. FIG. 4N illustrating the underlying electronics while FIG. 4O omits the underlying electronics for increased clarity.

In use, the overmoulding 3400 protects the components on the PCB from mechanical forces and environmental pollutants that can damage them over time. For example, the overmoulding 3400 protects the solder joints, the traces required for electrical conductivity between the batteries and the PCB compartments, etc. from expected stresses. In addition, a potting compound could be used to create an interface between the PCB electronics and the overmoulding layer providing additional protection.

The overmoulding 3400 may be any suitable overmoulding material now known or hereafter developed including, for example, EP37-3FLF two-part epoxy resin and MasterSil MS151 two-part silicone adhesive supplied by Masterbond Inc. (Hackensack, NJ, US). In use, the EP37-3FLF epoxy resin provides the benefits of a Shore D hardness of 30, good optical clarity and excellent adhesion to metal (e.g., aluminum ring). In use, the overmoulding may be coupled to the metal (e.g., aluminum ring) by any suitable method now known or hereafter developed including, for example, an adhesive, fasteners passing through the overmoulding, fasteners passing into the aluminum platform, etc.

Figure 4P:
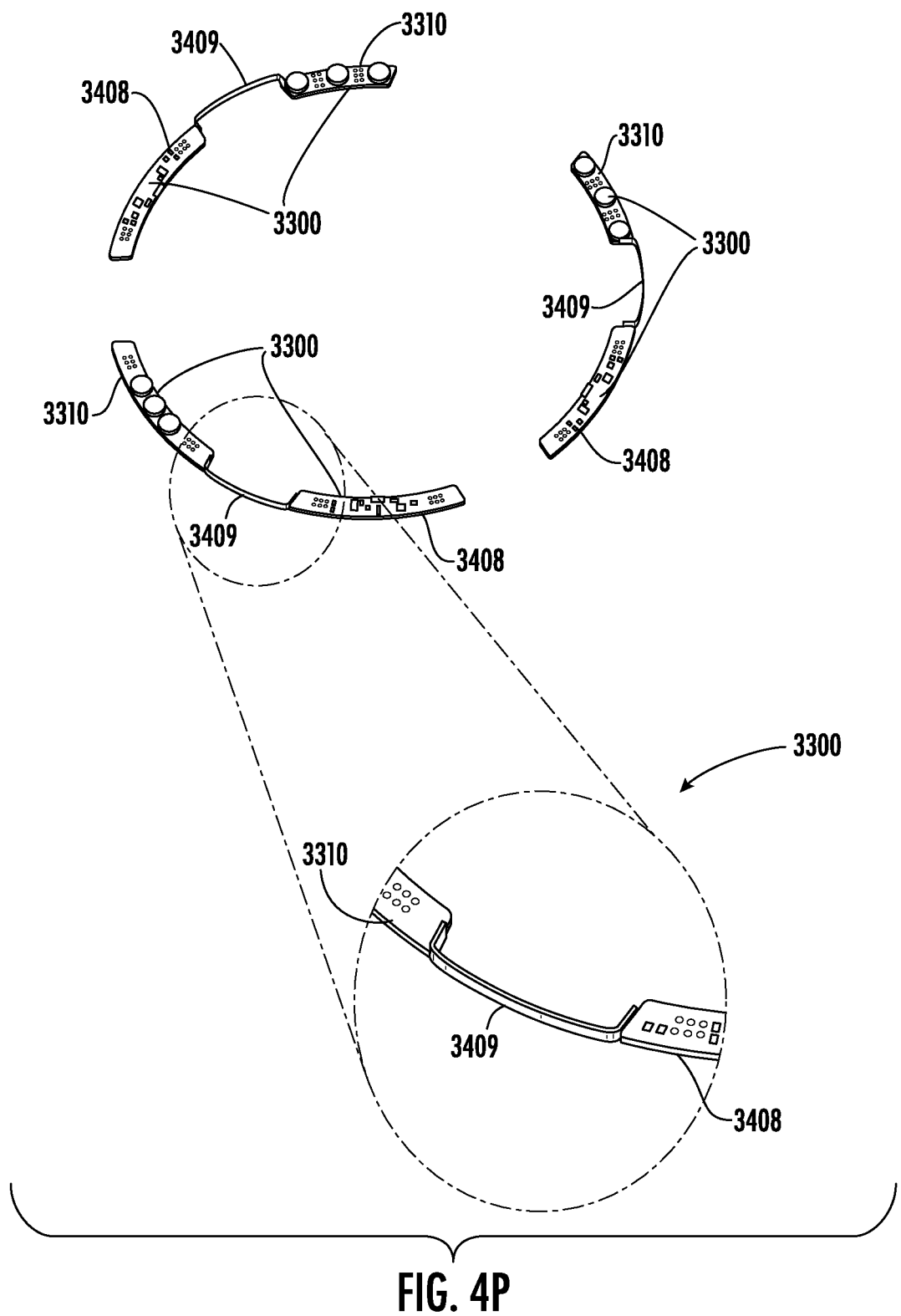
FIG. 4P illustrates top, perspective views of an embodiment of independent PCB board sets that may be used in the Smart Ring of FIG. 4L.
Figure 4Q:
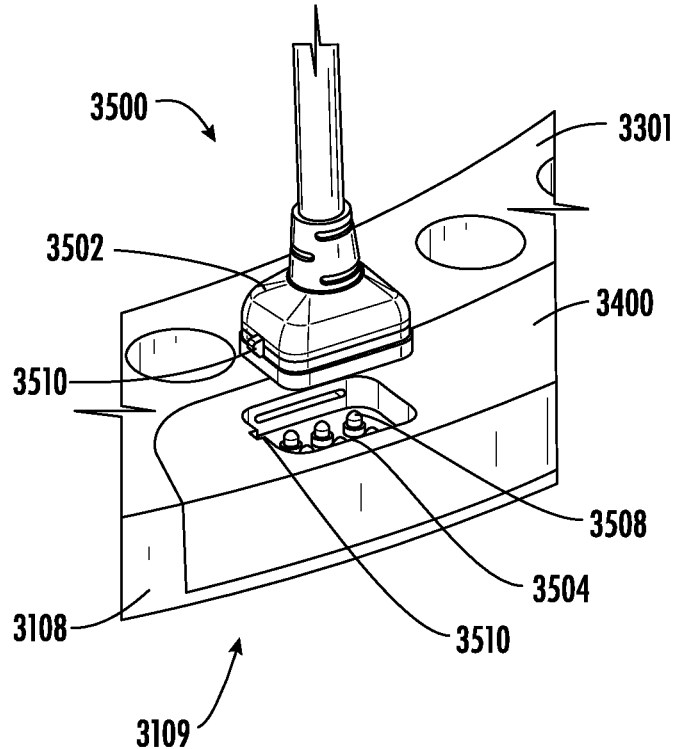
FIG. 4Q illustrates an embodiment of a pogo pin connector and socket assembly that may be used in the automated spatial frame of FIG. 4L.

Referring to FIG. 4P, in one embodiment, the Smart Ring 3301 may include a plurality of independent PCB board sets 3300 (in contrast to a singular PCB as previously described). For example, as illustrated, the Smart Ring 3301 may include three PCB board sets 3300 with each PCB board set 3300 including a PCB board 3408 and a battery board 3310 coupled to each other via a connector 3409. In use, the PCB board 3408 may include, for example, the microcontroller and associated electronics. The battery board 3410 may include the power supply and associated electronics.

In one embodiment, as illustrated, the three PCB board sets 3300 are positioned within the six pockets 3109 formed in the Smart Ring 3301. In use, each of the PCB boards 3408 and the battery boards 3310 are arranged and configured to be positioned within one of the pockets 3109 formed in the Smart Ring 3301. For example, each of the PCB boards 3408 and the battery boards 3310 may be orientated horizontally within its respective pocket 3109. In use, each PCB board set 3300 (e.g., each PCB board 3408 and the battery board 3310 combo) is responsible for powering and controlling a pair of automated struts 200. Thus arranged, the Smart Ring 3301 may include three independent PCB board sets 3300 with each PCB board set 3300 responsible for powering and controlling two struts. Thus arranged, each PCB board set 3300 may be independently powered and operated as a stand-alone system. In one embodiment, each of the PCB board set 3300 may communicated with the other PCB board sets 3300 wirelessly such as, for example, by Bluetooth Low Energy (BLE) or the like.

In addition, as illustrated, electrical connection between the PCB board 3408 and the battery board 3310 in each PCB board set 3300 across the tabs 3108 in the Smart Rings 3301 may be achieved using a flexi/flex-rigid PCB connector 3409 positioned in a narrow trench or groove formed in the Smart Ring 3301. For example, as previously mentioned, a groove or recess such as, for example, groove or recess 112, may be provided in an arc in the perimeter of the Smart Ring 3301 to accommodate the flex rigid PCB connector 3409. Thus arranged, the need for twisted cables is eliminated. In one embodiment, the Flex rigid PCB connector 3409 across the tabs 3108 is then overmoulded as previously mentioned.

As illustrated, in one embodiment, the battery boards 3410 may each include a plurality of coin cell batteries. For example, each battery board 3410 may include 3-coin cells, although this is but one configuration and other numbers and types of batteries may be utilized.

Figure 4R:
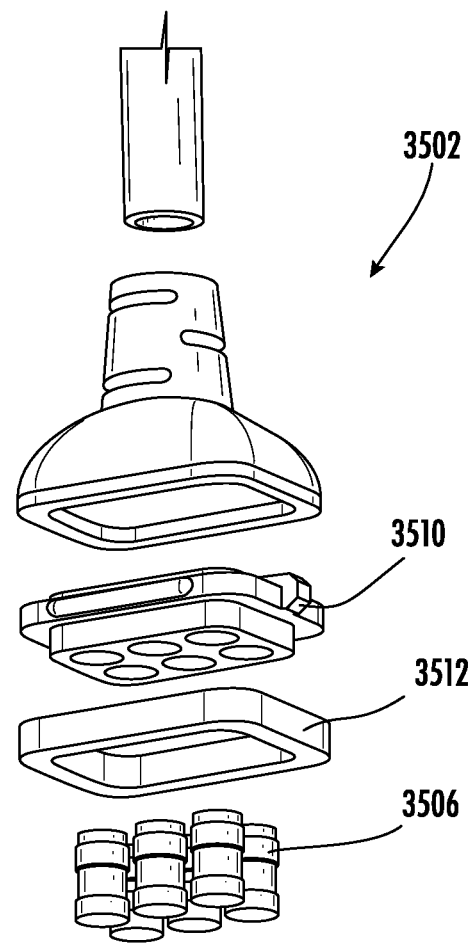
FIG. 4R illustrates an exploded, perspective view of the pogo pin connector and socket assembly of FIG. 4Q.

In one embodiment, each PCB board set 3300 is arranged and configured with connectors 3100 for exchanging data and providing power to the automated struts 200. In one embodiment, the Smart Ring 3301 may include a total of twelve connectors 3100, although this is but one configuration. In use, the connectors 3100 may be any suitable connector arranged and configured to enable power and data transfer between the automated struts 200 and the Smart Ring 3301 including, for example, jack plugs and sockets, a header connector, etc. In one embodiment, referring to FIGS. 4Q and 4R, the connectors 3100 may be in the form of a pogo pin connector and socket assembly 3500.

As illustrated, generally speaking, each pogo pin connector and socket assembly 3500 includes a connector component 3502 and a socket component 3504. As illustrated, the socket component 3504 may be formed or positioned within the Smart Ring 3301, although the opposite is envisioned. In one embodiment, the pogo pin connector and socket assemblies 3500 enable six wired connections between the PCB board 3408 and the battery board 3310, and the automated struts 200. That is, each of the pogo pin connector components 3502 include six pins 3506 and six wires, each socket component 3504 includes six contacts 3508. Thus arranged, the optical encoder and motor of the automated struts 200 can be provided with separate and independent power lines. That is, the pogo pin connector and socket assemblies 3500 enable six pins, two of the six pins are arranged and configured to supply power to the motor of the automated strut 200, two of the six pins are arranged and configured to supply power to the optical encoder of the automated strut 200, and two of the six pins are arranged and configured as signal lines for supplying data to the encoder of the automated strut 200. In use, by utilizing the six pinned pogo connector and socket assemblies 3500, the optical encoder in the automated strut 200 can be initially powered prior to powering on the motor. In addition, the optical encoder can remain powered on even after the motor stops operating to ensure that no encoder lines are lost. This arrangement is not possible if the optical encoder and motor receive power via the same power lines.

In one embodiment, two points of connection may be provided on each of the PCB board 3408 and the battery board 3310, with one point of connection located at the ends of the pocket thus minimizing the length of any external wiring between the pogo pin connectors and the automated struts.

As illustrated, in one embodiment, the pogo pin connector and socket assemblies 3500 may include a key 3510 such as for example, interlocking projection and recess, to facilitate installation of the connector component 3502 into the socket component 3504, a retention feature to ensure a reliable electrical connection is maintained, and a seal 3512.

In use, the pogo pin connector and socket assemblies 3500 offer many advantages including, for example, customization (e.g., a pogo pin connector and socket assembly 3500 can be manufactured in a more compact, rectangular 3×2 array that could form part of the plastic cover for a pocket), simplification of the design and electrical connectivity of the Smart Ring (e.g. a pogo pin connector and socket assembly 3500 ensures that no encoder lines were lost from the optical encoder when powered first and powered on after the motor), prevent bulges under the Smart Ring, which reduced the risk of potential conflicts with other components of the frame. In addition, in use, the pogo pin connector and socket assemblies are more forgiving compared to jack plug connectors in terms of location. In use, the connector portion from the automated strut does not need to line up precisely with the contacts 3504 on the ring PCB. It is sufficient that the pads make electrical contact with the pogo pins/contacts and the spring contact from the pogo pins/contacts ensures good electrical connection. The pogo pin connector is also customizable making it more amenable to the design constraints of the Smart Ring, e.g. it can be designed to form part of the plastic cover for a pocket.

The master control unit may take on any suitable form now known or hereafter developed. In addition, the master control unit may be operatively coupled to the spatial frame via any suitable mechanism now known or hereafter developed. For example, in one embodiment, the master control unit may be arranged and configured as a stand-alone unit. Thus arranged, the master control unit may be arranged and configured to be carried by the patient. For example, the master control unit may be wearable by the patient either, for example, via a strap around the patient's shoulder, on the patient's belt, etc. In use, the master control unit may be coupled to the automated struts via, for example a hardwire plugged into the communication interface 250 formed in the strut 200, or into a communication interface formed in the platform, as will be described in greater detail.

Figure 5:
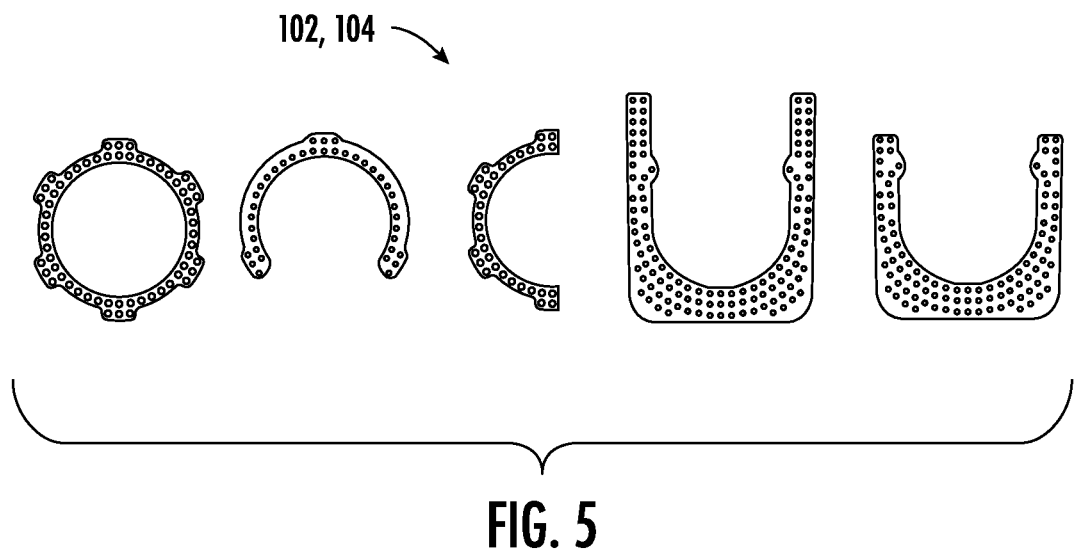
FIG. 5 illustrate various top views of different sized and shaped platforms that may be used in connection with a spatial frame.

In one embodiment, the master control unit 300 may be arranged and configured to be backward compatible with existing platforms, which as will be appreciated by one of ordinary skill in the art, are provided in a range of sizes (e.g., generally defined by their internal diameter) and different shapes. Example platforms of different sizes and shapes are schematically illustrated in FIG. 5. In one embodiment, the master control unit 300 may be arranged and configured to fit an array of different-shaped platforms used to construct the spatial frame. For example, full ring, two-third ring, one-half ring, a foot ring, a U-ring, etc. As such, it should be understood that the master control unit 300 need now be in the form of a perfect ring but rather may have any suitable size and shape including, for example, sizes and shapes substantially corresponding with the intended coupled platform. Alternatively, it is envisioned that master control units may be independently designed and configured for each platform type.

As previously mentioned, the master control unit 300 includes a communication interface for operatively communicating and delivering power to the automated struts. The communication interface may be any suitable interface now known or hereafter developed. In one embodiment, the communication interface formed in the master control unit 300 may be a micro-USB styled connector or any other suitable terminal style connector. For example, the micro-USB styled connector may be a 9-pin connector arranged and configured to exchange power and data. However, it should be understood that alternate connectors such as, for example, jack plug connectors, PCB cable connectors, IDC connectors, etc. are envisioned and that any suitable plug-and-play connector could be utilized.

Figure 6A:
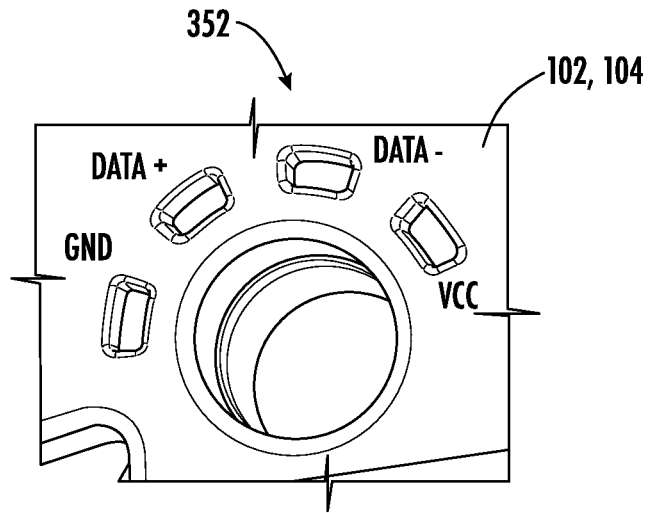
FIG. 6A illustrates an embodiment of a USB type 4-pin connector that can be used to provide electrical connection between, for example, the master control unit and the motorized external fixation struts in accordance with one feature of the present disclosure.

In one embodiment, the master control unit 300 may be directly coupled to at least one of the automated struts such as, for example, automated strut 200. Referring to FIG. 6, in one embodiment, the master control unit 300 may include a micro-USB styled communication interface 350. As shown, and as previously described, the automated strut 200 may also include a micro-USB styled communication interface 250 positioned, for example, in a side surface of the strut 200. Thus arranged, the master control unit 300 may be operatively coupled to at least one of the automated struts 200 by a wire plugged into the corresponding micro-USB styled communication interfaces 250, 350. Alternatively, referring to FIG. 6A, the platform 102, 104 may include other suitable connectors such as, for example, a USB type 4-pin connector 352. In use, the master control unit 300 can be coupled to each of the automated struts 200 via the 4-pin connector 352. For example, in one embodiment, keyed terminals can assemble to smart strut shoulder bolts for providing power and data transmission.

In one embodiment, the platform such as, for example, platform 104, is arranged and configured to act as a conduit for enabling the connection between the master control unit 300 and the automated struts 200. That is, in one embodiment, the coupled platform 104 may include a conduit or passage (used interchangeably herein without the intent to limit) for transferring data and power from the master control unit 300 to the automated struts 200. In one embodiment, the coupled platform 104 may include a plurality of micro-USB styled connectors, or other terminal styled connectors, positioned thereon. In use, corresponding connectors formed in the platform 104 can be connected via wires, traces, or the like that are embedded within the platform 104. For example, the traces, wire, etc. can be positioned within channels, tunnels, conduits, passages, etc. formed in the platform. Thereafter, the channels and/or wires, traces, etc. can be over-molded, epoxied, etc. within the platform 104.

In use, the master control unit 300 may be mechanically fastened to the platform 104 via any suitable mechanism now known or hereafter developed. In addition, the master control unit 300 may be electrically connected to the platform 104 by coupling a first wire to the micro-USB styled connector formed in the platform 104 and to the micro-USB styled connector 350 formed in the master control unit 300. Similarly, the plurality of automated struts 200 may be mechanically coupled to the first and second platforms 102, 104 via the first and second joints 204, 212. In addition, in one embodiment, each of the plurality of automated struts 200 may be electrically coupled to the platform 104 via a plurality of additional wires coupling the micro-USB connector 250 formed in the struts 200 with the micro-USB connectors formed in the platform 104. For example, in one embodiment, the platform may include a micro-USB connector positioned adjacent to each of the joints for connecting to an automated strut, along with at least one additional micro-USB connector for coupling to the master control unit.

Figure 7:
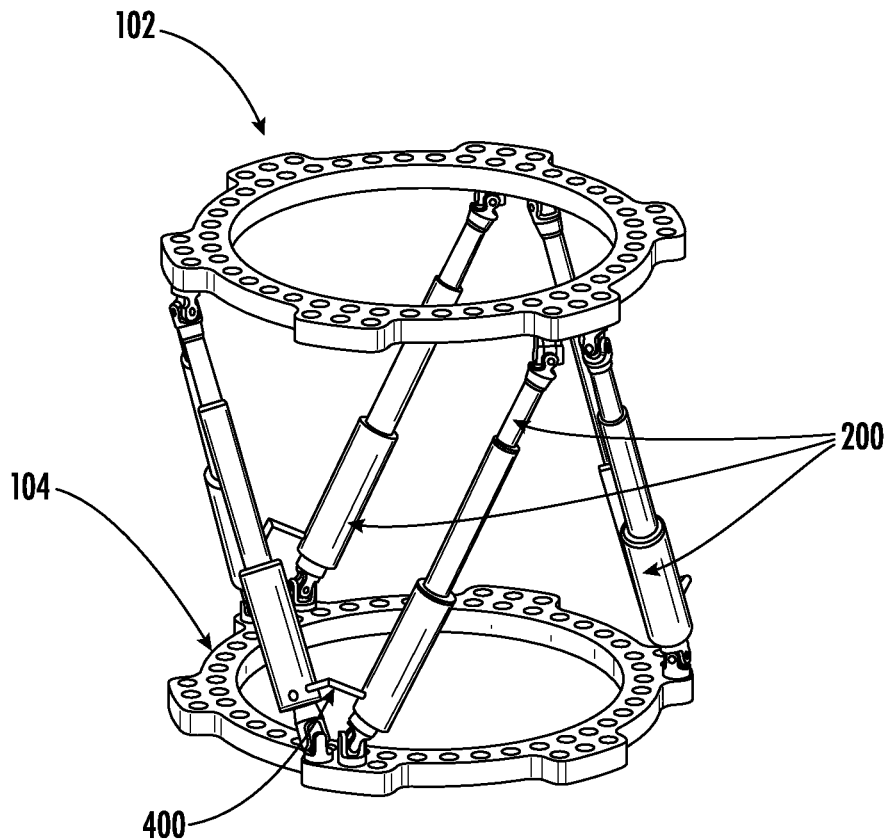
FIG. 7 illustrate a perspective view of an embodiment of a spatial frame wherein the plurality of automated struts are connected to each other in a daisy-chain arrangement.

Alternatively, in one embodiment, a first automated strut 200 may be electrically coupled to the platform 104 via a wire coupling the micro-USB connector 250 formed in the first strut 200 with the micro-USB connectors formed in the platform 104. Thereafter, subsequent automated struts 200 can be electrically coupled to each other via a wire 400 in a daisy chain arrangement as generally shown in FIG. 7. That is, the first automated strut may be coupled to a second automated strut via, for example, a wire. The second strut may be couple to a third strut, and so-on. In either event, the master control unit 300 may be electrically coupled to the automated struts 200 via power, ground, and data connections passing through the platform of the spatial frame.

By incorporating micro-USB styled connectors or the like into the master control unit 300, the automated struts 200, and optionally the platform 102, 104, power and data can be easily transferred between the various components. That is, as will be appreciated by one of ordinary skill in the art, USB styled connectors provide power, ground, and first and second data channels between the interconnected components (e.g., the master control unit, the automated struts, and the platform). In this manner, power may be supplied from the master control unit 300 to the automated struts 200. In addition, data may be exchanged between the master control unit 300 and the automated struts 200. By utilizing the platform 102, 104 as a conduit, a streamline, efficient system may be created (e.g., number and complexity of wires used to connect the plurality of automated struts to a controller is minimized compared to prior art systems).

In addition, by utilizing USB styled connections, in one embodiment, each automated strut 200 may be assigned a unique identifier. Each unique identifier may be stored within memory of the master control unit 300. Thereafter, in use, the master control unit 300 can control the adjustment of each strut 200 (e.g., amount of adjustment and timing of adjustment) by transmitting instructions according to the treatment plan stored within the master control unit 300 using the stored addresses. Thus, alleviating the need to color code the struts. In addition, each strut 200 can transmit data back to the master control unit 300. For example, each strut 200 can transmit data relating to positional data (e.g., struts can transmit strut position, strut length, etc.) so that compliance with the treatment plan can be analyzed.

Thus arranged, the master control unit 300 may be arranged and configured to be easily connectable to the platform 102, 104. In addition, the connectors (e.g., terminal connectors, micro-USB connectors, etc.) enable the master control unit 300 to be easily, electrically coupled to the automated struts via, optionally, the platform, for delivering power and exchanging data in an easy to assembly, non-robust system. In addition, the USB styled connectors alleviate concerns surrounding out of sequence assembly.

In use, when the master control unit 300 is coupled to the platform and/or automated struts, the master control unit 300 and the automated struts 200 may be arranged and configured to: (i) deliver power from the master control unit 300 to the automated struts 200; (ii) exchange positional data and/or instructions between the master control unit 300 and the automated struts 200; (iii) control each of the motors of the automated struts 200; and (iv) store and update current positional data associated with each of the automated struts.

In addition, and/or alternatively, in one embodiment, the master control unit may be water-proofed to facilitate the patient, for example, taking a shower. Alternatively, it is envisioned that the master control unit and/or spatial frame may be covered by, for example, a bag during a shower thus alleviating the necessity that the automated struts are waterproofed.

Figure 8:
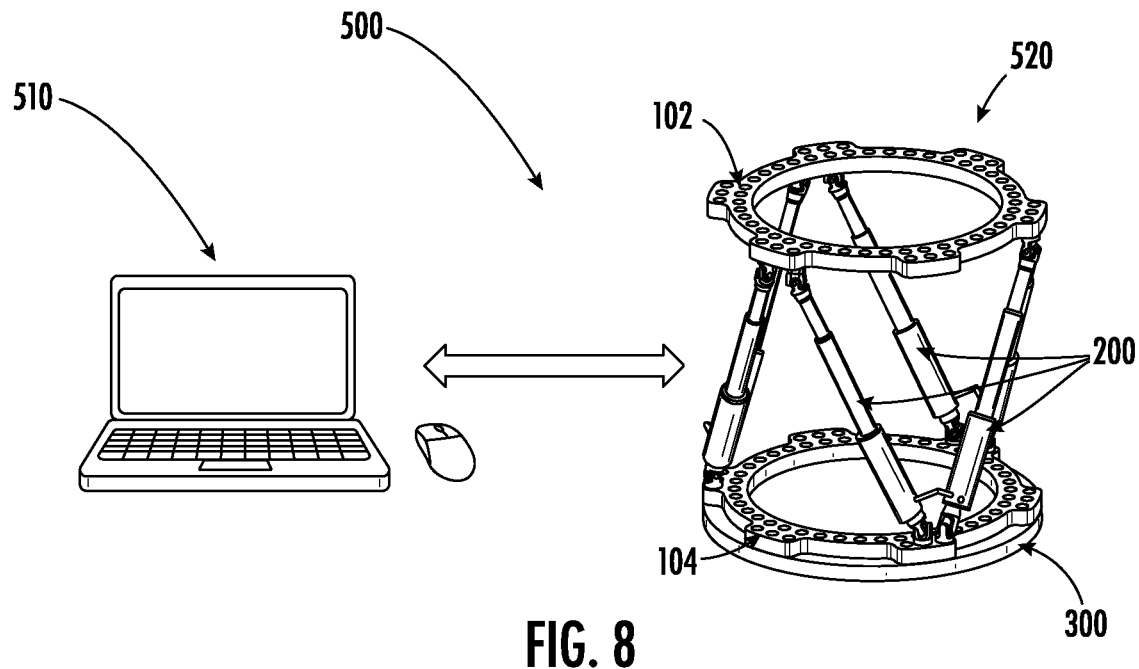
FIG. 8 illustrates an embodiment of a system architectural in accordance with one feature of the present disclosure.

Referring to FIG. 8, an embodiment of a system architectural 500 is disclosed. In use, the system architectural 500 provides a system and method for providing data uploads/downloads from an external computer system 510 to the motorized spatial frame 520. For example, in one embodiment, a surgeon utilizing treatment plan software running on an external computing system 510 may generate, produce, etc. a software treatment plan that is transmitted (e.g., downloaded, updated, etc.) from the remote, external computer system 510 to the master control unit 300 of the motorized spatial frame 520, which then uses the treatment plan to control the individual automated struts such as, for example, automated strut 200.

In one embodiment, as previously mentioned, the master control unit 300 may include a communication transceiver for communicating with the external computing system 510. In use, the master control unit 300 and the external computing system 510 are communicatively coupled to exchange data such as, for example, treatment plan information, updates, strut positional data, etc.

In use, the external computing system 510 may be any suitable external computing system now known or hereafter developed including, for example, a desktop computer residing, for example, in a surgeon's office, a laptop, an APP running on a smartphone, a tablet, etc., or combinations thereof.

In use, the communication transceiver may be any suitable communication interface now known or hereafter developed including, for example, wired and wireless transceivers. For example, the communication interface may be a wireless communication transceiver for wirelessly communicating with the external computing system 510. In one embodiment, the wireless communication interface may be, for example, a Bluetooth transceiver, for communicating with the external computing system 510, although the wireless communication interface may take on any other forms such as, for example, Wi-Fi, RF, Infrared, or any other suitable communication technique. Alternatively, and/or in addition, the master control unit 300 may include a USB port for receiving a USB stick for exchanging data with the external computing system 510.

In use, with the treatment plan downloaded onto the master control unit 300 and with the master control unit 300 operatively coupled to the platform and/or automated struts, the master control unit 300 can supply power to the struts and convert the treatment plan into instructions to control each of the automated struts. Thus arranged, the external computing system 510 may connect such as, for example, wirelessly connect, to the master control unit 300 to control the plurality of automated struts. The struts may move individually (e.g., sequentially) or simultaneously according to the treatment plan. In addition, the master control unit may periodically supply real time actuation data and/or updates to the external computing system thereby conforming compliance with the treatment plan.

In connection with the system and architectural disclosed herein, the spatial frame may include a centralized master control unit that facilitates autonomous adjustments of the automated struts according to the treatment plan. The master control unit enables the treatment plan to be communicated, downloaded, or the like to each of the plurality of automated struts. In addition, the master control unit may store patient information such as, for example, age, weight, sex, type of injury, etc. The master control unit may also record (a) the target bone lengthening rate of each strut, (b) the target strut length outlined in the treatment plan, (c) the instantaneous strut length of each strut, and (d) the number of turns of the motor or gears of each strut. In addition, the master control unit may transmit strut data back to the patient or surgeon via, for example, an external computing system such as a mobile App running on a smartphone, a tablet, etc. to provide regular progress updates of the treatment plan via Bluetooth, RF, Infrared, Wi-Fi or any other suitable communication technique that enables bi-directional communication between the master control unit and the mobile App.

In an alternate embodiment, the centrally located master control unit may be permanently fixed to the platform of the spatial frame. For example, in one embodiment, the centrally located master control unit may be embedded within a machined recess formed within the Smart Ring. In use, data and power may be transferred to the automated struts through smart shoulder bolts. Treatment plan data can be communicated to the spatial frame by either a USB type device or wirelessly from a remote computing system. The master control unit may be arranged and configured to control the actuation of the automated struts and store the instantaneous lengths of the struts. The battery can be recharged via, for example, a portable battery device such as a cellphone charger or by plugging it into a power source. In other embodiments, particularly relevant to the wireless intelligent strut 1160, 1260 (described in greater detail below), a capacitor charge boost DC to DC converter circuit may be used to maintain the on-board battery voltage above a certain threshold, such as, for example, 3V for extended periods, e.g. 90 days. This approach conserves "stored energy" for powering the struts at any given time In another alternate embodiment, the battery may be configured in the shape of a ring and the ring-shaped battery may be temporarily coupled to the platform (e.g., ring-shaped platform) of the spatial frame. Terminals from the struts may be integrated into the platform of the spatial frame to allow for power and data to be transferred from the ring-shaped battery to the struts. In use, the ringed-shaped battery can be unplugged or disconnected from the platform of the spatial frame for charging. The treatment plan can be transferred to the spatial frame by a USB stick, wirelessly, etc. as previously mentioned. In connection with this embodiment, the platform may act as the control device.

In another alternate embodiment, each automated strut may be equipped with its own processor. The master control unit, which may be in the form of a ring, can act as an intermediary to supply power and/or facilitate exchange of data.

In another alternate embodiment, each automated strut may be equipped with its own high-capacity lithium polymer battery. The master control unit, which may be in the form of a ring, can be temporarily mounted to the platform to wirelessly communicate lengthening to each of the struts.

Figure 9:
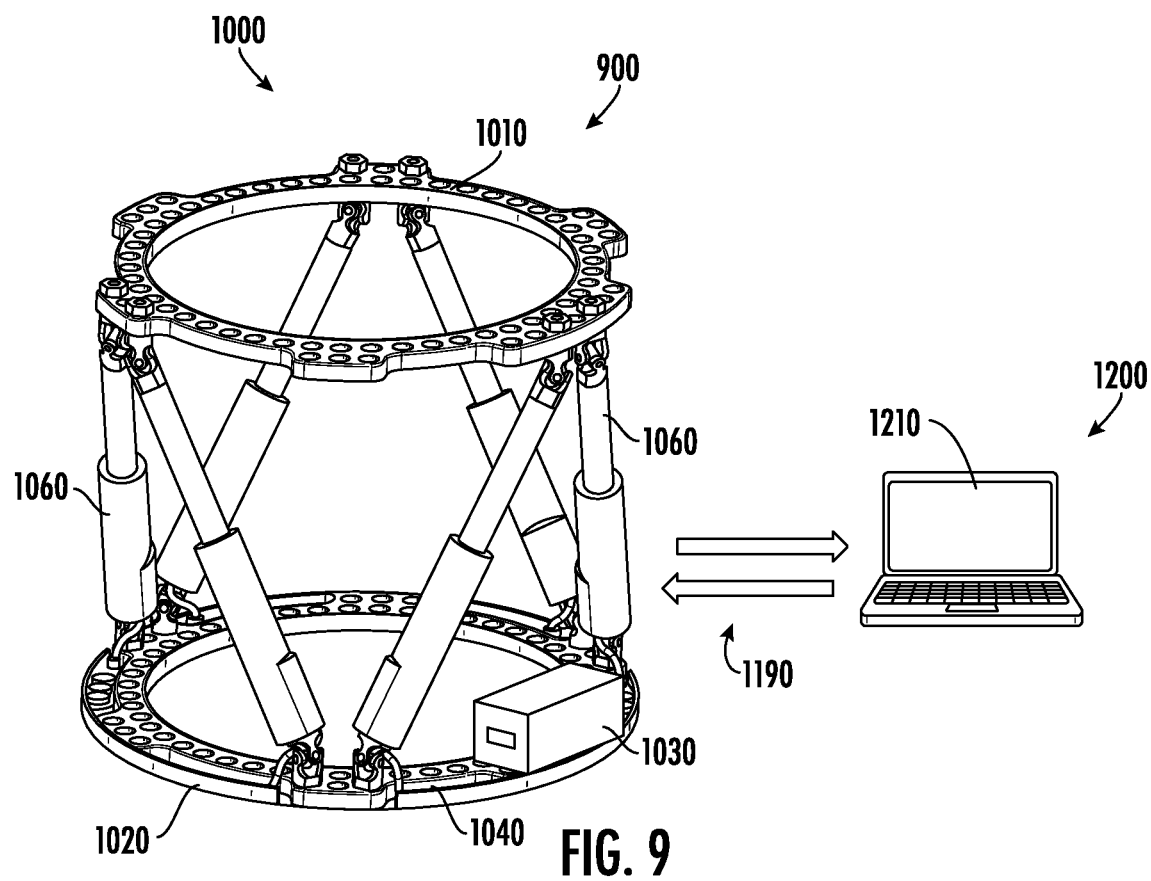
FIG. 9 illustrates an alternate embodiment of a system architectural for an embodiment of an automated spatial frame in accordance with one or more features of the present disclosure.
Figure 10:
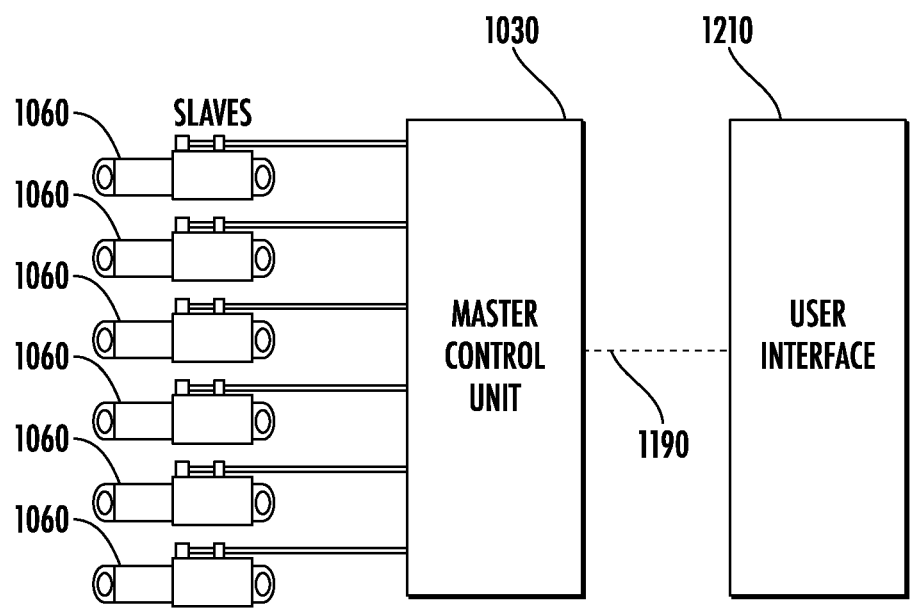
FIG. 10 illustrates an embodiment of a block diagram of components of the embodiment of the automated spatial frame of FIG. 9.
Figure 11:
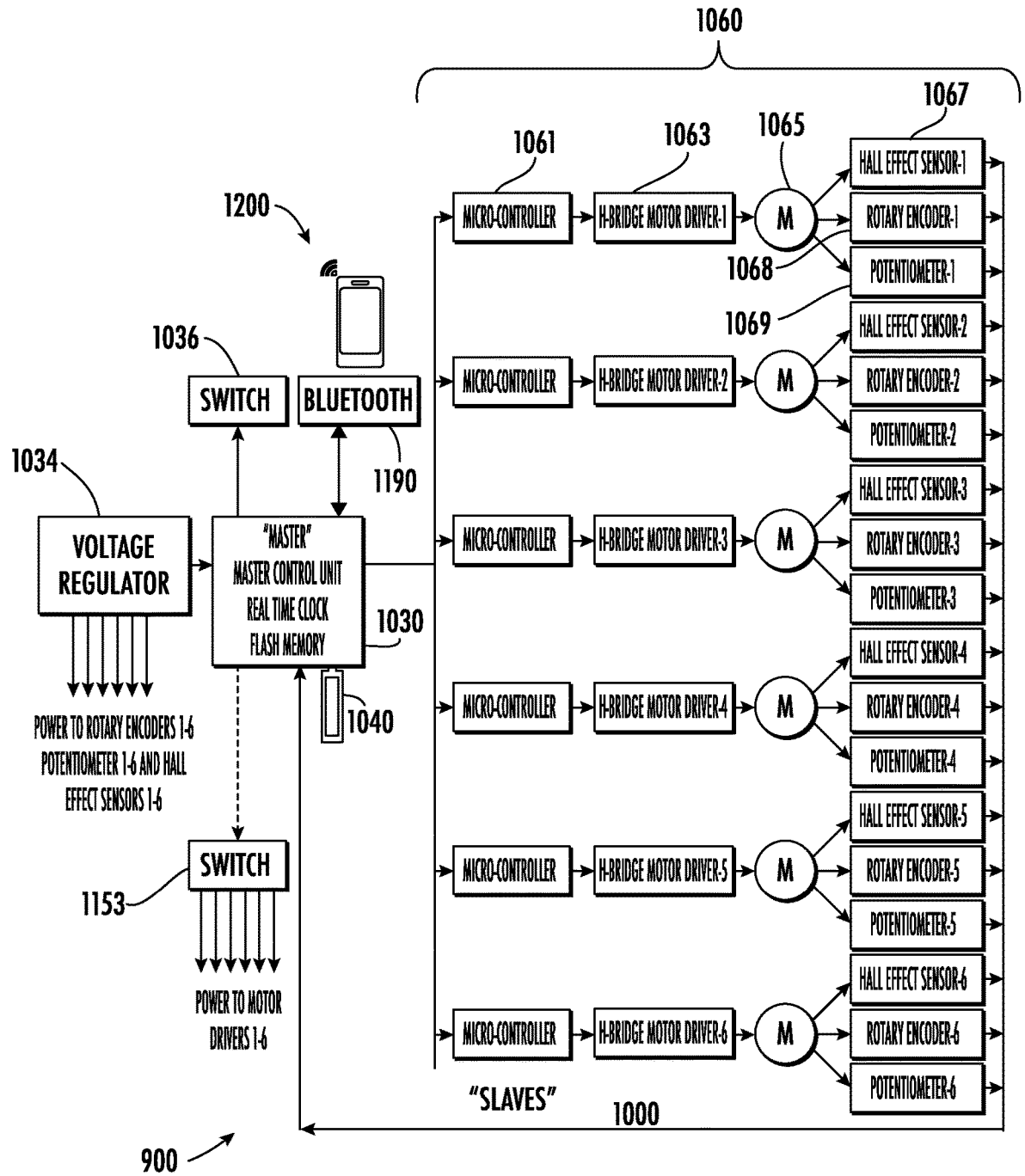
FIG. 11 illustrates an embodiment of a system block diagram of the embodiment of the automated spatial frame of FIG. 9.
Figure 12:
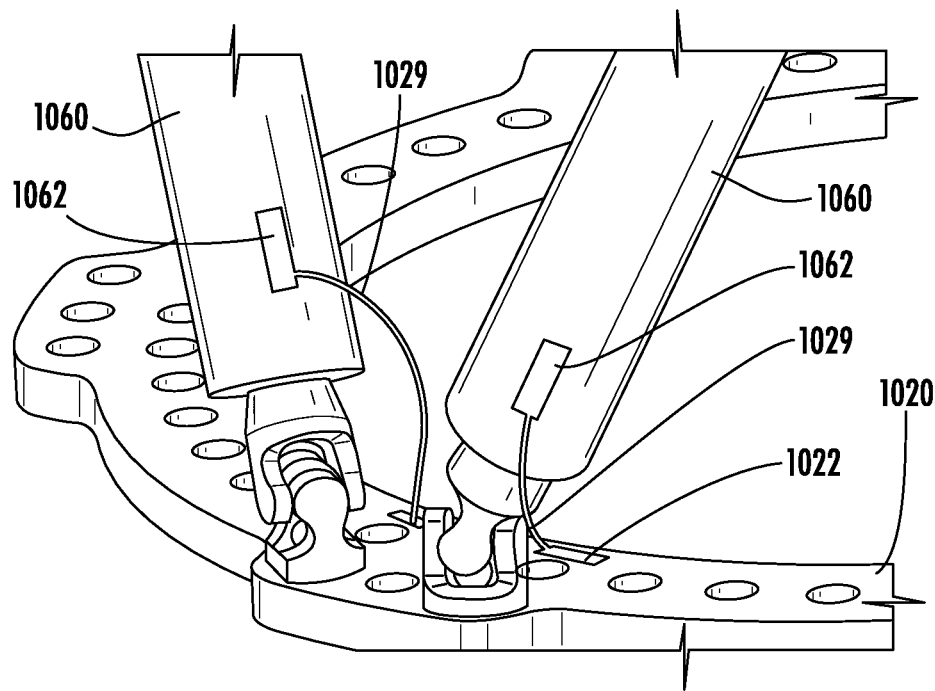
FIG. 12 illustrates a detailed perspective view of a portion of the automated spatial frame of FIG. 9.

Referring to FIG. 9, an alternate embodiment of an automated spatial frame architectural 900 in accordance with one or more features of the present disclosure is illustrated. As illustrated, the automated spatial frame architectural 900 includes a spatial frame (e.g., a hexapod) 1000 and an external computing system or device 1200 that are in communication with each other over a communications channel 1190. As previously described, the communications channel 1190 may be any now known or hereafter developed communication channel such as, for example, a wireless communication channel, a hard-wired, etc. Referring to FIGS. 10-12, embodiments of system level diagrams at different levels of specificity and emphasizing different components are shown. As illustrated, in one embodiment, the spatial frame (e.g., hexapod) 1000 includes a first platform 1010 and a second platform 1020 connected by multiple automated struts 1060. For example, as illustrated, the first and second platforms 1010, 1020 may be coupled by six adjustable length automated struts 1060. As illustrated, in one embodiment, the first and second platforms 1010, 1020 may be in the form of a ring as commonly known and utilized in the field as previously mentioned. Alternatively, as previously mentioned, the first and second platforms 1010, 1020 may have other shapes and configurations.

Referring to FIGS. 9 and 12, the struts 1060 may be coupled to the first and second platforms 1010, 1020 via a pivotable connection at each of their ends. For example, the struts 1060 may include U-joints and shoulder bolts through which each strut 1060 may be mechanically coupled to the first and second platforms 1010, 1020, respectively, through pre-formed holes formed in the first and second platforms 1010, 1020. Alternatively, however, as previously mentioned, the struts 1060 may be coupled to the first and second platforms 1010, 1020, via any suitable connection mechanism now known or hereafter developed.

During use, as previously mentioned, the struts 1060 are arranged and configured to extend and retract in response to one or more received electric signals such as, for example, a received signal from a master control unit as described herein. Thus arranged, the struts 1060 are referred to as automated struts 1060 since they are not manually adjusted using, for example, a wrench. In some embodiments, one or more struts coupled to the first and second platforms 1010, 1020 may not be arranged and configured to extend or retract automatically, and thus, as described herein, such struts would not be "automated." In some embodiments, each automated strut 1060 may include a diameter of 20-22 mm diameter with a length ranging from 75 to 320 mm, depending on the designed stroke.

Figure 13:
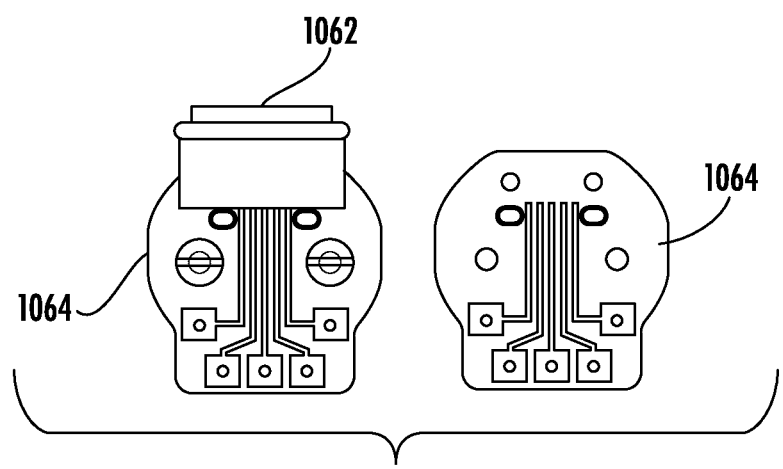
FIG. 13 illustrates a schematic view of an embodiment of an automated strut printed circuit board and connector for receiving wires, the strut PCB and connector being arranged and configured for use with the spatial frame shown in FIGS. 9 and 12.

Referring to FIGS. 10 and 11, each automated strut 1060 may be arranged and configured to include a motor 1065 such as, for example, a geared DC motor, a rod such as, for example, a distraction rod, a threaded rod, etc. (not shown), one or more sensors such as, for example, positional sensors including a Hall Effect sensor 1067, a rotary encoder 1068, and a potentiometer 1069. In addition, the automated struts 1060 may include an on-board micro-controller or processor 1061, which receives commands from a master control unit ("MCU") 1030 such as, for example, master control unit 300 previously described herein. In addition, as previously mentioned, the automated struts 1060 may include a communications interface. For example, in one embodiment, as illustrated in FIGS. 12 and 13, the automated struts 1060 may include a communications port 1062. In one embodiment, the communications port 1062 may be in the form of a micro-USB connector, and as shown in FIG. 13, the communication port 1062 may be connected to, mounted on, or the like, a strut printed circuit board ("PCB") 1064, which includes connectors to receive leads from the motor 1065 and the potentiometer 1069.

Thus arranged, as illustrated in FIG. 11, each automated strut 1060 may include its own on-board micro-controller 1061 arranged and configured to receive commands from the MCU 1030. Additionally, each automated strut 1060 may include a bridge or driver such as, for example, an H-Bridge motor driver 1063, arranged and configured to drive the motor 1065 of the automated strut 1060 to extend and retract the automated strut 1060 in response to a received electrical signal from the MCU 1030. In addition, the on-board micro-controller 1061 may also be arranged and configured to measure the position sensors (e.g., Hall Effect sensor 1067, rotary encoder 1068, and potentiometer 1069) and control the motor driver 1063, which drives the motor 1065.

In use, the position sensors (e.g., Line Tracking IR Sensors, Hall Effect sensor 1067, electrically adapted rotary encoder for absolute position 1068, and potentiometer 1069) may be arranged and configured to provide one or both of absolute and relative positions. The rotary encoder 1068 may be arranged and configured to count rotations and angular position of a rotating shaft and be interfaced with the on-board micro-controller 1061. As previously mentioned, the relative encoder can be adapted to become an absolute encoder electronically to control strut movement at any given time assuming there is no slippage in the drive train/gear mechanism. This can be achieved by using the MCU to read the output of the encoder such that it is logging its status directly into non-volatile memory continuously. The potentiometer 1069 may be implemented as a linear membrane potentiometer that is deformed by a sliding element "Wiper" attached to a leadscrew automated strut 1060, which will result in a short circuit at a designated contact point. The potentiometer 1069 may also be arranged and configured to interface with the on-board micro-controller 1061. A current sensor (such as, for example, a magnetic field sensor or the Hall-Effect sensor 1067) may be used to monitor DC current going to the motor 1065. The Hall-Effect sensor 1067 can be used to diagnose the health of the motor 1065 and help impose limits on the maximum torque, e.g. 0.05-1.0 N/m and axial force (350 N) applied to each automated strut 1060. The on-board micro-controller 1061 may be arranged and configured to control the speed and position of the motor 1065 and maintain the current extension/retraction position of the automated strut 1060 in, for example, non-volatile memory, such as an EEPROM. In the illustrated embodiment, each automated strut 1060 may also include memory such as, for example, flash memory, on the on-board micro-controller 1061 for storing program code. In other embodiments, extending and retracting of an automated strut may be driven by pneumatic, hydraulic, or other effective signals.

As generally shown in FIG. 11, each strut includes several components that in the disclosed embodiment may be surface mounted to the strut PCB 1064 (FIG. 13). Non-limiting example components of each automated strut 1060 include: on-board micro-controller 1061; a regulator, an input capacitor; a motor driver 1063; and a current sense 1067 with a current shunt monitor. In the illustrated embodiment, the micro-controller 1061 may be part number ATSAMD11D14A-UU from Microchip Technology Inc., size: 2.43 mm×1.93 mm, with 16 kB flash memory and 4 kB volatile memory; the capacitor may be part number C3216X5R1E476M160AC available from TDK, size: 11 mm2; the regulator may be part number LMZM23601V3SILR from Texas instruments, size: 19 mm2; the input capacitor may be part number C2012X5R1V106K085AC from TDK, size: 7 mm2; the motor driver may be part number H-Bridge Motor Driver DRV8876 from Texas Instruments, size 3.0×3.0 mm2; and the current shunt monitor may be part number INA138 from Texas Instruments.

In addition, as illustrated in FIG. 11, the automated struts 1060 may also include a switch 1153 arranged and configured to control power to the automated struts 1060. For example, in one embodiment, the switch 1153 may be a MOSFET switch arranged and configured to completely turn OFF power to the drive circuit to prevent quiescent current, when microcontroller 1061 is in low-power stand-by mode.

In addition, as illustrated in FIG. 11, the automated struts 1060 may also include a switch 1036 arranged and configured to control the flow of electricity in a circuit. For example, in one embodiment, the switch 1036 may be in the form of a reed switch that controls the flow of electricity in a circuit. In use, when the hermetically sealed electrical contacts become magnetized, they move together or separate when a magnetic field is moved towards the switch 1036. In one embodiment, the contacts can be used with BLE Beacons (struts) to switch between transmit and receive modes.

During use, in one embodiment, the voltage regulator 1034 compares the output voltage with a precise reference voltage and adjusts the pass device accordingly to maintain a constant output voltage. In the illustrated embodiment, the voltage regulator 1034 generates a fixed output voltage that remains constant for any changes in an input voltage or load conditions/fluctuations experienced by the automated struts 1060. This helps stabilize the DC voltages used by the MCU 1030 and other peripherals, such as, for example, a Bluetooth chip.

As previously mentioned, the automated spatial frame 1000 may include the control unit 1030, sometimes also referred to as the "centrally located master control unit," electrically connected to one or more of the multiple automated struts 1060, as shown in FIGS. 9-11 and 18. The control unit 1030 is arranged and configured to provide the one or more signals to the automated struts 1060. In one embodiment, the control unit 1030 may include memory such as, for example, flash memory, to store computer program instructions, a built-in real-time clock, an encoder interface, an EEPROM, low-power Bluetooth components, etc.

In addition, as previously mentioned and as generally illustrated in FIG. 9, the control unit 1030 may be housed in a waterproof structure and coupled to one of the platforms 1010, 1020, shown as second platform 1020. In some embodiments, the control unit 1030 may have alternate configurations and shapes. For example, the control unit 1030 may be in the form of a ring, the ring-shaped control unit arranged and configured to couple to one of the platforms, as previously described. Alternatively, the control unit 1030 may be provided in a smaller, more compact configuration and/or may be integrated into one of the platforms such as, for example, the second platform, or into some other component of the automated spatial frame 1000. Whether located on the second platform 1020, as illustrated, or located in or on some other component of the automated spatial frame 1000, the control unit 1030 is preferably located in a position where typical bone alignment correction or other operations of the automated spatial frame 1000 will not foul with the control unit or be inconvenient for a patient or healthcare provider.

Figures 18, 19:
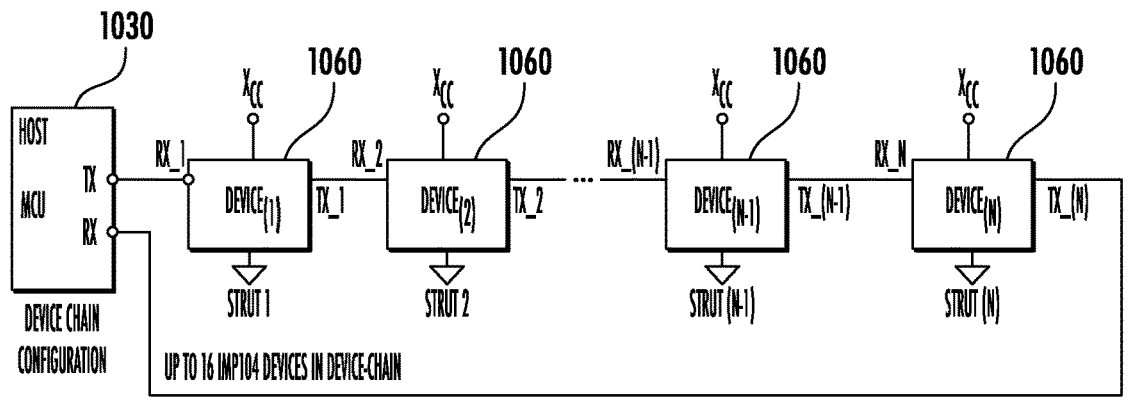
FIG. 18 illustrates a component diagram of an embodiment of a Universal Asynchronous Receiver/Transmitter (UART) for coupling to automated struts of an embodiment of the automated spatial frame in accordance with one or more features of the present disclosure.
FIG. 19 illustrates an embodiment of a spatial frame prescription or treatment plan for inputting into an external computing system to generate instructions to control an automated spatial frame.

In use, as previously mentioned, the control unit 1030 may be configured to receive spatial frame treatment plans either by a wired network or connection, such as a USB connection, or by a wireless network or connection, such as a Bluetooth connection. Such a connection may be provided through the communications channel 1190. An exemplary, sample treatment plan illustrating desired strut lengths on a sequence of days for each automated strut 1060 is illustrated in FIG. 19. In use, the control unit 1030 is arranged and configured to receive treatment plan data, which can be run in applications that work with dynamic link library (DLL), such as LabVIEW, Visual Basic or other C/C++ development environments. The control unit 1030 may also include instructions for an on-board algorithm that converts data from a text file correction treatment plan (e.g. JSON, XML, and YAML) to a format that can be used to individually control the length of the automated struts 1060. Thus, providing position control for "synchronized" automated struts 1060. The control unit 1030 may also be arranged and configured to send commands, instructions, signals, etc. to each of the automated struts 1060 (e.g., to each of the on-board micro-controllers 1061) through, for example, a cable connection in a sequence. Such an arrangement of serial control structure is further illustrated in FIG. 18. As depicted, a cable or wire may be routed between six automated struts 1060 and the control unit 1030 is arranged and configured in a daisy chained UART configuration; wherein a UART (Universal Asynchronous Receiver/Transmitter) is a microchip with programming that controls a computer's interface to its attached serial devices. The output (TX) of one UART is fed to the input (RX) on another one. Communication with the control unit 1030 is achieved via a standard UART to a "master" chip that is connected with differential lines to the other chips in the chain and uses a proprietary protocol. The daisy chained UART configuration offers at least the following advantages: only requires a single UART to communicate with many slave devices (e.g., struts 1060) in a chain; requires less wires (power, ground, data only) and so there is no need to run separate cables to each automated strut 1060; each automated strut 1060 location can be uniquely identified; data speed can be run at a slower rate, reducing issues with electrical noise and impedance control; data and power wires can be combined into one; and there is no requirements to implement a USB stack in the microcontroller, which facilitates use of a smaller microcontroller.

In one embodiment, referring to FIG. 11, the control unit 1030 is arranged and configured to interpret the incremental movements from the motors 1065 to calculate the relative and absolute positions of the automated struts 1060. As illustrated, the control unit 1030 also includes or is operatively coupled a power supply 1040 (e.g., an integrated power supply) to supply on-demand power for the entire spatial frame 1000. In use, the system can be arranged and configured with a low power stand-by mode (e.g., a sleep mode) and a high power mode. The system can be arranged and configured to automatically wake up from the low power stand-by mode with the help of a real-time clock, which is powered by the power supply (e.g., battery). In addition, the system and battery can be utilized to wake up the micro-controllers 1061 positioned in each of the automated struts 1060 at regular time intervals for automated distraction. Once the adjustments have been completed, the system may be arranged and configured to return to the sleep mode thereby reducing power consumption. By way of a non-limiting illustrative example, the anticipated motor power may be 0.18 Ah (2.16 Wh) per 90 days for 6 struts, which assumes 20 daily movements×90 days×6 struts and a DC motor voltage of 12V(0.06A) (at maximum load) or 12.96 Ah (155.52 Wh) assuming 1440 steps or daily movements per day at the same motor power and duration of use.

In addition, as shown and as previously mentioned, the control unit 1030 may also include memory for storing instructions, data, etc. and/or providing a user with a range of parameters through its memory storing instructions. For example, the control unit 1030 may store a spatial frame treatment plan, target strut lengths, lengthening direction, rate of distraction, rhythm of distraction, total amount of distraction, a lengthening schedule, number of turns of an automated strut motor or gear, and force exerted by the actuator.

In addition, as previously mentioned, the control unit 1030 may be arranged and configured with a communication interface such as, for example, a wireless communication transceiver 1190 (e.g., Bluetooth or other wireless communication protocol). In use, the communication transceiver 1190 may be utilized by, for example, a healthcare provider the ability to set, update, etc. various parameters remotely through an application such parameters may include, for example, rate of distraction, rhythm of distraction, total amount of distraction, etc. The application may also be used to monitor the progress of the distraction procedure, which may be recorded and stored in the on-board memory (e.g., flash memory).

Figure 17:
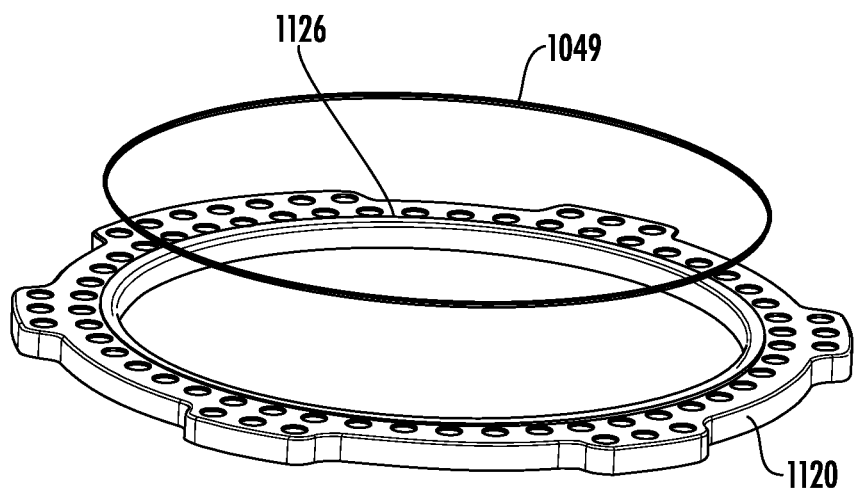
FIG. 17 illustrates an exploded perspective view of an embodiment of a platform of an automated spatial frame and a ring-shaped battery configured to fit within the platform in accordance with one or more features of the present disclosure.

Referring to FIGS. 9, 11, and 17, in one embodiment and as previously mentioned, the spatial frame 1000 may also include a power source 1040, 1049 arranged and configured to provide power to the automated struts 1060. As illustrated, the power source 1040 may be a battery arranged and configured to energize, power, etc. at least the control unit 1030 and the multiple automated struts 1060. In one embodiment, the power source 1040 may be integral with the control unit 1030, which is shown coupled to the second platform 1020 in FIG. 9. However, in other embodiments, the power source may be separate from the control unit 1030. For example, the power source may be arranged and configured to energize at least the multiple automated struts 1060 and may be coupled to one of the platforms 1010, 1020 separate from the control unit 1030. More specifically in some embodiments, an opening sized to receive a power source may be formed in an embodiment of a platform such that when the power source is in the opening, the power source fits substantially within a peripheral profile of the platform. As used herein, the term "peripheral profile" means the typical outer extents of individual component parts following the typical and normal contours of the parts, with profile boundaries extending across abrupt openings such as fabricated holes, grooves, slots, or notches. The power source 1040 may be removable for replacement or recharging or may be charged in place in, for example, the second platform 1020, the control unit 1030, etc.

For example, referring to FIG. 17, an alternate embodiment of a platform 1120 (e.g., the second platform) is illustrated. As illustrated, the platform 1120 includes a groove 1126. In one embodiment, the groove 1126 may be arranged and configured to extend substantially around a perimeter of the platform 1120. A power source 1049 may be in the form of a ring-shaped battery. The ring-shaped battery may be arranged and configured to fit within the groove 1126 formed in the platform 1120. Thus arranged, when seated in, positioned within, the groove 1126, the power source 1049 is within the peripheral profile of the platform 1120. In use, the power source 1049 may be removed for replacement or recharging or may be charged in place in the platform 1120. In use, the ring-shaped battery 1049 may be sealed within the groove 1126 via, for example, a lid such as, for example, lid 1025 illustrated in FIG. 16 (as will be described in greater detail below).

The power source 1040, 1049 may be any suitable power source now known or hereafter developed including, for example, a battery. The power source 1040, 1049 may be either rechargeable or single-use disposable. In some embodiments, especially for a small profile footprint requirement applications such as, for example, when the power source is in the form of a thin ring-shaped battery as illustrated in FIG. 17, the power source may be an ultra-thin LiPo battery (lithium-ion polymer battery).

Referring to FIG. 9, as illustrated in the example embodiment, the spatial frame 1000 shows the second platform 1020 coupled to the multiple automated struts 1060 and including integrated connectivity among two or more of the multiple automated struts 1060, the control unit 1030, and the power source 1040. Referring to FIGS. 12, 14, 15, and 17, additional details of the platform (e.g., second platform) 1020, 1120 are shown. Embodiments of the second platform 1020, 1120 may be referred to as a "smart" platform or ring where one or more of integrated connectivity, power, control circuitry, and processing ability are part of, or built into, the structure of the platform. As best illustrated in FIGS. 12-15, and as previously mentioned herein, the second platform 1020 may be arranged and configured to provide a conduit for powering and transferring data between a control unit, such as the control unit 1030, and each automated strut 1060 in sequence (serial connection as demonstrated in FIG. 18). For example, as illustrated, the second platform 1020 may be arranged and configured to provide an electrical connection between the control unit 1030 and each automated strut 1060, enabling each automated strut 1060 to receive power and instruction from the control unit 1030. In addition to these specific examples, any other effective means for providing integrated connectivity among the multiple automated struts, the control unit, and the power source are contemplated and incorporated herein. In addition, as previously mentioned herein, while the platform (e.g., second platform 1020) has been illustrated as having a substantially ring shape, in other embodiments the platform may be a ⅔ ring, half ring, foot ring, U-ring, or any other effective shape or size such as, for example, as previously described in connection with FIG. 5.

Figure 14:
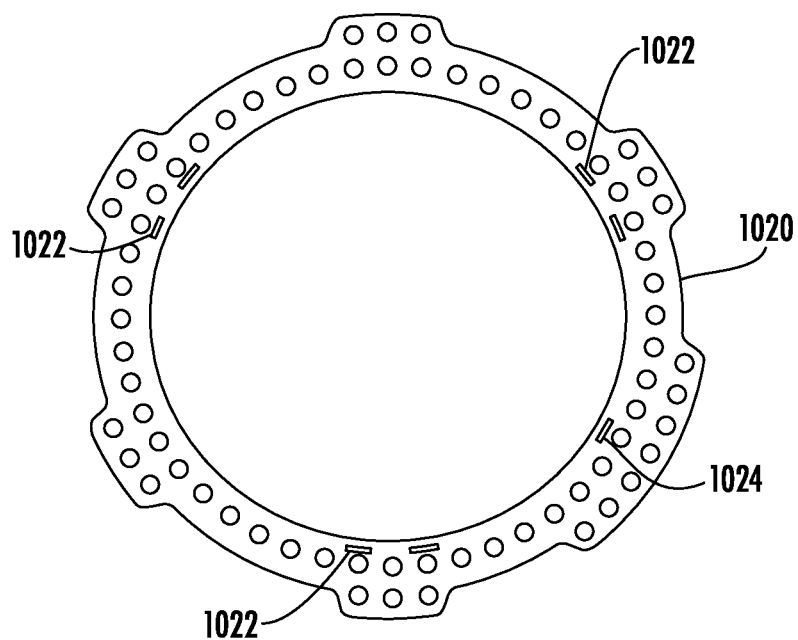
FIG. 14 illustrates a top plan view of an embodiment of a platform that may be used in connection with the automated spatial frame of FIG. 9 in accordance with one or more features of the present disclosure.

Referring to FIGS. 12-15, in one embodiment, connectors may be integrated or built into one of the platforms. For example, as best illustrated in FIG. 14, a plurality of connectors may be integrated into a surface of the platform. As illustrated, in one embodiment, seven connectors may be integrated into the surface of the platform. In use, the connectors can be any suitable connector now known or hereafter developed for transferring data and/or power. In one embodiment, the connectors may be in the form of a micro-USB connector as previously mentioned. For example, the connectors may be in the form of a female IP68 micro-USB connector. In one embodiment, six of the connectors may be arranged and configured as strut connector sockets 1022, the remaining connector may be arranged and configured as a control unit connector 1024. In use, the strut connector sockets 1022 are arranged and configured to coincide with positions for placement of the automated struts 1060 (as best illustrated in FIG. 12). The control unit connector 1024 is arranged and configured to coincide with the location of the control unit 1030. As will be appreciated by one of ordinary skill in the art, the number and position of the connectors can be altered to coincide with the arrangement and configuration of the spatial frame being assembled.

Figure 15:
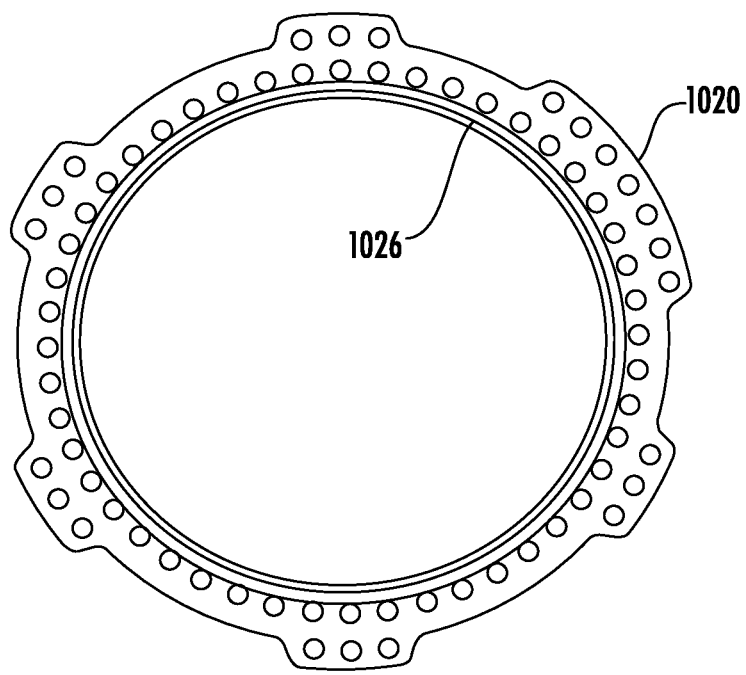
FIG. 15 illustrates a bottom plan view of the platform of FIG. 14.
Figure 16:
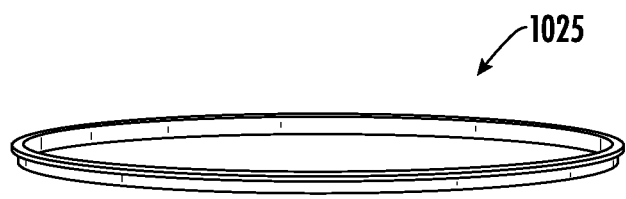
FIG. 16 illustrates a perspective view of an embodiment of a lid arranged and configured to press-fit into a recess formed in a surface of the platform shown in FIG. 15 to seal the recess and its contents in accordance with one or more features of the present disclosure.

In addition, referring to FIG. 15, in one embodiment, the platform (shown as the second platform 1020) is arranged and configured with a recess 1026 arranged and configured for routing data and power connections, wires, or cables between the control unit 1030 and the multiple automated struts 1060. In use, the data and power connections, wires, or cables may be hermetically sealed within the recess 1026 formed in the second platform 1020 using any suitable method and/or material now known or hereafter developed such as, for example, a press-fit plastic or metal lid or a biocompatible potting compound (e.g., medical grade epoxy, silicone elastomer, polyurethane material, etc.). Referring to FIG. 16, an embodiment of a lid 1025 arranged and configured to seal the recess 1026 is illustrated. Thus arranged, the data and power connections, wires, or cables routed or passing through the second platform 1020 are located substantially within the peripheral profile of the second platform 1020. In some embodiments, control circuitry embedded in a platform may be connected to the control unit 1030 with a standard two-wire serial bus.

In one embodiment, the platforms 1010, 1020 are preferably arranged and configured so that the outer diameter, thickness, and hole configuration are substantially unaltered with respect to a standard configuration such as, for example, current platforms used in connection with a TAYLOR SPATIAL FRAME® brand spatial frame manufactured and sold by Smith & Nephew, Inc. Thus arranged, by maintaining the same outer diameter as a standard platform reduces the likelihood of collisions with objects in a patient environment, which can negatively impact a patient's experience. Maintaining continuing, consistent dimensions also avoids interference or complications with existing spatial frame hardware. In the illustrated embodiment, the inner diameter for the 180 mm diameter ring-shaped platform has been decreased from 7.060" (179.32 mm) to 6.863" (174.32 mm) (−5 mm) to accommodate the routed data and power connections, wires, or cables and connectors. Thus arranged, for the illustrated embodiment, the second platform 1020 including integrated connectivity may be designated as having substantially the same peripheral profile as the first platform 1010. For the purposes of remaining substantially within a peripheral profile as used herein, connector tails 1029 extending from the strut connector sockets 1022 to the communications ports 1062 (as illustrated in FIG. 12) will be considered insubstantial deviations from the peripheral profile. Maintaining current hole patterns is also important to ensure continuing accurate operation of existing solution algorithms that provide adjustment treatment plans because the algorithms rely on platform sizes and hole patterns as previously mapped.

In use, the connector tails 1029 are arranged and configured as a service loop. For example, in one embodiment, the connector tails 1029 may include 4 wires (Data+, Data−, GRND, Vcc) that connect the automated struts 1060 to the Smart Ring. Thus, the connector tails 1029 are arranged and configured as a conduit for transferring power and/or data between the automated struts 1060 and the Smart Ring. Alternatively, the electrical cable between the automated struts 1060 and the Smart Ring may be routed through the connectors (e.g., U-Joint) using techniques for internally managing cables.

Alternatively, in some embodiments, the first and second platforms 1010, 1020 may be altered slightly. For example, in one embodiment, the "180 mm" ring-shaped platform may be altered to have the following dimensions: an inner diameter of 6.59" (167.32 mm), an outer diameter of 8.24" (209.3 mm), a platform width of 21 mm (which is +6 mm larger than a standard ring-shaped platform), and a thickness of 8 mm.

Once again, referring to FIGS. 9 and 11, in one embodiment, the spatial frame 1000 is operatively coupled to an external computing device 1200 such as, for example, a desktop computer, a laptop computer, a server, or the like (as illustrated in FIG. 9) or a mobile computing device such as, for example, a mobile device, a smartphone, a tablet, or the like (as illustrated in FIG. 11). In use, the external computing device 1200 is arranged and configured to execute control instructions to receive, generate, etc. a spatial frame treatment plan such as, for example, as illustrated in FIG. 19, and to communicate with the control unit 1030 to, for example, transmit the treatment plan to the control unit 1030 for use in determining changes (e.g., lengthening, shortening, etc.) to the multiple automated struts 1060 to carry out the treatment plan. In use, the external computing device 1200 arranged and configured to execute control instructions to receive the spatial frame treatment plan may execute control instructions to present a user interface 1210 through which the spatial frame treatment plan may be received. In some embodiments, only pre-cursor data from which the computing device 1200 calculates the treatment plan may be received at the user interface 1210, or all or part may otherwise be received, for example, by file transfer.

Figure 20:
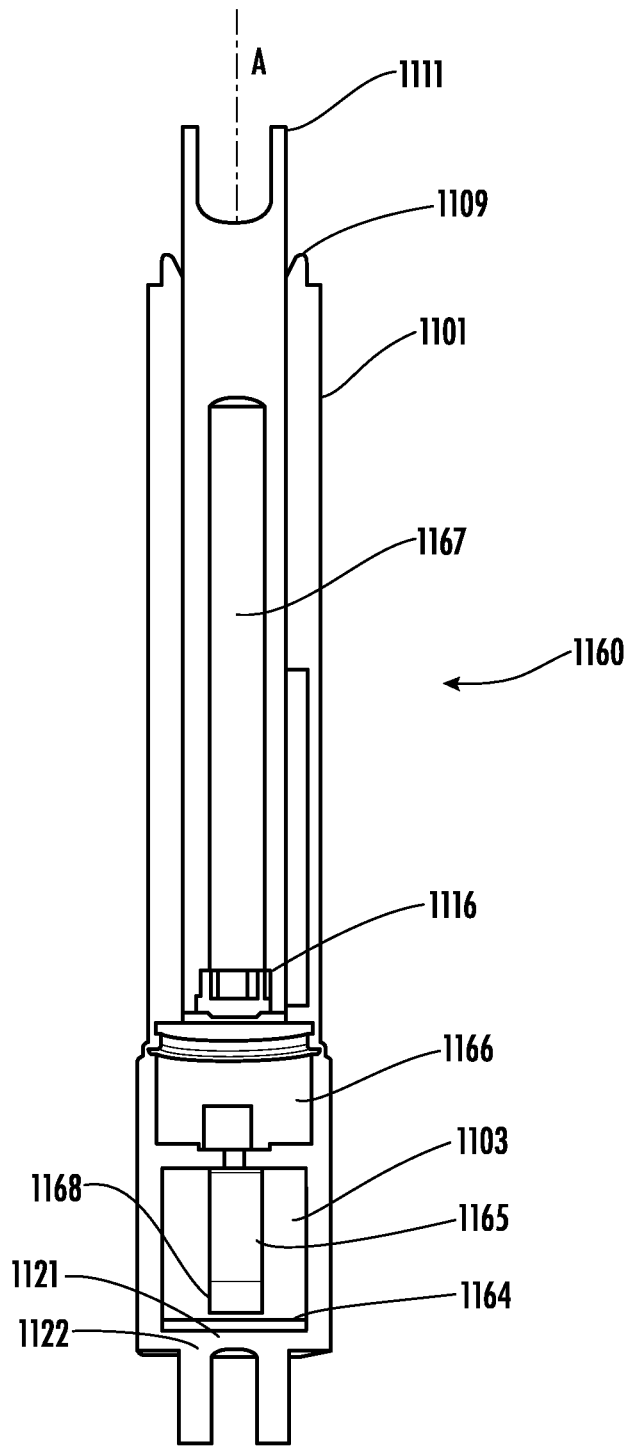
FIG. 20 illustrates a cross-sectional view of an alternate embodiment of a wireless automated strut that may be used in a spatial frame in accordance with one or more features of the present disclosure.

Referring to FIG. 20, an alternate embodiment of an automated strut 1160 is disclosed. In use, the automated strut 1160 includes a wireless communication module or transceiver arranged and configured to transmit and receive wireless messages, instructions, data, etc. Thus arranged, the automated strut 1160 eliminates the need for wiring external to the strut 1160 since the strut 1160 relies on wireless communication rather than relying on wiring to transmit and receive messages, instructions, data, etc., thus the struts 1160 may be referred to as a wireless automated strut.

As illustrated, in one embodiment, the wireless automated strut 1160 includes a DC motor 1165, a transmission 1166 coupled to an output shaft of the motor 1165 and a space 1167 arranged and configured to receive a rod such as, for example, a threaded rod, a distraction rod, a lead screw, etc. (not shown in FIG. 20 but generically illustrated in FIG. 23 as 1444). In addition, the wireless automated strut 1160 may include an outer body or guide tube 1101 and an inner body or push tube 1111 positioned within the guide tube 1101. In use, the push tube 1111 is operatively coupled to the threaded rod by, for example, a guide tube nut 1116, although other mechanisms for coupling the threaded rod to the push tube 1111 may be used. In addition, the wireless automated strut 1160 may include a power source (e.g., a battery) 1103 and a printed circuit board ("PCB") 1164. As illustrated, in one embodiment, the power source 1103 and the PCB 1164 may be positioned adjacent to the motor 1165. The wireless automated strut 1160 may also include one or more position sensors such as, for example, a rotary encoder 1168 located adjacent to the motor 1165. As illustrated, the PCB 1164, the rotary encoder 1168, the motor 1165, the battery 1103, the transmission 1104, the guide tube nut 111, and the push tube 1111 are housed within the outer body or guide tube 1101. The wireless automated strut 1160 may also include a cap 1109 for closing an end of the guide tube 1101.

Additionally, the wireless automated strut 1160 may include a load cell 1122 and inertial sensor 1121 located adjacent the motor 1165. During use, the load cell 1122 and the sensor 1121 enable all three forces and three moments in the strut 1160 to be measured separately and with a relatively simple mechanical arrangement, which can be utilized to help evaluate the individual pattern of bending stiffness. The bending stiffness can be correlated to the different stages of healing. The sensor data can be used in a controlled feedback loop to independently actuate the wireless automated struts 1160 by controlling the force or extension/compression of the frame. The load cell 1122 may be an array of either foil strain gauges or thin film gauges. Alternatively, the load exerted on the motor can be inferred from the motor current, the distance travelled from the rotary encoder and the energy delivered during this travel as a function of the change in capacitor voltage. The length of the wireless automated strut 1160 may also be measured using the inertial sensor 1121, which measures the angle of the strut 1160 relative to a gravity vector. That is, when the angles of the struts are combined, a mathematical method may be employed to calculate the length of the strut 1160.

Figure 23:
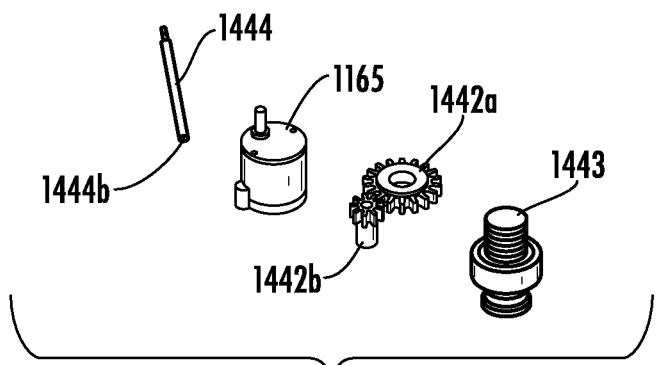
FIG. 23 illustrates an exploded view of an embodiment of a transmission assembly that may be utilized in the wireless automated strut of FIG. 20.

Referring to FIG. 23, mechanical operation of the wireless automated strut 1160 will now be described. As illustrated, the motor 1165 may include an output pinion gear 1442*b* coupled thereto and a ring gear 1442*a* may be operatively coupled to the pinion gear 1442*b*. Although a ring and pinion gear arrangement is shown in FIG. 23, other gear/motor arrangements may be used including, for example, a worm gear inside the motor housing with a gear reduction ratio of, for example, 300:1. The arrangement shown in FIG. 23 is but one of many possible arrangements and is thus provided for illustrative purposes and is not intended to limit this disclosure unless explicitly claim. In use, the pinion gear 1442*a* is coupled to a lead screw 1444 (e.g., the threaded rod) at a distal end portion 1444*b* of the lead screw 1444. A bushing 1443 may be used. In use, the bushing 1443 slides over the lead screw 1444 adjacent to the distal end portion 1444*b*. Ball bearings (e.g., deep-grooved ball bearings) in the bushing 1443 allow the lead screw 1444 to move in two directions while reducing frictional stress and the loads exerted on the motor 1165.

In use, the motor 1165 is energized causing the output pinion gear 1442*b* to rotate. Rotation of the pinion gear 1442*b* turns the ring gear 1442*a* and the lead screw 1444. As the lead screw 1444 turns, the lead screw threads engage the push tube nut 1116 (FIG. 20) and the push tube nut 1116 exerts a force on the push tube 1111 (direction A in FIG. 20), lengthening the wireless automated strut 1160. The wireless automated strut 1160 may also be shortened if the pinion gear 1442*b* turns in the opposite direction. In one embodiment, the lead screw 1444 may also be coated with a lubricant such as mineral oil or may be surface treated to improve the lubricity of the lead screw threads improving the torque capability of the motor.

Figure 21:
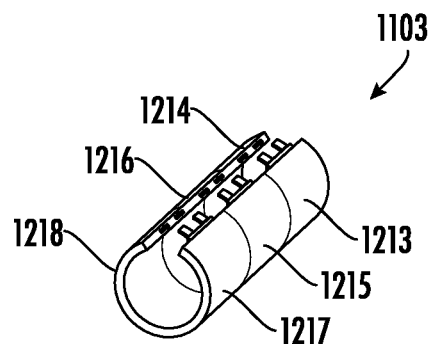
FIG. 21 illustrates an embodiment of a power source (e.g., a flexible battery) that may be utilized in the wireless automated strut of FIG. 20.

Referring to FIG. 21, an embodiment a power source (e.g., battery) 1103 that may be used in the wireless automated strut 1160 is illustrated. In one embodiment, the power source 1103 may be in the form of a flexible LiPo battery (lithium-ion polymer battery). For example, as illustrated, the power source (e.g., battery) 1103 may include 6 cells 1213, 1214, 1215, 1216, 1217, and 1218, with three pairs of two cells wired in parallel, although this is but one example and other numbers and arrangements of cells may be used. In one embodiment, the single cell capacity at min. may be 130 mAh at 3.8V. Thus combined, the total capacity may be equivalent to 260 mAh and 11.4 V. In use, the battery 1103 illustrated in FIG. 21 may be wrapped around the housing of the motor 1165 to make the wireless automated strut 1160 more compact. While a flexible LiPo battery has been described and illustrated, other suitable batteries may be used. For example, a standard battery such as, for example, a CR1620 3V battery, could be used with the wireless automated strut 1160 of the present disclosure in conjunction with a charge pump circuit, which may be arranged and configured to convert 3V to 20V and is responsible for driving the motor. In use, any suitable battery now known or hereafter developed may be used. The power source (e.g., battery) 1103 may be either rechargeable or single-use disposable.

Figure 22:
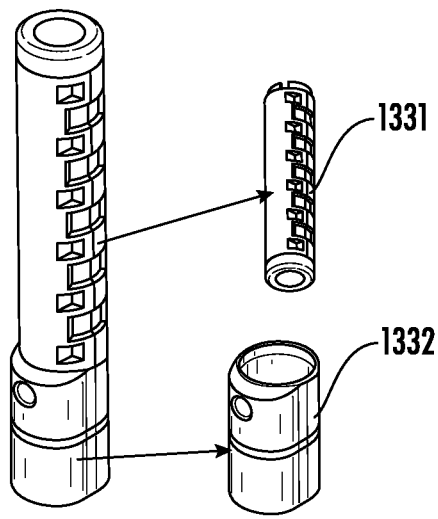
FIG. 22 illustrates a perspective view of an alternate embodiment of a guide tube that may be utilized in the wireless automated strut of FIG. 20, FIG. 22 illustrating a main body assembly and a family of main body assembly sizes.
Figure 22:
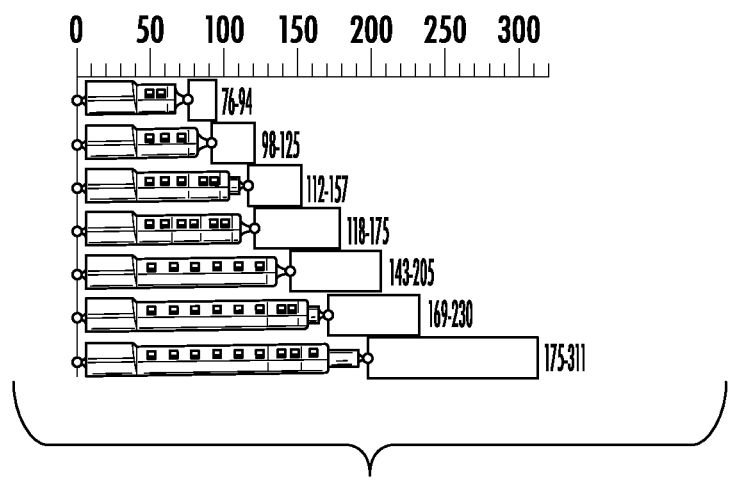

As will be appreciated by one of ordinary skill in the art, prior art struts are typically available in a variety of lengths so as to accommodate a wide variety of patients and deformity corrections needed. In accordance with another feature of the present disclosure, referring to FIG. 22, an additional benefit of the present disclosure is that the guide tube 1101 of the wireless automated strut 1160 may be arranged and configured to be translucent to X-rays. As illustrated, in one embodiment, the guide tube 1331 may be provided, available, etc. in a range of sizes and may be made of a polymer thus enabling the guide tube 1331 to be translucent to X-rays. The resulting assembly is also lighter in weight than traditional struts, and easier to assemble. In use, the guide tube 1331 may be coupled with a housing 1332. The housing 1332 may be made of anodized aluminum, another metal or a polymer. In use, the enclosure, which is designed to fit the gearbox can handle the load, being compact and sturdy. This reduces any force that comes on motor shaft.

Figure 24:
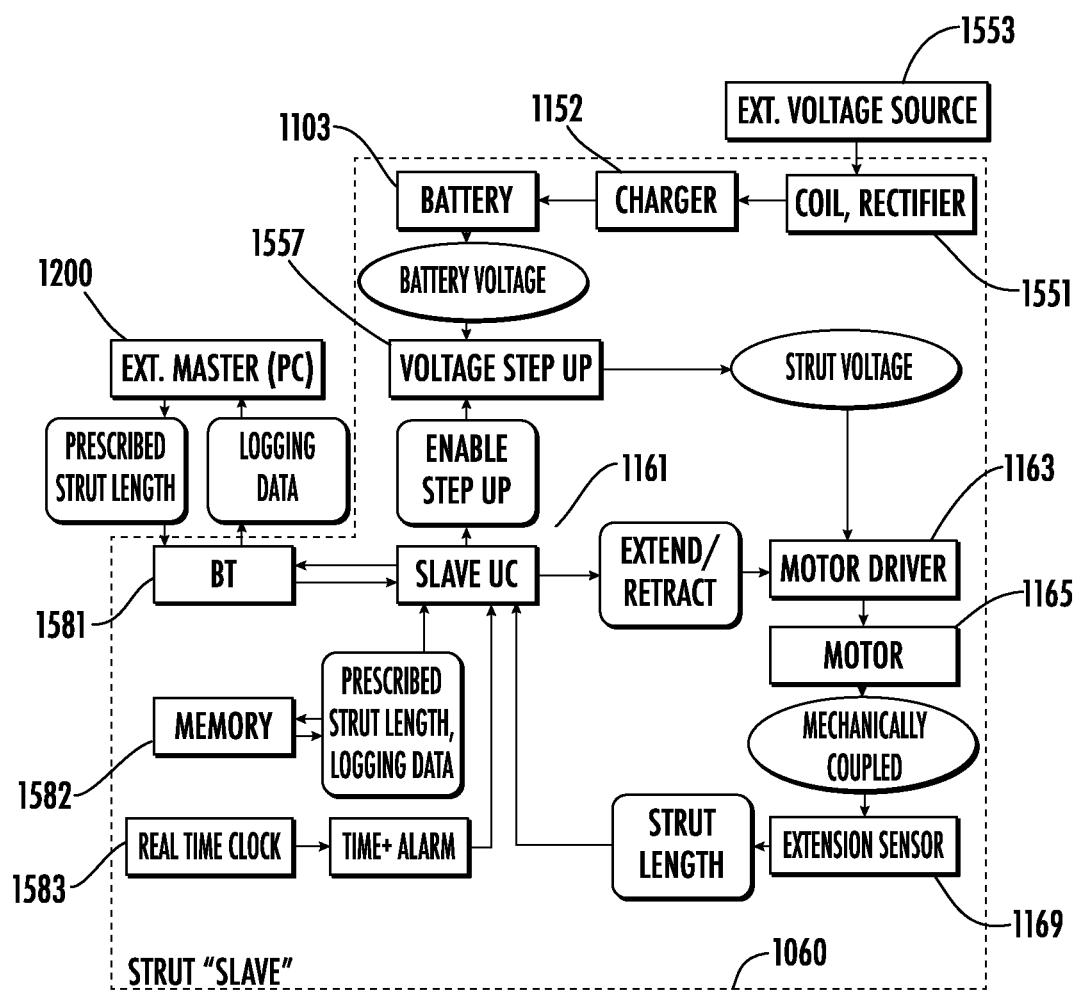
FIG. 24 illustrates an embodiment of a system level diagram showing the operation and/or functionality of the wireless automated strut of FIG. 20.

Referring to FIG. 24, an embodiment of a system level diagram of the operation and/or functionality of the wireless automated strut 1160 is illustrated. As previously mentioned, the wireless automated strut 1160 includes a wireless communication module 1581 electrically connected to the PCB 1164. In addition, the PCB 1164 is connected to the motor 1165, the potentiometer 1169, and the rotary encoder 1168. For example, in one embodiment, the PCB 1164 may include connectors to receive leads from the motor 1165, the potentiometer 1169, and the rotary encoder 1168. In addition, the PCB 1164 may include memory 1582, a real time clock 1583, and a microcontroller 1161. Each wireless automated strut 1160 may include its own microcontroller 1161 that receives commands from a master controller such as, for example, the external computing device 1200. In addition, each wireless automated strut 1160 may include a motor driver such as, for example, an H-Bridge motor driver 1163 arranged and configured to drive the motor 1165 of the wireless automated strut 1160 to extend and retract the strut 1160 in response to electrical signals from the microcontroller 1161. In addition, in one embodiment, the on-board micro-controller 1161 is arranged and configured to measure the signals from the rotary encoder 1168 and the potentiometer 1169. As previously mentioned, the potentiometer 1169 is arranged and configured to provide one or both of absolute and relative strut positions. The rotary encoder 1168 may be arranged and configured to count rotations and angular position of a rotating shaft such as, for example, the lead screw, the threaded rod. One embodiment of a rotary encoder 1168 that may be used in the wireless automated strut 1160 is illustrated in FIG. 25. In one embodiment, referring to FIGS. 26 and 27, the potentiometer 1169 may be implemented as a linear membrane potentiometer that is deformed by a sliding element "Wiper" attached to the lead screw, which will result in a short circuit at a designated contact point.

In addition, the wireless automated strut 1160 may include a current sensor (not shown) such as, for example, a magnetic field sensor, a Hall-Effect sensor, or the like. The current sensor may be arranged and configured to monitor DC current going to the motor 1165. The current sensor can be used to diagnose the health of the motor 1165 and help impose limits on the maximum torque, (e.g. 0.05-1.0 N/m and axial force (350 N)) applied to each wireless automated strut 1160. The microcontroller 1161 controls the speed and position of the motor 1165 and maintains the current extension/retraction position of the wireless automated strut 1160 in the memory 1582. In one embodiment, the memory 1582 may be non-volatile memory such as, for example, EEPROM. In the illustrated embodiment, each wireless automated strut 1160 may also include flash memory coupled to the on-board micro-controller 1161 for storing, for example, program code. In some embodiments, extending and retracting of the wireless automated strut 1160 may be driven by pneumatic, hydraulic, or other effective signals.

During use, in the illustrated embodiment, the microcontroller 1161 is arranged and configured to interpret the incremental movements of the rotary encoder 1168 and the potentiometer 1169 to calculate the relative and absolute positions of the wireless automated strut 1160. These sensors can also provide a layer of redundancy to ensure that the sensors are measuring the same length of extending or shortening. A discrepancy between the extension calculated by the rotary encoder 1169 and the potentiometer 1169 can alert a user and/or cause the wireless automated strut 1160 to temporarily hold the current length.

In addition, in one embodiment, the microcontroller 1161 may also be arranged and configured to provide integrated power supply "on-demand" for the entire system. The system can automatically wake up from low power stand-by mode with the help of the built-in real-time clock 1583, which is powered by a battery that wakes up the microcontroller 1161 at regular time intervals for automated distraction. Once the adjustments have been completed, the system can be arranged and configured to return back to sleep mode, reducing the power consumption. The microcontroller 1161 may also provide a user with a range of parameters through its memory storing instructions. For example, a spatial frame treatment plan, target strut lengths, lengthening direction, rate of distraction, rhythm of distraction, total amount of distraction, a lengthening schedule, number of turns of an automated strut motor or gear, and force exerted by the actuator. The microcontroller 1161 as configured through the wireless communication module 1581 may give a healthcare provider the option to set various parameters remotely through an application running on, for example, the external computing system 1200 (e.g., desktop computer, laptop computer, server, mobile device, smartphone, laptop, or the like). The various parameters may include, for example, rate of distraction, rhythm of distraction, total amount of distraction, etc. The application also monitors the progress of the distraction procedure. The progress of the distraction procedure is recorded in the on-board flash memory. In use, the wireless communication module 1581 may be any suitable wireless transceiver now known or hereafter developed and may utilize any now known or hereafter developed wireless communication format including, for example, Bluetooth, BLE, Wi-Fi, Zigbee, Z-Wave, WiMax of the like.

As illustrated in FIG. 24, in one embodiment, the power source (e.g., battery) 1103 for energizing the wireless automated strut 1160 may be rechargeable, and may include a coil and rectifier 1551 mounted on the PCB and configured to receive power from an external voltage source 1553. The rectifier may send voltage to a charger 1152, which is arranged and configured to charge the battery 1103. To step up the voltage needed to drive the motor 1165, in certain embodiments the voltage may be stepped up via a voltage step-up 1557.

As previously mentioned, the external computing system 1200 may be arranged and configured to receive spatial frame treatment plans either by a wired network or connection, such as, for example, a USB connection, or by a wireless network or connection, such as, for example, a Bluetooth connection. In use, the external computing system 1200 is arranged and configured to receive treatment plan data, which, in some embodiment, can be run in applications that work with dynamic link library (DLL), such as LabVIEW, Visual Basic or other C/C++ development environments. The external computing system 1200 may also include instructions for an on-board algorithm that converts data from a text file correction treatment plan (e.g. JSON, XML, and YAML) to a format that can be used to individually control the length of the wireless automated struts 1160. This may be used to provide position control for "synchronized" wireless automated struts. The external computing system 1200 may also be arranged and configured to send commands to each of the on-board microcontrollers 1161 wirelessly in a sequence. Additionally, each wireless automated strut 1160 may be arranged and configured to communicate with the other struts in the spatial frame, can follow a common synching signal, can preserve a full status understanding of the system as a whole, and can interact with an external smart application, such as, for example, a smartphone.

In accordance with another feature of the present disclosure, another particular advantage provided by wireless automated struts 1160 according to the present embodiment arises from the initial setup of the wireless automated struts 1160 on a spatial frame such as, for example, spatial frame 1000. Generally speaking, each strut on a spatial frame is normally supplied with a treatment plan for lengthening or shortening and this treatment plan is strut-specific. It follows from this that each strut needs to be correctly identified at its location on the frame before adjustments can be made. Strut identification can be accomplished with the present embodiments by placing an accelerometer or other motion-sensing device on the spatial frame after the frame has been placed on the patient. At this point, a user can cause one of the struts to distract. This distraction results in a motion detectable by the accelerometer and can be used to identify the location of that particular strut. This location can then be recorded in memory 1582. In this way, the initial setup of the external computing system 1200 is rendered easier for a surgeon or other operator.

Alternatively, in another embodiment, easier setup of the spatial frame may be achieved by uniquely identify each wireless automated strut 1160 using Part Serialization/Tracking: a UHF Passive RFID Wet Inlays. In this embodiment, an integrated circuit, which may be provided as a label arranged and configured to be adhered to the struts can be utilized. In use, the label is arranged and configured to store and process strut information. A user can interrogate each strut and obtain, for example, a Strut Number, a Strut Size, a Manufacturer/Part Number/Lot Number. The passive RFID inlay also has an antenna for receiving and transmitting the signal (860-960 MHz) through the plastic push tube strut casing unit. This information may then be integrated with the treatment plan.

Referring to FIG. 28, an embodiment of a wireless communications module 1581 is illustrated. As illustrated, the wireless communications module 1581 may be a PAN1322 Place & Play Bluetooth® Module. In use, the wireless communications module 1581 may be smartphone compatible and may include an embedded microcontroller, Bluetooth 2.1+EDR stack, serial port profile (SPP), AT command set API, and antenna. However, as previously mentioned, the wireless communication module 1581 may be any suitable wireless communication module or transceiver now known or hereafter developed and may utilize any now known or hereafter developed wireless communication format including, for example, Bluetooth, Wi-Fi, of the like.

Referring to FIGS. 29A-29F, an alternate embodiment of an automated strut 2160 is disclosed. In use, the automated strut 2160 includes a wireless communication module or transceiver arranged and configured to transmit and receive wireless messages, instructions, data, etc. Thus arranged, the automated strut 2160 eliminates the need for wiring external to the strut 2160 since the strut 2160 relies on wireless communication rather than relying on wiring to transmit and receive messages, instructions, data, etc., thus the struts 2160 may be referred to as a wireless automated strut. The wireless automated strut 2160 is substantially similar to the wireless automated strut 1160 discussed above. Thus, for the sake of brevity, discussion of all of the components is eliminated to reduce duplication.

Figure 29A:
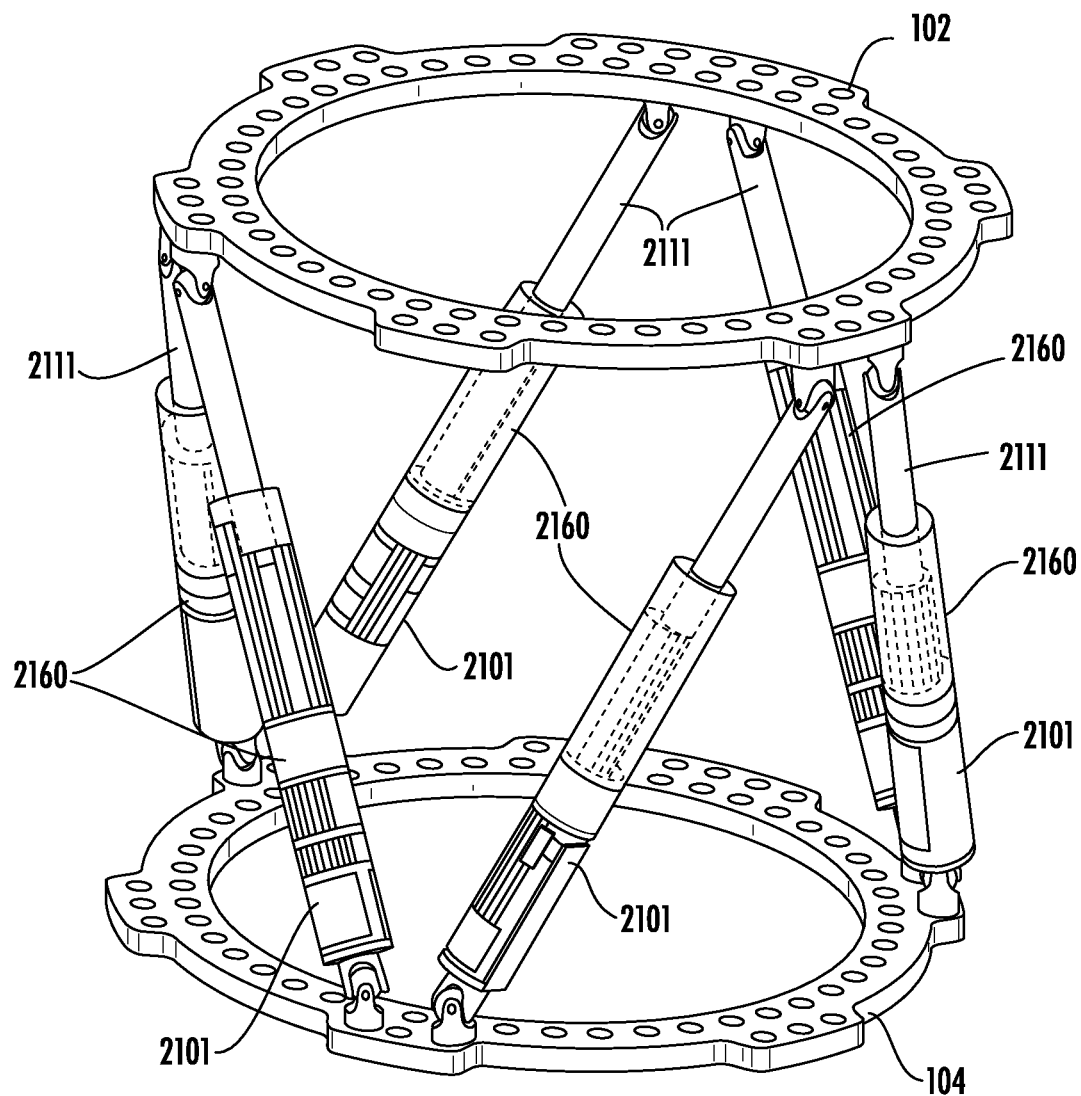
FIG. 29A illustrates a perspective view of an embodiment of an automated spatial frame incorporating a plurality of automated wireless struts in accordance with one or more features of the present disclosure.
Figure 29B:
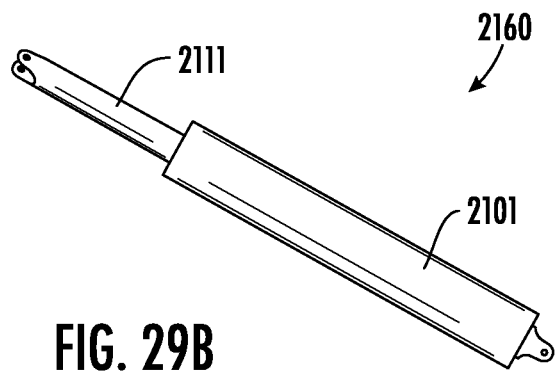
FIGS. 29B-29D illustrate various perspective views of an embodiment of a wireless automated strut that may be used in the spatial frame of FIG. 29A, the figures illustrating the automated wireless strut with various levels of transparency.

As illustrated in FIG. 29A, in one embodiment, six wireless automated struts 2160 may be coupled to first and second platforms such as, for example, platforms 102, 104. Referring to FIGS. 29B-29F, in one embodiment, the wireless automated strut 2160 includes a DC motor 2165, a transmission 2166 coupled to an output shaft of the motor 2165 and a lead screw 2144. In addition, the wireless automated strut 2160 may include an outer body or guide tube 2101 and an inner body or push tube 2111 positioned within the guide tube 2101. In use, the push tube 2111 is operatively coupled to the lead screw 2144. In addition, the wireless automated strut 2160 may include a power source (e.g., a battery) 2103 operatively coupled to a charge pump circuit and a printed circuit board ("PCB") 2164. As illustrated, in one embodiment, the power source 2103 and the PCB 2164 may be positioned adjacent to the motor 2165.

As illustrated, in one embodiment, the transmission 2166 for coupling the output shaft of the motor 2165 to the lead screw 2144 may include a plurality of gears such as, for example, a pinion gear 2166A coupled to the output shaft of the motor 2165 and a spur gear 2166B coupled to the pinion gear 2166A and the lead screw 2144, although other mechanisms for coupling the lead screw 2144 to the motor 2165 may be used. In addition, as illustrated, the transmission 2166 may include, or be operatively associated with, a thrust bearing 2443 and a deep groove bearing 2444.

As previously described in connection with the automated strut 1160, the wireless automated strut 2160 may also include one or more position sensors such as, for example, a rotary encoder. As illustrated, the PCB 2164, the motor 2165, the battery 2103, the transmission 2166, and the push tube 2111 are housed within the outer body or guide tube 2101. The wireless automated strut 2160 may also include a cap for closing an end of the guide tube 2101.

Figure 29C:
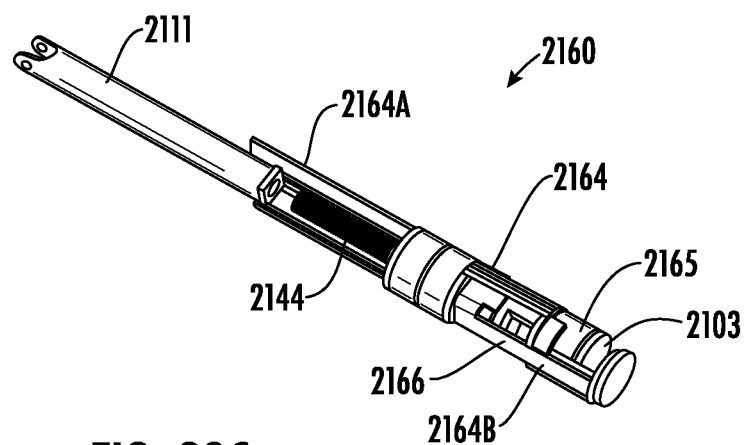
Figure 29D:
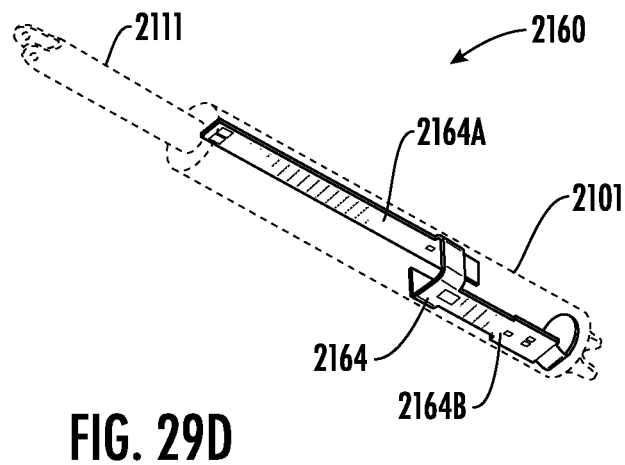
Figure 29E:
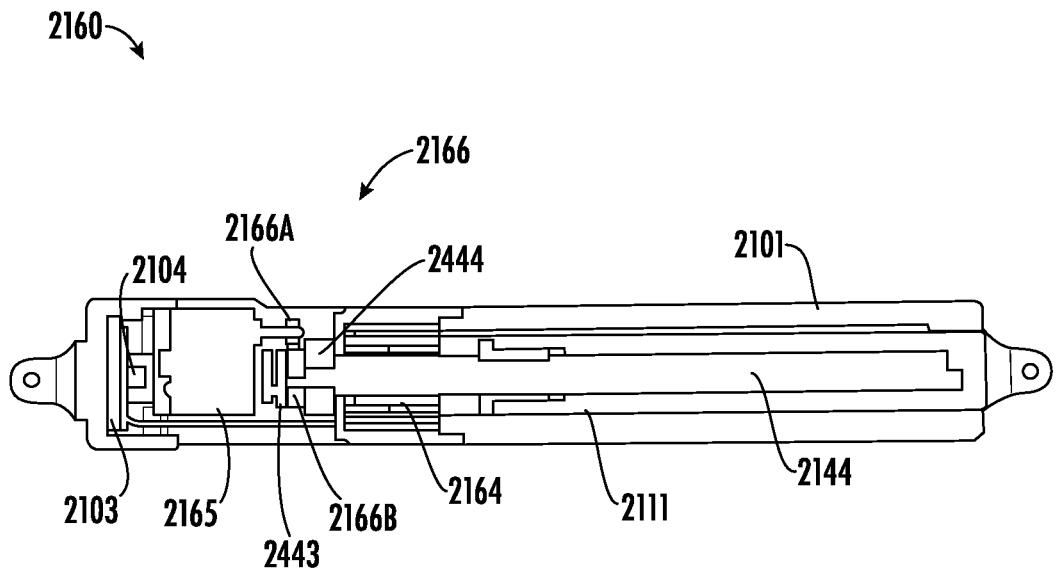
FIG. 29E illustrates a cross-sectional view of the wireless automated strut shown in FIGS. 29B-29D.

Referring to FIGS. 29C and 29E, the battery 2103 of the wireless automated strut 2160 may be in the form of a coin battery. In use, the coin battery 2103 may be used in combination with and a charge pump circuit. The combination of a coin cell, e.g. CR1620 3V battery, and a charge pump circuit ensures that the automated struts 2160 can be powered for a minimum of 90 days and a distraction rhythm of 1440 movements per day. A boost converter may also be utilized to maintain a system voltage of 3V even when battery voltage has dropped below 2.7V. In use, the capacitor charge pump circuit can drive the motor 2165 in short increments by discharging the capacitor 2104 in pulses from a charged capacitor and a 3V coin cell. This approach ensures that the reservoir supplies sufficient energy at the appropriate voltage to turn the motor 2165 at any given time. The amount of energy that has been discharged from the capacitor 2104 in any discharge pulse can be determined by monitoring the change in voltage on the capacitor. By simultaneously monitoring the angular change in the motor spindle, the torque resistance presented to the motor 2165 during the discharge pulse can be accurately determined.

Figure 29F:
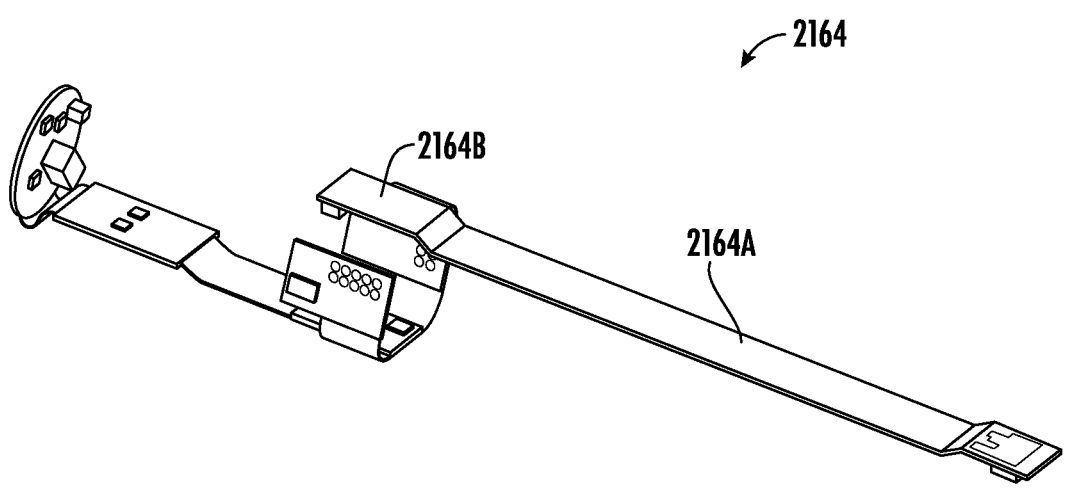
FIG. 29F illustrates a perspective view of an embodiment of a flex-rigid PCB assembly that may be used in the wireless automated strut of FIGS. 29B-29E in accordance with one or more features of the present disclosure.

Referring to FIGS. 29C, 29D, and 29F, the PCB 2164 may include, or be in the form of, a single flex-rigid PCB assembly housed within the main body. A flex-rigid PCB assembly 2164 uses a combination of flexible 2164A and rigid 2164B board technologies in a single application. Thus arranged, the flex-rigid PCB assembly 2164 eliminates any need for bulky connectors. In a flex-rigid PCB assembly 2164, a series of small panel rigid sections may be fitted into gaps in the mechanical design, joined by, for example, flexible tails. In use, the flex-rigid PCB assembly 2164 is arranged and configured to control the motor 2165 as needed including, for example, to turn the motor 2165 on and off upon the lead screw 2144 reaching a certain position. In one embodiment, the flex-rigid PCB assembly 2164 may include one or more of a voltage regulator, a wireless communications module, e.g. Bluetooth transceiver, reed switch, NTC thermistor, RTC crystal, bridge driver circuit, debugger unit, encoder voltage translator, motor charge pump, encoder charge pump, external motor connector, a transformer, an ammeter, a microcontroller, and memory.

In connection with the wireless automated struts 1160, 2160 disclosed herein, it should be appreciated that the wireless automated struts 1160, 2160 can be designed to function as a Bluetooth Low Energy (BLE) beacon to allow key status variables to be determined continuously by the microcontroller positioned within each of the wireless automated struts 1160, 2160. For example, the determine or monitor (a) strut extension (with a resolution >0.1 micron), (b) motor temperature (accurate to 0.05° C.), (c) strut linear mechanical load (accurate 0.1 N) and (d) strut battery level (accurate to 0.1V). In use, strut extension can be determined by both coarse (relative) and fine position (absolute) measuring elements simultaneously using, for example, infrared line tracking sensors and an electrically adapted optical incremental encoder respectively. Motor current and temperature can be used to track the health status of the geared motor using, for example, a sense resistor and differential amplifier and a Negative Temperature Coefficient (NTC) thermistor respectively. Strut linear mechanical load can be determined indirectly through the motor current, the distance travelled from the rotary encoder and the energy delivered during this travel as a function of the change in capacitor voltage. Strut battery level can be monitored indirectly as the analog-to-digital converter (ADC) value for a fixed external reference voltage.

In addition, the wireless automated struts 1160, 2160 incorporate intelligence through its sensing capabilities/status monitoring. For example, the wireless automated struts 1160, 2160 may be arranged and configured to determine or monitor: (a) absolute positional sensing to track movement of each strut, (b) current sensing to check motor health and potentially determine the load/toque exerted on the motor, (c) temperature sensing capabilities to monitor either overheating, overload or insufficient cooling of the motor providing thermal protection of the coil windings, and (d) potential for "self-adjustment" capability in terms of providing automated real time updates to the distraction rate and rhythm based on measured forces exerted on the motor. In one embodiment, each strut may be arranged and configured to track movement to an accuracy to $1/1440^{th}$ mm, The wireless automated struts 1160, 2160 may also be arranged and configured to possess a motor override feature via its external motor connector. Thus arranged, power to the motor can be facilitated by direct access to the motor terminals from external electrodes on the surface of the strut in order that the motor may be moved at high speed using an external power source during surgical placement or at any other time when rapid strut adjustment is needed. In one embodiment, the motor connector includes access nodes such as, for example, two test point access nodes, which are available for remote high speed adjustment. In use, if the two MOSFETS and current switches are switched off, the motor is isolated and not connected to the circuitry. If the two nodes are connected to another external instrument (with, for example, a motor controller and power supply) then they can be used to independently control/move the strut at a rate of, for example, 1 mm every 3-4 s. A powered instrument could be used to connect to the two pins or pads on the strut and supply power to the motors independently.

Figure 30:
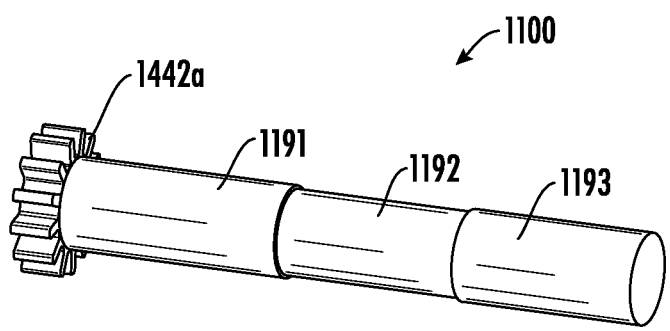
FIG. 30 illustrates a perspective view of an embodiment of a retrofit kit or assembly that may be used with a non-automated strut in accordance with one or more features of the present disclosure.

Referring to FIG. 30, an embodiment of a retrofit kit or assembly 1100 is illustrated. In use, the retrofit kit or assembly 1100 is arranged and configured to enable a traditional strut to be converted into a wireless automated strut. As illustrated, the retrofit kit or assembly 1100 includes a power unit 1193. The power unit 1193 may include a power source (e.g., a battery) and a PCB as previously described. In addition, the retrofit kit or assembly 1100 may also include a motor and rotary encoder assembly 1192 electrically connected to the power unit 1193. Operation and details of the motor and rotary encoder 1192 were also discussed previously. In addition, the retrofit kit or assembly 1100 may include a planetary gearhead 1191 connected to the output drive of the motor and rotary encoder assembly 1192, and in turn is also connected to, for example, pinion gear 1442a.

Figure 31:
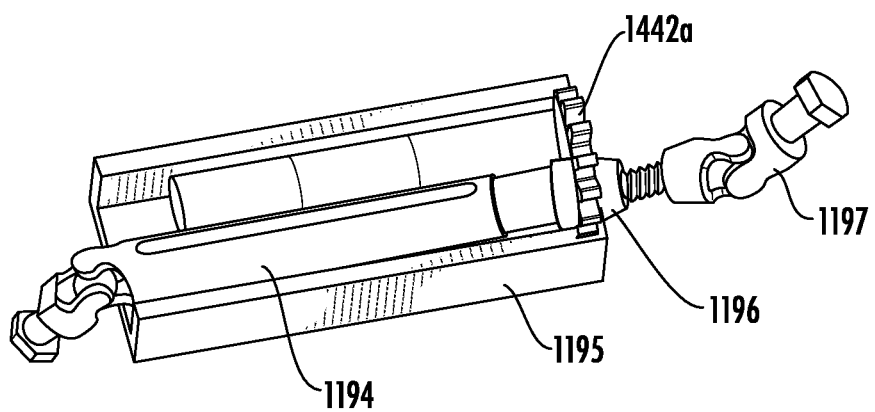
FIG. 31 illustrates a perspective view of the retrofit kit or assembly of FIG. 30 coupled to a non-automated strut.

In practice, the retrofit kit or assembly 1100 (as shown in FIG. 30) can be used in combination with a traditional strut (as shown in FIG. 31). As illustrated, the retrofit kit or assembly 1100 can be positioned within a housing 1195 and pinion gears 1442a from the retrofit kit or assembly 1100 are arranged and configured to engage and turn a traditional strut gear 1196 to distract or retract the strut 1194. End connection 1197 may connect the strut 1194 to a platform.

Figure 32:
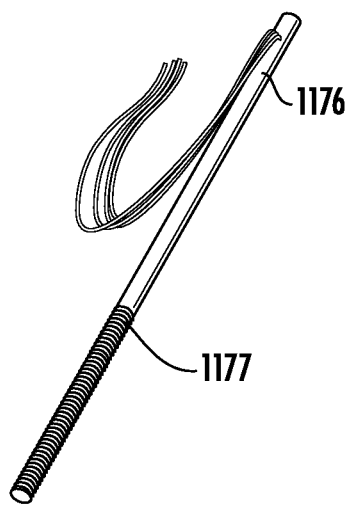
FIG. 32 illustrates a perspective view of an embodiment of an instrumented half pin.

Referring to FIG. 32, an embodiment of a half pin 1177 that may be used in a spatial frame such as, for example, spatial frame 1000 is disclosed. In accordance with another feature of the present disclosure, the half pin 1177 includes an inertial measurement sensor 1176. In one embodiment, the inertial measurement sensor 1176 located in the half pin 1177 may be utilized to detect dynamic movement via the deflection of the half pin 1177, which when combined with an overall measurement of frame bending movement, may yield an accurate assessment of the bending stiffness of the construct in two orthogonal planes (e.g., in Nm/deg) during various points in the healing process. The inertial measurement sensor 1176 may also be used to measure strut angles or pin site loosening (indicating infection) through characterizing frequency components in the frequency domain signal, which were previously defined to be indicative of a pin site infection.

In the illustrative embodiment, each of the half pins 1177 includes a canal defined therein within which an accelerometer (e.g., a tri-axis accelerometer) and magnetometer are secured or positioned. In one embodiment, the half pin 1177 may be cannulated to enable the accelerometer/magnetometer circuit board to be protected. In one embodiment, the cannulation may include approximately a 3 mm inner diameter. The half pin 1177 may be potted with a biocompatible material such as epoxy resin or polyurethane to protect the sensors or enclosed with a welded cap. In use, each half pin 1177 contains wireless communication circuitry to transmit the sensor data generated by the at least one inertial sensor 1176 to the computing device.

In addition, in connection with the various embodiments of the automated spatial frames disclosed herein, it would be beneficial for the automated spatial frame to be arranged and configured to determine when removal of the spatial frame is appropriate. For example, the automated spatial frame may be arranged and configured to determine when frame removal is appropriate based on, for example, sensed data from strut force measurements obtained from load sensors or strain gauges. Alternatively, strut linear mechanical load can be determined indirectly through the motor current, the distance travelled from the rotary encoder and the energy delivered during this travel as a function of the change in capacitor voltage.

In one embodiment, an automated spatial frame is disclosed. The automated spatial frame includes a first platform; multiple automated struts configured to extend and retract in response to one or more signals, the multiple automated struts coupled to the first platform; a control unit electrically connected to one or more of the multiple automated struts, the control unit configured to provide the one or more signals to the multiple automated struts; a power source for energizing the multiple automated struts; a second platform coupled to the multiple automated struts and including integrated connectivity among two or more of the multiple automated struts, the control unit, and the power source; and a computing device that executes control instructions to: receive a spatial frame treatment plan, and transmit the treatment plan to the control unit for use in determining changes in the multiple automated strut lengths to carry out the treatment plan.

In one embodiment, the automated spatial frame includes six automated struts, each having a pivotable connection at each of its ends through which each automated strut couples to the first platform and the second platform.

In one embodiment, each automated strut is configured to extend and retract in response to one or more electrical signals.

In one embodiment, the control unit configured to provide the one or more signals to the multiple automated struts provides one or more signals to individually control each of the multiple automated struts.

In one embodiment, the control unit configured to provide the one or more signals to the multiple automated struts provides one or more signals to each of the multiple automated struts through a wire in a sequence.

In one embodiment, the control unit configured to provide the one or more signals to the multiple automated struts provides commands to an on-board motor controller in each of the multiple automated struts through a serial connection.

In one embodiment, the control unit configured to provide the one or more signals to the multiple automated struts receives one or more signals from one or more of the multiple automated struts and determines incremental movements of the one or more of the multiple automated struts to calculate one or both of relative and absolute positions of the automated struts.

In one embodiment, the control unit configured to provide the one or more signals to the multiple automated struts provides one or more power signals to each of the multiple automated struts on demand.

In one embodiment, the control unit configured to provide the one or more signals to the multiple automated struts provides one or more signals to the multiple automated struts to at least one of: follow a treatment plan, reach a target strut length, dictate a lengthening direction, dictate a rate of distraction, achieve a frequency of distraction, dictate a total amount of distraction, follow a lengthening schedule, dictate a number of turns of a motor or gear, and monitor an axial force exerted by an automated strut.

In one embodiment, the power source for energizing the multiple automated struts is a battery integral with the control unit.

In one embodiment, the power source for energizing the multiple automated struts is a battery coupled to the second platform.

In one embodiment, the second platform includes an opening sized to receive the power source such that the power source is configured to be integral with the second platform and fit substantially within the peripheral profile of the second platform.

In one embodiment, the power source is a battery that extends substantially around a perimeter of the second platform.

In one embodiment, the power source is a battery that is separately removable from the second platform.

In one embodiment, the power source is an ultra-thin LiPo battery.

In one embodiment, the integrated connectivity of the second platform includes wires passing through second platform.

In one embodiment, the wires passing through the second platform are substantially within the peripheral profile of the second platform.

In one embodiment, the second platform has substantially the same peripheral profile as the first platform.

In one embodiment, the integrated connectivity of the second platform includes wires passing through second platform substantially within the peripheral profile of the second platform.

In one embodiment, the computing device that executes control instructions to receive a spatial frame treatment plan executes control instructions to present a user interface through which the spatial frame treatment plan may be received.

In one embodiment, a platform configured to couple to multiple automated struts of an automated spatial frame and provide integrated connectivity to the multiple automated struts is disclosed. The platform includes a body with a peripheral profile; a passage through the body and within the peripheral profile; sockets from the passage to a boundary of the peripheral profile; wires configured to fit within the passage and extend through the sockets to which electrical connections to the multiple automated struts may be made; and mechanical couplings configured to interface with the multiple automated struts.

In one embodiment, the body is selected from one of a ring-shaped platform, two-thirds of a ring, a half ring, and U-shaped.

In one embodiment, the platform further comprises an opening formed in the body, the opening arranged and configured to receive a power source such that the power source is configured to be integral with the platform and fit substantially within the peripheral profile of the platform.

In one embodiment, the power source is a battery that extends substantially around a perimeter of the platform.

In one embodiment, the power source is a battery that is separately removable from the body of the platform.

In one embodiment, the power source is an ultra-thin LiPo battery.

In one embodiment, an automated spatial frame is disclosed. The automated spatial frame includes a first platform; multiple automated struts configured to extend and retract in response to one or more signals, the multiple automated struts coupled to the first platform; a second platform coupled to the multiple automated struts, the second platform having a peripheral profile; a control unit electrically connected to one or more of the multiple automated struts, the control unit configured to provide the one or more signals to the multiple automated struts; a power source for energizing the multiple automated struts; means for providing integrated connectivity among the multiple automated struts, the control unit, and the power source; and a computing device that executes control instructions to: receive a spatial frame treatment plan, and transmit the treatment plan to the control unit for use in determining changes in the multiple automated strut lengths to carry out the treatment plan.

In one embodiment, the automated spatial frame includes six automated struts, each having a pivotable connection at each of its ends through which each automated strut couples to the first platform and the second platform.

In one embodiment, each automated strut is configured to extend and retract in response to one or more electrical signals.

In one embodiment, the control unit configured to provide the one or more signals to the multiple automated struts provides one or more signals to individually control each of the multiple automated struts.

In one embodiment, the control unit configured to provide the one or more signals to the multiple automated struts provides one or more signals to each of the multiple automated struts through a wire in a sequence.

In one embodiment, the control unit configured to provide the one or more signals to the multiple automated struts provides commands to an on-board motor controller in each of the multiple automated struts through a serial connection.

In one embodiment, the control unit configured to provide the one or more signals to the multiple automated struts receives one or more signals from one or more of the multiple automated struts and determines incremental movements of the one or more of the multiple automated struts to calculate one or both of relative and absolute positions of the automated struts.

In one embodiment, the control unit configured to provide the one or more signals to the multiple automated struts provides one or more power signals to each of the multiple automated struts on demand.

In one embodiment, the control unit configured to provide the one or more signals to the multiple automated struts provides one or more signals to the multiple automated struts to at least one of: follow a treatment plan, reach a target strut length, dictate a lengthening direction, dictate a rate of distraction, achieve a frequency of distraction, dictate a total amount of distraction, follow a lengthening schedule, dictate a number of turns of a motor or gear, and monitor an axial force exerted by an automated strut.

In one embodiment, the power source for energizing the multiple automated struts is a battery integral with the control unit.

In one embodiment, the power source for energizing the multiple automated struts is a battery coupled to the second platform.

In one embodiment, the second platform includes an opening sized to receive the power source such that the power source is configured to be integral with the second platform and fit substantially within the peripheral profile of the second platform.

In one embodiment, the power source is a battery that extends substantially around a perimeter of the second platform.

In one embodiment, the power source is a battery that is separately removable from the second platform.

In one embodiment, the power source is an ultra-thin LiPo battery.

In one embodiment, the means for providing integrated connectivity among the multiple automated struts, the control unit, and the power source includes wires passing through second platform.

In one embodiment, the wires passing through the second platform are substantially within the peripheral profile of the second platform.

In one embodiment, the second platform has substantially the same peripheral profile as the first platform.

In one embodiment, the means for providing integrated connectivity among the multiple automated struts, the control unit, and the power source includes wires passing through second platform substantially within the peripheral profile of the second platform.

In one embodiment, the computing device that executes control instructions to receive a spatial frame treatment plan executes control instructions to present a user interface through which the spatial frame treatment plan may be received.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments, or configurations. Any embodiment or feature of any section, portion, or any other component shown or particularly described in relation to various embodiments of similar sections, portions, or components herein may be interchangeably applied to any other similar embodiment or feature shown or described herein. Additionally, components with the same name may be the same or different, and one of ordinary skill in the art would understand each component could be modified in a similar fashion or substituted to perform the same function.

Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

The invention claimed is:

1. An automated spatial frame, comprising:
   a first platform;
   a second platform including a plurality of circumferential tabs and spaces;
   multiple automated struts coupled to the first and second platforms, the struts configured to extend and retract in response to one or more electrical signals;
   a control unit associated with second platform, the control unit being electrically connected to one or more of the multiple automated struts, the control unit configured to provide the one or more electrical signals to the multiple automated struts to individually control each of the multiple automated struts, the control unit including a power source for supplying power to the multiple automated struts, wherein the second platform includes integrated connectivity formed therein, the integrated connectivity facilitating transmitting of the one or more electrical signals and the power among two or more of the multiple automated struts, the control unit, and the power source; and
   a computing device that executes control instructions to:
      receive a spatial frame treatment plan, and
      transmit the treatment plan to the control unit for use in determining changes in the multiple automated strut lengths to carry out the treatment plan;
   wherein the control unit comprises one or more print circuit board (PCB) modules, each of the one or more PCB modules is configured to be positioned at least partially within the spaces between the tabs formed on the second platform such that each of the one or more PCB modules reside within a height as defined by top and bottom surfaces of the second platform; and
   wherein the integrated connectivity of the second platform includes wires passing through second platform, the wires passing through the second platform being arranged and configured substantially within the peripheral profile of the second platform.

2. The automated spatial frame of claim 1, wherein the control unit provides one or more electrical signals to each of the multiple automated struts through a wire in a sequence.

3. The automated spatial frame of claim 1, wherein the control unit provides commands to an on-board motor controller in each of the multiple automated struts through a serial connection.

4. The automated spatial frame of claim 1, wherein the control unit receives one or more electrical signals from one or more of the multiple automated struts and determines incremental movements of the one or more of the multiple automated struts to calculate one or both of relative and absolute positions of the automated struts.

5. The automated spatial frame of claim 1, wherein the control unit provides one or more power signals to each of the multiple automated struts on demand.

6. The automated spatial frame of claim 1, wherein multiple automated struts includes six automated struts, each of the six automated struts including a pivotable connection at each of its ends through which each automated strut couples to the first platform and the second platform.

7. The automated spatial frame of claim 1, wherein the control unit provides one or more electrical signals to the multiple automated struts to at least one of: follow a treatment plan, reach a target strut length, dictate a lengthening direction, dictate a rate of distraction, achieve a frequency of distraction, dictate a total amount of distraction, follow a lengthening schedule, dictate a number of turns of a motor or gear, and monitor an axial force exerted by an automated strut.

8. The automated spatial frame of claim 1, wherein the power source is a battery that is separately removable from the second platform.

9. The automated spatial frame of claim 1, wherein the power source for energizing the multiple automated struts is a battery integral with the control unit.

10. The automated spatial frame of claim 9, wherein the power source is an ultra-thin LiPo battery.

11. An automated spatial frame, comprising:
a first platform;
a second platform including a plurality of circumferential tabs and spaces;
multiple automated struts coupled to the first and second platforms, the struts configured to extend and retract in response to one or more electrical signals;
a control unit associated with the second platform, the control unit being electrically connected to one or more of the multiple automated struts, the control unit configured to provide the one or more electrical signals to the multiple automated struts to individually control each of the multiple automated struts, the control unit including a power source for supplying power to the multiple automated struts; and
a computing device that executes control instructions to:
receive a spatial frame treatment plan, and
transmit the treatment plan to the control unit for use in determining changes in the multiple automated strut lengths to carry out the treatment plan;
wherein the control unit is configured as one or more print circuit board (PCB) modules, each of the one or more PCB modules is positioned at least partially within the spaces between tabs formed on the second platform such that each of the one or more PCB modules reside within a height as defined by top and bottom surfaces of the second platform; and
wherein the control unit receives one or more electrical signals from one or more of the multiple automated struts and determines incremental movements of the one or more of the multiple automated struts to calculate one or both of relative and absolute positions of the automated struts.

12. The automated spatial frame of claim 11, wherein the control unit receives one or more electrical signals from one or more of the multiple automated struts and determines incremental movements of the one or more of the multiple automated struts to calculate one or both of relative and absolute positions of the automated struts.

13. The automated spatial frame of claim 11, wherein the control unit provides one or more power signals to each of the multiple automated struts on demand.

14. The automated spatial frame of claim 11, wherein multiple automated struts includes six automated struts, each of the six automated struts including a pivotable connection at each of its ends through which each automated strut couples to the first platform and the second platform.

15. The automated spatial frame of claim 11, wherein the control unit provides one or more electrical signals to the multiple automated struts to at least one of: follow a treatment plan, reach a target strut length, dictate a lengthening direction, dictate a rate of distraction, achieve a frequency of distraction, dictate a total amount of distraction, follow a lengthening schedule, dictate a number of turns of a motor or gear, and monitor an axial force exerted by an automated strut.

16. The automated spatial frame of claim 11, wherein the power source for energizing the multiple automated struts is a battery integral with the control unit.

17. The automated spatial frame of claim 11, wherein the power source is a battery that is separately removable from the second platform.

18. The automated spatial frame of claim 17, wherein the power source is an ultra-thin LiPo battery.

19. An automated spatial frame, comprising:
a first platform;
a second platform including a plurality of circumferential tabs and spaces;
multiple automated struts coupled to the first and second platforms, the struts configured to extend and retract in response to one or more electrical signals;
a control unit associated with the second platform, the control unit being electrically connected to one or more of the multiple automated struts, the control unit configured to provide the one or more electrical signals to the multiple automated struts to individually control each of the multiple automated struts, the control unit including a power source for supplying power to the multiple automated struts; and
a computing device that executes control instructions to:
receive a spatial frame treatment plan, and
transmit the treatment plan to the control unit for use in determining changes in the multiple automated strut lengths to carry out the treatment plan;
wherein the control unit is configured as one or more print circuit board (PCB) modules, each of the one or more PCB modules is positioned at least partially within the spaces between tabs formed on the second platform such that each of the one or more PCB modules reside within a height as defined by top and bottom surfaces of the second platform; and
wherein the power source for energizing the multiple automated struts is a battery integral with the control unit.

20. An automated spatial frame, comprising:
a first platform;
a second platform including a plurality of circumferential tabs and spaces;
multiple automated struts coupled to the first and second platforms, the struts configured to extend and retract in response to one or more electrical signals;
a control unit associated with the second platform, the control unit being electrically connected to one or more of the multiple automated struts, the control unit configured to provide the one or more electrical signals to the multiple automated struts to individually control each of the multiple automated struts, the control unit including a power source for supplying power to the multiple automated struts; and
a computing device that executes control instructions to:
 receive a spatial frame treatment plan, and
 transmit the treatment plan to the control unit for use in determining changes in the multiple automated strut lengths to carry out the treatment plan;
wherein the control unit is configured as one or more print circuit board (PCB) modules, each of the one or more PCB modules is positioned at least partially within the spaces between tabs formed on the second platform such that each of the one or more PCB modules reside within a height as defined by top and bottom surfaces of the second platform; and
wherein the power source is an ultra-thin LiPo battery that is separately removable from the second platform.

* * * * *